US010087328B2

(12) United States Patent
Murai et al.

(10) Patent No.: US 10,087,328 B2
(45) **Date of Patent: *Oct. 2, 2018**

(54) COMPOUND HAVING AZO SKELETON, PIGMENT DISPERSANT, PIGMENT COMPOSITION, PIGMENT DISPERSION, AND TONER

(71) Applicant: CANON KABUSHIKI KAISHA, Tokyo (JP)

(72) Inventors: Yasuaki Murai, Kawasaki (JP); Yuki Tsujii, Tokyo (JP); Waka Hasegawa, Tokyo (JP); Ayano Mashida, Kawasaki (JP); Kosuke Mukumoto, Yokohama (JP); Takayuki Toyoda, Yokohama (JP); Masashi Kawamura, Yokohama (JP); Chiaki Nishiura, Pittsburgh, PA (US); Masanori Seki, Yokohama (JP); Masashi Hirose, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/915,160

(22) PCT Filed: Aug. 28, 2014

(86) PCT No.: PCT/JP2014/004441

§ 371 (c)(1),
(2) Date: Feb. 26, 2016

(87) PCT Pub. No.: WO2015/029445

PCT Pub. Date: Mar. 5, 2015

(65) Prior Publication Data

US 2016/0208106 A1 Jul. 21, 2016

(30) Foreign Application Priority Data

Aug. 29, 2013 (JP) ................................ 2013-178555

(51) Int. Cl.

| | |
|---|---|
| ***G03G 9/09*** | (2006.01) |
| ***C09B 67/46*** | (2006.01) |
| ***C09B 69/10*** | (2006.01) |
| ***C08F 8/30*** | (2006.01) |
| ***G03G 9/087*** | (2006.01) |
| ***C09B 67/22*** | (2006.01) |
| ***C08F 112/08*** | (2006.01) |

(52) U.S. Cl.

CPC .............. *C09B 67/009* (2013.01); *C08F 8/30* (2013.01); *C08F 112/08* (2013.01); *C09B 67/0041* (2013.01); *C09B 67/0046* (2013.01); *C09B 69/106* (2013.01); *G03G 9/08706* (2013.01); *G03G 9/08726* (2013.01); *G03G 9/09* (2013.01); *G03G 9/0926* (2013.01); *C08F 2810/50* (2013.01)

(58) Field of Classification Search

USPC ....................................... 430/108.22, 108.23

See application file for complete search history.

(56) References Cited

U.S. PATENT DOCUMENTS

| | | | | |
|---|---|---|---|---|
| 7,582,150 | B2 * | 9/2009 | Jaunky | C09B 67/0046 106/31.52 |
| 9,618,867 | B2 * | 4/2017 | Toyoda | G03G 9/0918 |
| 2015/0277254 | A1 * | 10/2015 | Mukumoto | C09B 68/41 430/108.22 |

FOREIGN PATENT DOCUMENTS

| | | | |
|---|---|---|---|
| CN | 101223247 | A | 7/2008 |
| CN | 103124773 | A | 5/2013 |
| JP | H03113462 | A | 5/1991 |
| JP | H06148927 | A | 5/1994 |
| JP | 2000515181 | A | 11/2000 |
| JP | 2003531001 | A | 10/2003 |
| JP | 3721617 | B2 | 11/2005 |
| JP | 200630760 | A | 2/2006 |
| JP | 2009501250 | A | 1/2009 |
| JP | 2009501251 | A | 1/2009 |
| JP | 2009501254 | A | 1/2009 |
| JP | 4254292 | B2 | 4/2009 |
| JP | 2009242684 | A | 10/2009 |
| JP | 2012-67285 | A | 4/2012 |
| JP | 2015-199949 | A * | 11/2015 |
| WO | 99/05099 | A1 | 2/1999 |
| WO | 2009060886 | A1 | 5/2009 |
| WO | 2012032717 | A1 | 3/2012 |

OTHER PUBLICATIONS

Japanese Patent Office abstract with Bibliographic data and machine-assisted English-language translation of JP 2015-199949 A (pub. Nov. 2015).*

Ponde, Datta E., et al., "Selective Catalytic Transesterification, Transthiolesterification, and Protection of Carbonyl Componds Over Natural Kaolinitic Clay", Journal of Organic Chemistry, Jan. 30, 1998, pp. 1058-1063, vol. 63, No. 4, American Chemical Society.

Sai, Kiran Kumar Slingapuram, et al., "Knorr Cyclizations and Distonic Superelectrophiles" Journal of Organic Chemistry, Nov. 14, 2007, pp. 9761-9764, vol. 17, No. 25, American Chemical Society.

Ed. by Chemical Society of Japan; "Jikken Kagaku Kouza" (Experimental Chemistry Lecture, in Japanese); Yuki Kagaku no Hannou I (Ge) (Reaction of Organic compounds I, vol. 2); May 25, 1964; pp. 162-179; Maruzen Co., Ltd.; Tokyo, Japan.

Ed. by Chemical Society of Japan; "Shin Jikken Kagaku Koza" (New Experimental Chemistry Course 15); Oxidation and Reduction II; Feb. 20, 1977; pp. 390-448; Ebihara Yoshio; Maruzen Co., Ltd.; Tokyo, Japan.

(Continued)

*Primary Examiner* — Janis L Dote

(74) *Attorney, Agent, or Firm* — Canon U.S.A. Inc., IP Division

(57) ABSTRACT

A compound that improves the dispersibility of pigments in non-water-soluble solvents is provided, the compound having a pigment dispersant, a pigment composition, a pigment dispersion, and a toner wherein the compound has a polymer and a monoazo compound having a certain structure binding to each other.

14 Claims, 6 Drawing Sheets

(56) References Cited

OTHER PUBLICATIONS

Matyjaszewski, Krzysztof, et al., "Atom Transfer Radical Polymerization", Chemical Reviews, Sep. 12, 2001, pp. 2921-2990, vol. 101, No. 9, American Chemical Society.
Hawker, Craig J., et al., "New Polymer Synthesis by Nitroxide Mediated Living Radical Polymerizations", Chemical Reviews, Oct. 25, 2001, pp. 3361-3688, vol. 101, No. 12, American Chemical Society.
Kamigaito, Masami, et al., "Metal-Catalyzed Living Radical Poymerization", Chemical Reviews, Dec. 12, 2001, pp. 3689-3745, vol. 101, No. 12, American Chemical Society.
Goto, Atsushi, et al., "Mechanism-Based Invention of High-Speed Living Radical Polymerization Using Organotellurium Compounds and Azo-Initiators", Journal of American Chemical Society, Jun. 25, 2003, pp. 8720-8721 vol. 125, No. 29, American Chemical Society.
Newman, Melvin S., et al., "N-Methylpyrrolidone as Solvent for Reaction of Aryl Halides with Cuprous Cyanide", Journal of Organic Chemistry, pp. 2525-2528, Jul. 1961, vol. 26, No. 7, American Chemical Society.
Sonntag, Norman O.V., "The Reactions of Aliphatic Acid Chlorides", Chemical Reviews, pp. 237-416, Nov. 15, 1952, vol. 52, No. 2, American Chemical Society.

* cited by examiner

[Fig. 1]
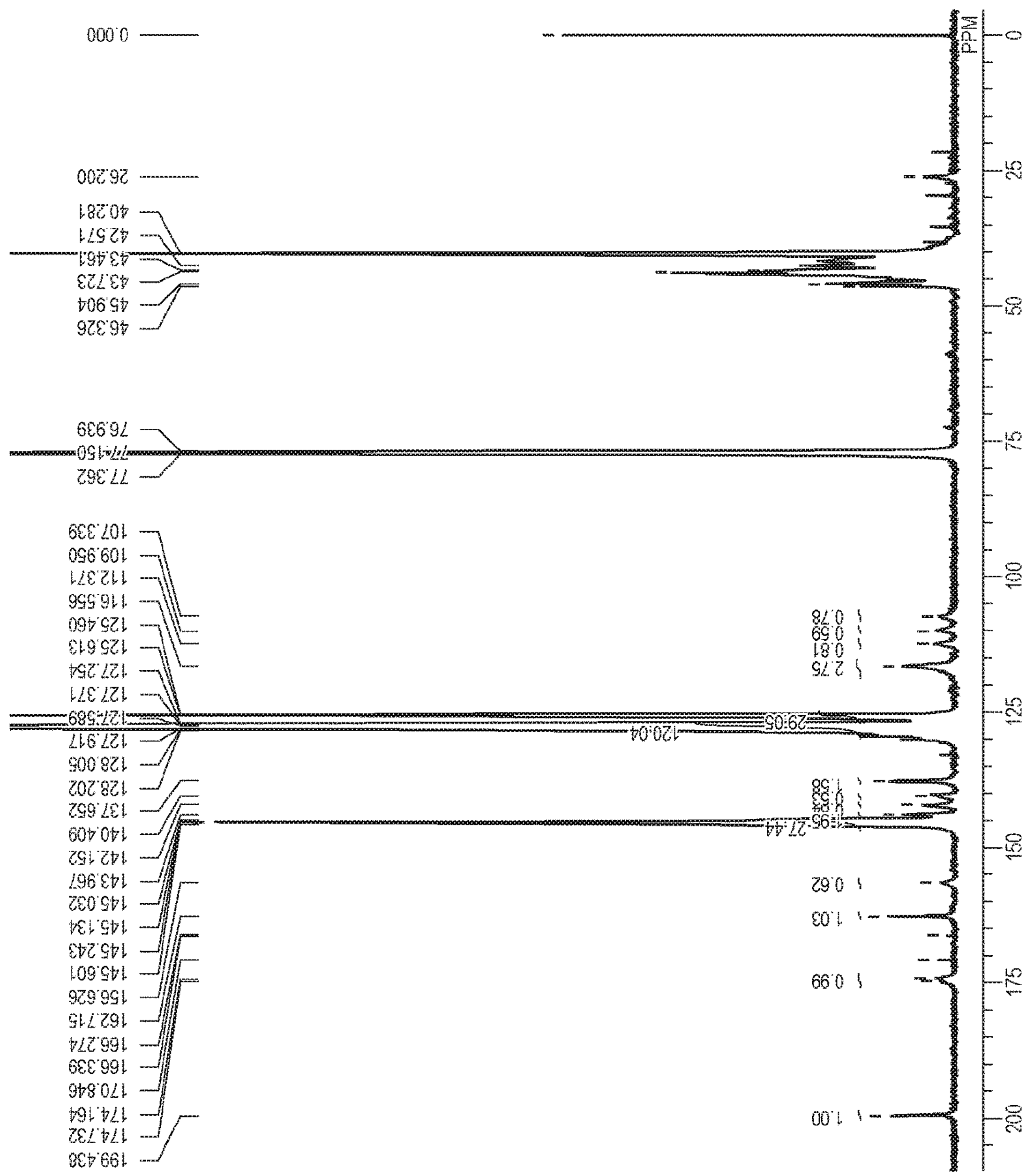

[Fig. 2]
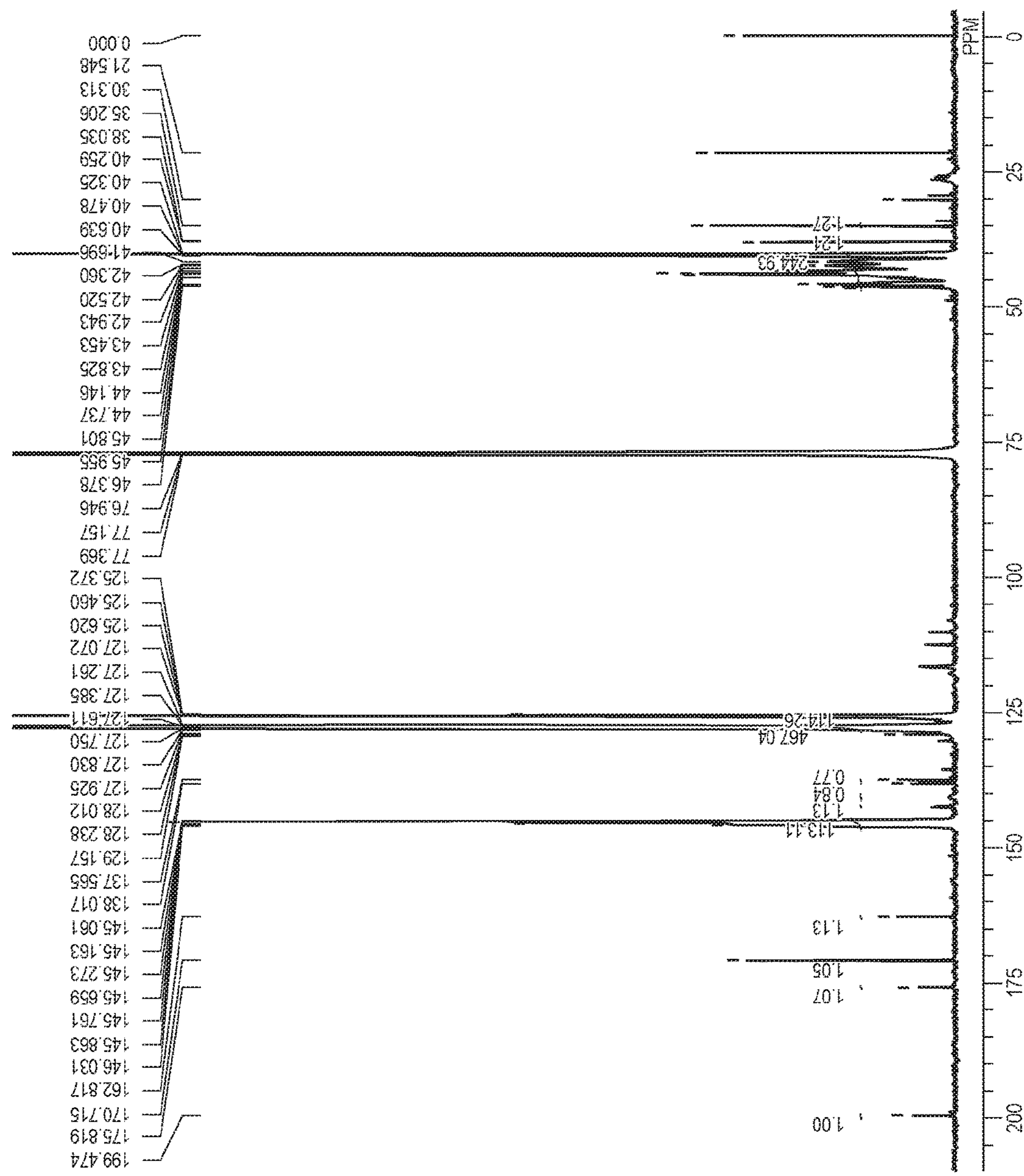

[Fig. 3]
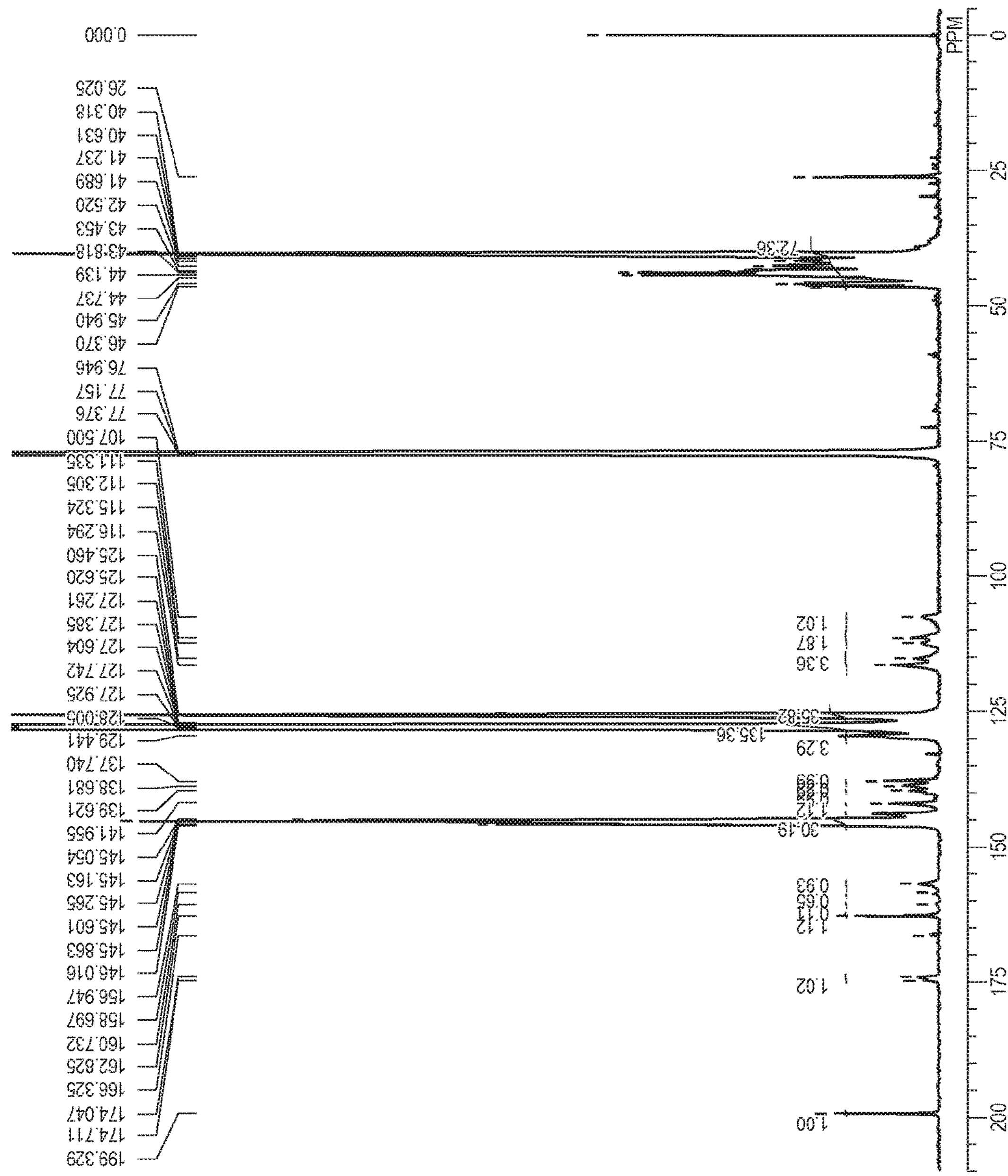

[Fig. 4]
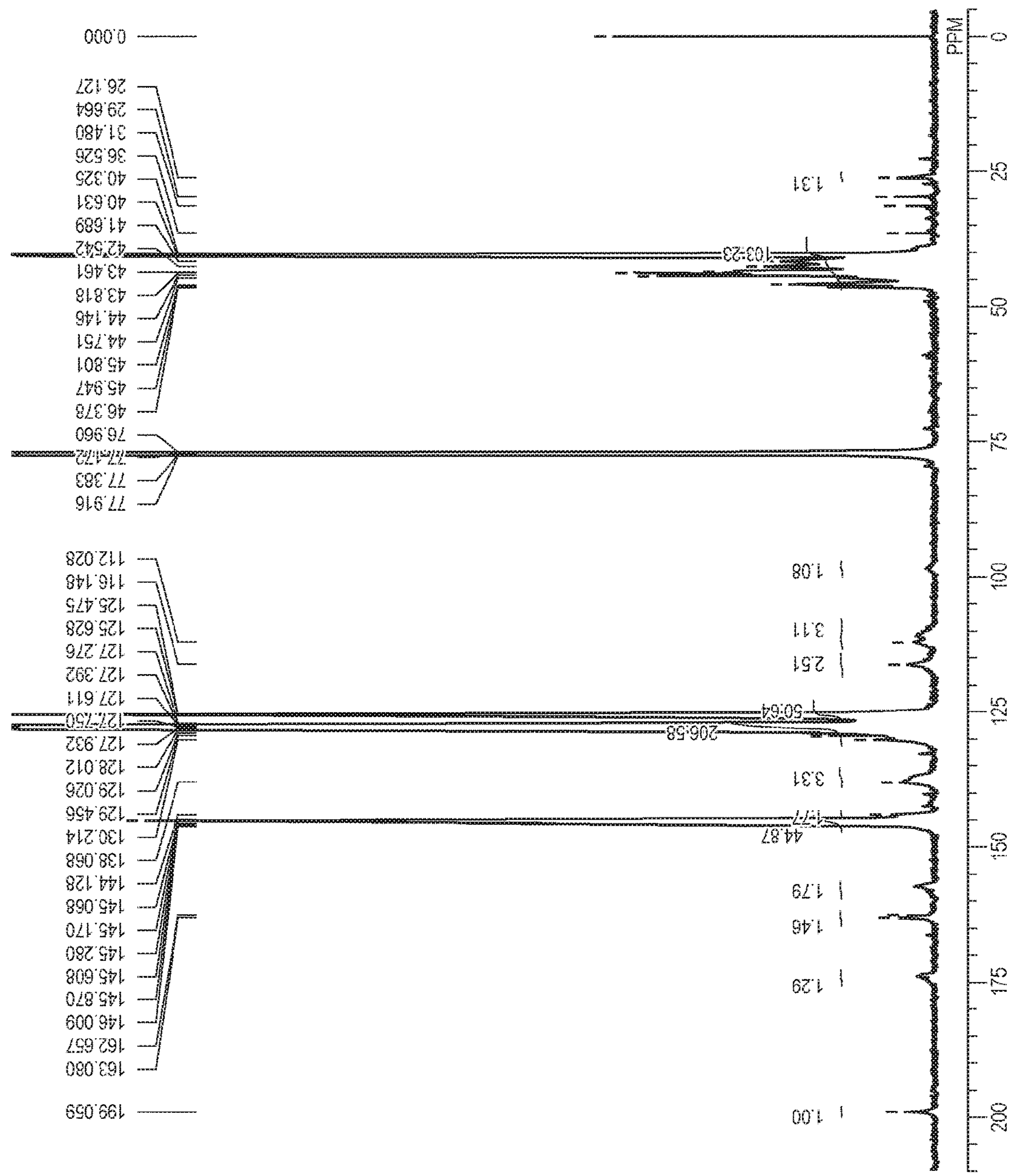

[Fig. 5]
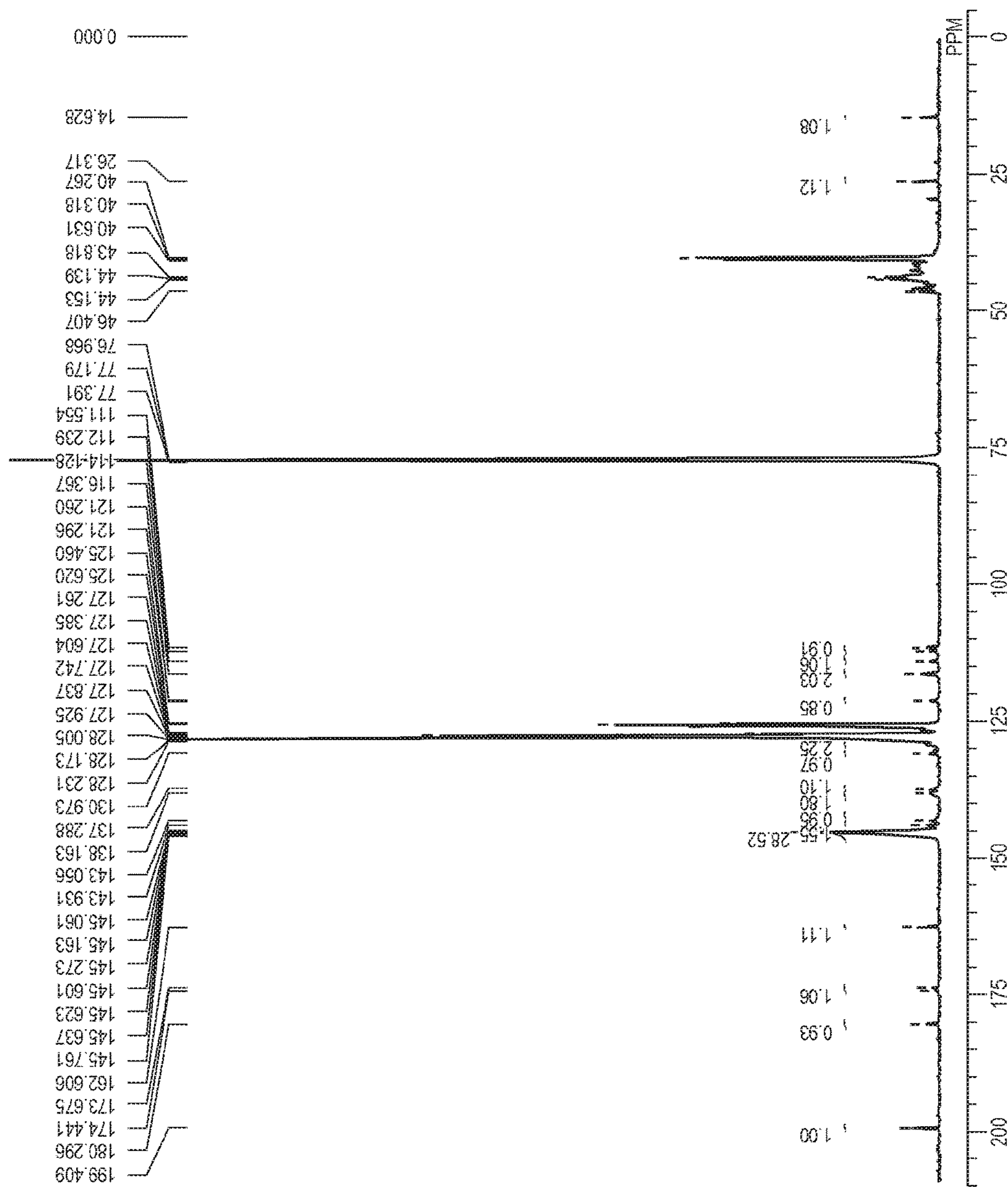

[Fig. 6]
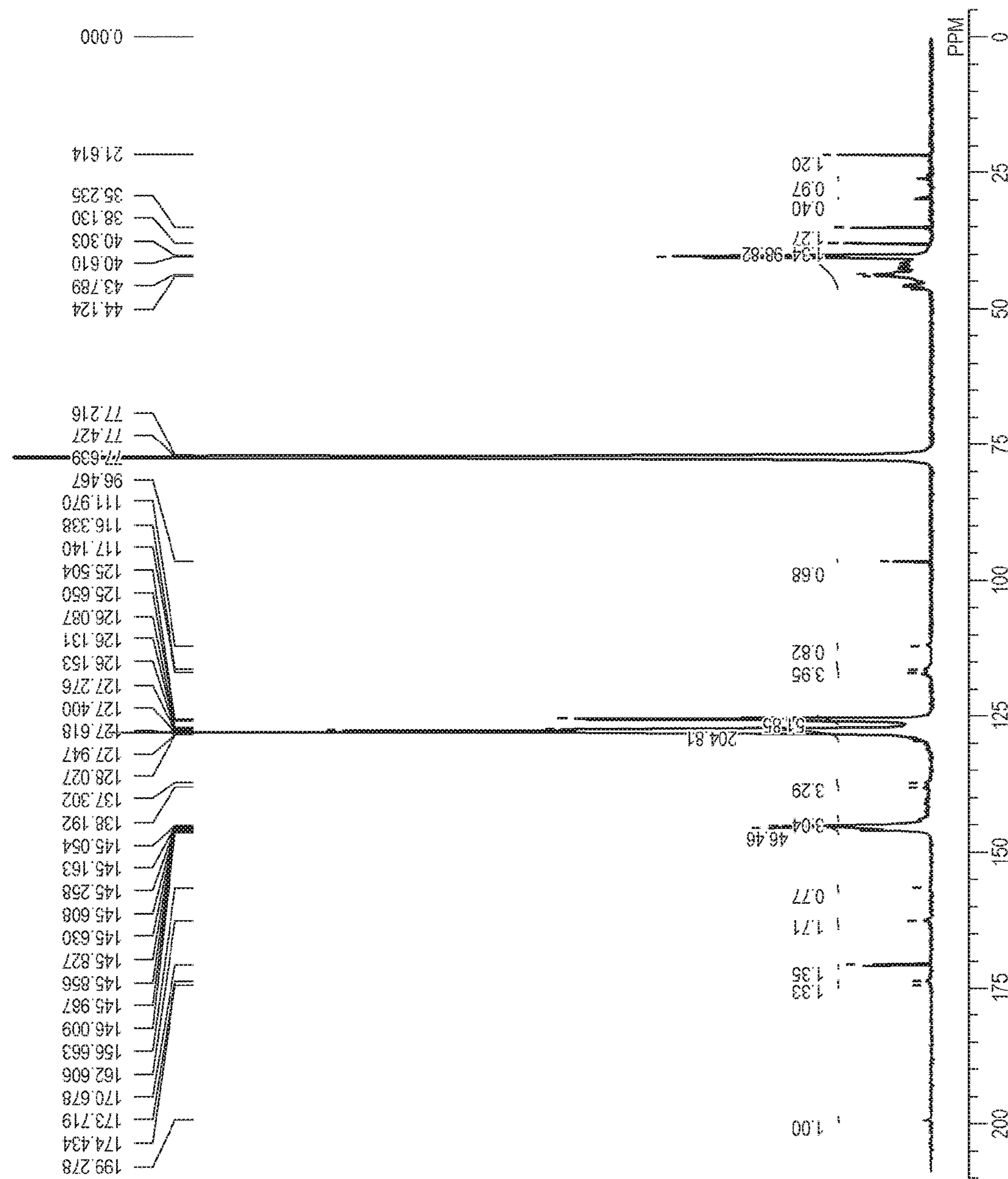

COMPOUND HAVING AZO SKELETON, PIGMENT DISPERSANT, PIGMENT COMPOSITION, PIGMENT DISPERSION, AND TONER

TECHNICAL FIELD

The present invention relates to a compound having an azo skeleton, a pigment dispersant containing this compound, a pigment composition containing this pigment dispersant, and a pigment dispersion and a toner containing this pigment composition.

BACKGROUND ART

In general, a pigment having a small particle diameter exhibits strong cohesive force between pigment particles and thus is often insufficiently dispersed in media, such as organic solvents and melted polymers. Insufficient dispersibility of a pigment affects the tint strength of the pigment.

Thus it has been proposed to use a pigment in combination with a dispersant for dispersing the pigment to improve the dispersibility of the pigment. In particular, researchers have been focusing on improving the dispersibility of a pigment in toner particles, proposing various dispersants for use in toners of different colors including yellow, magenta, cyan, and black.

More specifically, PTL 1 discloses the use of a compound having an azo skeleton as a dispersant to improve the dispersibility of an azo pigment in yellow toner.

PTL 2 discloses the use of a particular polyester-based dispersant to improve the dispersibility of a magenta pigment in magenta toner.

PTL 3 discloses that a polymer containing sodium styrene sulfonate as a monomer unit is used as a dispersant to improve the dispersibility of a phthalocyanine pigment in cyan toner.

PTL 4 discloses the use of a copolymer composed of a styrene-based monomer and an acrylate-based (or methacrylate-based) monomer as a dispersant to improve the dispersibility of carbon black in black toner.

CITATION LIST

Patent Literature

PTL 1: Japanese Patent Laid-Open No. 2012-067285
PTL 2: Japanese Patent Laid-Open No. 2006-30760
PTL 3: Japanese Patent Laid-Open No. 3-113462
PTL 4: Japanese Patent Laid-Open No. 6-148927

SUMMARY OF INVENTION

The methods described in PTL 2 to 4, in which a large amount of dispersant is used to provide the pigment with a given level of dispersibility, may result in an excessive amount of dispersant affecting essential characteristics, depending on the application. The method described in PTL 1, in which a compound having an azo skeleton is used as a pigment dispersant, admittedly provides various pigments with some high degree of dispersibility, but further improving the quality of output images requires a pigment dispersant with a higher dispersing effect.

Certain aspects of the invention therefore provide a compound and a pigment dispersant with which the dispersibility of pigments of different colors such as yellow, magenta, cyan, and black can be improved. Some other aspects of the invention provide a pigment composition, a pigment dispersion, and a toner that exhibit good tint strength.

The following describes these aspects of the invention.

A first aspect of the invention relates to a compound having a polymer having a monomer unit represented by formula (3). This compound has a partial structure represented by formula (1).

[Chem. 1]

Formula (1)

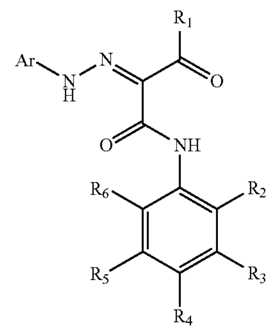

(In formula (1). $R_1$ represents an alkyl group or a phenyl group, Ar represents an aryl group, and Ar and $R_2$ to $R_6$ meet at least one of conditions (i) and (ii).

(i) Ar has a linking group that binds to a carbon atom of the aryl group and forms a linking portion where the partial structure binds to the polymer.

(ii) At least one of $R_2$ to $R_6$ is a linking group that forms a linking portion where the partial structure binds to the polymer.

Each of $R_2$ to $R_6$, when not being the linking group, independently represents a hydrogen atom, a halogen atom, an alkyl group, an alkoxy group, a hydroxyl group, a cyano group, a trifluoromethyl group, a carboxyl group, a group represented by formula (2-1), or a group represented by formula (2-2).

Ar and $R_2$ to $R_6$ meet at least one of conditions (iii) and (iv).

(iii) Ar has a group represented by formula (2-1) or a group represented by formula (2-2) as a substituent.

(iv) At least one of $R_2$ to $R_6$ is a group represented by formula (2-1) or a group represented by formula (2-2).)

[Chem. 2]

Formula (2-1)

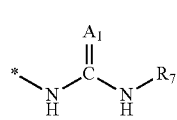

(In formula (2-1), the symbol * represents a site where the group binds to Ar or the aromatic ring having $R_2$ to $R_6$ in formula (1), $R_7$ represents a hydrogen atom, an alkyl group, an aralkyl group, an alkyloxycarbonyl group, or an aralkyloxycarbonyl group, and $A_1$ represents an oxygen atom, a sulfur atom, or an $NR_8$ group, where $R_8$ represents a hydrogen atom, an alkyloxycarbonyl group, or an aralkyloxycarbonyl group.)

[Chem. 3]

Formula (2-2)

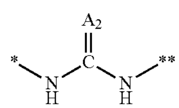

(In formula (2-2), the symbols * and ** represent sites where the group binds to Ar or the aromatic ring having $R_2$ to $R_6$ in formula (1), the group represented by formula (2-2) forming a five-member heterocycle by binding to Ar or the aromatic ring having $R_2$ to $R_6$ in formula (1), and $A_2$ represents an oxygen atom, a sulfur atom, or an $NR_{16}$ group, where $R_{16}$ represents a hydrogen atom, an alkyloxycarbonyl group, or an aralkyloxycarbonyl group.)

[Chem. 4]

Formula (3)

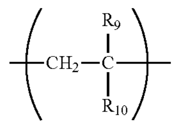

(In formula (3), $R_9$ represents a hydrogen atom or an alkyl group, and $R_{10}$ represents a phenyl group, a carboxyl group, a carboxylic acid ester group, or a carboxylic acid amide group.)

A second aspect of the invention relates to a pigment dispersant containing this compound.

A third aspect of the invention relates to a pigment composition having the aforementioned compound and a pigment.

A fourth aspect of the invention relates to a pigment dispersion having this pigment composition and a non-water-soluble solvent.

A fifth aspect of the invention relates to a toner having a toner particle containing a binder resin and a colorant. The colorant is the aforementioned pigment composition.

A compound and a pigment dispersant according to some aspects of the invention can improve the dispersibility of pigments of different colors such as yellow, magenta, cyan, and black can be improved. A pigment composition, a pigment dispersion, and a toner according to some other aspects of the invention can have good tint strength.

BRIEF DESCRIPTION OF DRAWINGS

FIG. 1 is a diagram that illustrates a $^{13}C$ NMR spectrum of compound (25) according to an embodiment of the invention in $CDCl_3$ at room temperature and 150 MHz.

FIG. 2 is a diagram that illustrates a $^{13}C$ NMR spectrum of compound (39) according to an embodiment of the invention in $CDCl_3$ at room temperature and 150 MHz.

FIG. 3 is a diagram that illustrates a $^{13}C$ NMR spectrum of compound (54) according to an embodiment of the invention in $CDCl_3$ at room temperature and 150 MHz.

FIG. 4 is a diagram that illustrates a $^{13}C$ NMR spectrum of compound (63) according to an embodiment of the invention in $CDCl_3$ at room temperature and 150 MHz.

FIG. 5 is a diagram that illustrates a $^{13}C$ NMR spectrum of compound (50) according to an embodiment of the invention in $CDCl_3$ at room temperature and 150 MHz.

FIG. 6 is a diagram that illustrates a $^{13}C$ NMR spectrum of compound (53) according to an embodiment of the invention in $CDCl_3$ at room temperature and 150 MHz.

DESCRIPTION OF EMBODIMENTS

The following describes certain aspects of the invention in detail by providing some preferred embodiments.

A compound according to an embodiment of the invention is a compound having a polymer having a monomer unit represented by formula (3). This compound has a partial structure represented by formula (1).

[Chem. 5]

Formula (1)

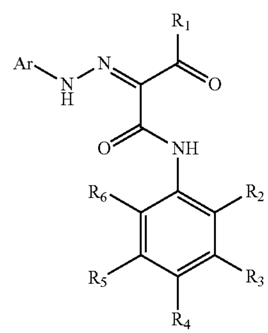

(In formula (1), $R_1$ represents an alkyl group or a phenyl group, Ar represents an aryl group, and Ar and $R_2$ to $R_6$ meet at least one of conditions (i) and (ii).

(i) Ar has a linking group that binds to a carbon atom of the aryl group and forms a linking portion where the partial structure binds to the polymer.

(ii) At least one of $R_2$ to $R_6$ is a linking group that forms a linking portion where the partial structure binds to the polymer.

Each of $R_2$ to $R_6$, when not being the linking group, independently represents a hydrogen atom, a halogen atom, an alkyl group, an alkoxy group, a hydroxyl group, a cyano group, a trifluoromethyl group, a carboxyl group, a group represented by formula (2-1), or a group represented by formula (2-2).

Ar and $R_2$ to $R_6$ meet at least one of conditions (iii) and (iv).

(iii) Ar has a group represented by formula (2-1) or a group represented by formula (2-2) as a substituent.

(iv) At least one of $R_2$ to $R_6$ is a group represented by formula (2-1) or a group represented by formula (2-2).)

[Chem. 6]

Formula (2-1)

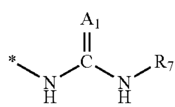

(In formula (2-1), the symbol * represents a site where the group binds to Ar or the aromatic ring having $R_2$ to $R_6$ in formula (1), $R_7$ represents a hydrogen atom, an alkyl group, an aralkyl group, an alkyloxycarbonyl group, or an aralkyloxycarbonyl group, and $A_1$ represents an oxygen atom, a sulfur atom, or an $NR_8$ group, where $R_8$ represents a hydrogen atom, an alkyloxycarbonyl group, or an aralkyloxycarbonyl group.)

[Chem. 7]

Formula (2-2)

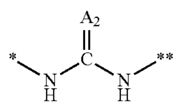

(In formula (2-2), the symbols * and ** represent sites where the group binds to Ar or the aromatic ring having $R_2$ to $R_6$ in formula (1), the group represented by formula (2-2) forming a five-member heterocycle by binding to Ar or the aromatic ring having $R_2$ to $R_6$ in formula (1), and $A_2$ represents an oxygen atom, a sulfur atom, or an $NR_{16}$ group, where $R_{16}$ represents a hydrogen atom, an alkyloxycarbonyl group, or an aralkyloxycarbonyl group.)

[Chem. 8]

Formula (3)

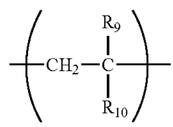

(In formula (3), $R_9$ represents a hydrogen atom or an alkyl group, and $R_{10}$ represents a phenyl group, a carboxyl group, a carboxylic acid ester group, or a carboxylic acid amide group.)

Hereinafter, a partial structure represented by formula (1) may be referred to as "an azo skeleton." The term "polymer moiety" may be used to specifically indicate a polymer having a monomer represented by formula (3). A compound in which a partial structure represented by formula (1) and a polymer having a monomer unit represented by formula (3) are linked to each other may be referred to as "an azo-skeleton-bearing compound." In a partial structure represented by formula (1), the linking group that forms a linking portion where the partial structure binds to the polymer may be simply referred to as "the linking group."

Azo-Skeleton-Bearing Compound

First, an azo-skeleton-bearing compound is described.

The azo-skeleton-bearing compound has an azo skeleton represented by formula (1) and a polymer having a monomer unit represented by formula (3). The azo skeleton is highly compatible with various pigments, and the polymer is highly compatible with non-water-soluble solvents.

Azo Skeleton

First, the azo skeleton is described in detail.

Examples of alkyl groups for $R_1$ in formula (1) include linear, branched, or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group.

An alkyl or phenyl group used as $R_1$ in formula (1) may have a substituent unless the substituent seriously affects the compatibility with pigments. Examples of substituents that may be present include a halogen atom, a nitro group, an amino group, a hydroxyl group, a cyano group, and a trifluoromethyl group.

$R_1$ in formula (1) may be a methyl group, among other listed groups, for the sake of compatibility with pigments.

As for $R_2$ to $R_6$ in formula (1), one or more of $R_2$ to $R_6$ may be a linking group that forms a linking portion where the azo skeleton binds to the polymer, among other listed groups, for the sake of compatibility with pigments.

Each of $R_2$ to $R_6$, when not being the linking group, independently represents a hydrogen atom, a halogen atom, an alkyl group, an alkoxy group, a hydroxyl group, a cyano group, a trifluoromethyl group, a carboxyl group, a group represented by formula (2-1), or a group represented by formula (2-2).

For the sake of ease in production, one or more of $R_2$ to $R_6$ may be the linking group with all of $R_2$ to $R_6$ that are not the linking group being a hydrogen atom.

Examples of aryl groups for Ar in formula (1) include a phenyl group and a naphthyl group.

Ar in formula (1) may have a substituent in addition to the linking group unless the substituent seriously affects the compatibility with pigments. Examples of substituents that may be present include a halogen atom, an alkyl group, an alkoxy group, a hydroxyl group, a cyano group, a trifluoromethyl group, a carboxyl group, a group represented by formula (2-1), and a group represented by formula (2-2).

In particular, Ar in formula (1) may have a group represented by formula (2-1) or a group represented by formula (2-2) as a substituent for the sake of compatibility with pigments. For the sake of ease in production, Ar may have a group represented by formula (2-1) or a group represented by formula (2-2) as the only substituent.

The partial structure represented by formula (1) meets at least one of conditions (i) and (ii) specified above, and ensuring this partial structure meets condition (ii) provides enhanced compatibility with pigments and more ease in production. The partial structure represented by formula (1) meets at least one of conditions (iii) and (iv) specified above, and ensuring this partial structure meets condition (iii) provides enhanced compatibility with pigments and more ease in production.

Ar in formula (1) may be a phenyl group, among other listed groups, for the sake of compatibility with pigments and ease in production. In other words, the partial structure represented by formula (1) may be a structure represented by formula (4).

[Chem. 9]

Formula (4)

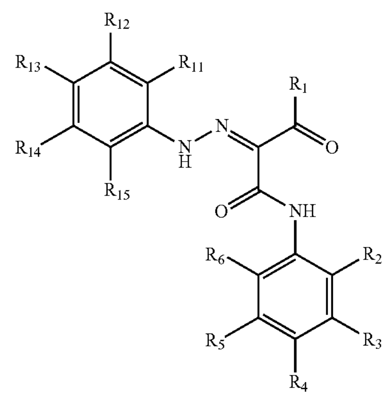

(In formula (4), $R_1$ represents an alkyl group or a phenyl group, and $R_{11}$ to $R_{15}$ and $R_2$ to $R_6$ meet at least one of conditions (v) and (vi).

(v) At least one of $R_{11}$ to $R_{15}$ is a linking group that forms a linking portion where the partial structure binds to the polymer.

(vi) At least one of $R_2$ to $R_6$ is a linking group that forms a linking portion where the partial structure binds to the polymer.

Each of $R_{11}$ to $R_{15}$ and $R_2$ to $R_6$, when not being the linking group, independently represents a hydrogen atom, a halogen atom, an alkyl group, an alkoxy group, a hydroxyl group, a cyano group, a trifluoromethyl group, a carboxyl group, a group represented by formula (2-1), or a group represented by formula (2-2).

$R_{11}$ to $R_{15}$ and $R_2$ to $R_6$ meet at least one of conditions (vii) and (viii).

(vii) At least one of $R_{11}$ to $R_{15}$ is a group represented by formula (2-1) or a group represented by formula (2-2).

(viii) At least one of $R_2$ to $R_6$ is a group represented by formula (2-1) or a group represented by formula (2-2).)

As for $R_{11}$ to $R_{15}$ in formula (4), one or more of $R_{11}$ to $R_{15}$ may be a group represented by formula (2-1) or a group represented by formula (2-2), among other listed groups, for the sake of compatibility with pigments. For the sake of ease in production, all of $R_{11}$ to $R_{15}$ that are not a group represented by formula (2-1) or formula (2-2) may be hydrogen atoms.

Examples of alkyl groups for $R_7$ in formula (2-1) include linear, branched, or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group.

Examples of aralkyl groups for $R_7$ in formula (2-1) include a benzyl group and a phenethyl group.

Examples of alkyloxycarbonyl groups (—C(═O)—O-alkyl) for $R_7$ in formula (2-1) include a methoxycarbonyl group, an ethoxycarbonyl group, an n-propoxycarbonyl group, an isopropoxycarbonyl group, an n-butoxycarbonyl group, an isobutoxycarbonyl group, a sec-butoxycarbonyl group, a tert-butoxycarbonyl group, an n-pentyloxycarbonyl group, and n-hexyloxycarbonyl group.

Examples of aralkyloxycarbonyl groups (—C(═O)—O-aralkyl) for $R_7$ in formula (2-1) include a benzyloxycarbonyl group and a phenethyloxycarbonyl group.

An alkyl, aralkyl, alkyloxycarbonyl, or aralkyloxycarbonyl group used as $R_7$ in formula (2-1) may have a substituent unless the substituent seriously affects the compatibility with pigments. Examples of substituents that may be present include a halogen atom, a nitro group, an amino group, a hydroxyl group, a cyano group, and a trifluoromethyl group.

$R_7$ in formula (2-1) may be a hydrogen atom, a methyl group, or an ethyl group, among other listed groups, for the sake of compatibility with pigments.

It is also possible to use a structure represented by formula (2-2) instead of a structure represented by formula (2-1). When A in formula (2-2) is an oxygen atom, for example, the five-member heterocycle formed is a 2-imidazolone ring. A sulfur atom gives a 2-imidazolidinethione ring, and an NH group gives a 2-iminoimidazolidine ring.

Examples of alkyloxycarbonyl groups for $R_8$ in formula (2-1) and $R_{16}$ in formula (2-2) include a methoxycarbonyl group, an ethoxycarbonyl group, an n-propoxycarbonyl group, an isopropoxycarbonyl group, an n-butoxycarbonyl group, an isobutoxycarbonyl group, a sec-butoxycarbonyl group, a tert-butoxycarbonyl group, an n-pentyloxycarbonyl group, and n-hexyloxycarbonyl group.

Examples of aralkyloxycarbonyl groups for $R_8$ in formula (2-1) and $R_{16}$ in formula (2-2) include a benzyloxycarbonyl group and a phenethyloxycarbonyl group.

An alkyl, alkyloxycarbonyl, or aralkyloxycarbonyl group used as $R_8$ in formula (2-1) or $R_{16}$ in formula (2-2) may have a substituent unless the substituent seriously affects the compatibility with pigments. Examples of substituents that may be present include a halogen atom, a nitro group, an amino group, a hydroxyl group, a cyano group, and a trifluoromethyl group.

$R_8$ in formula (2-1) and $R_{16}$ in formula (2-2) may be a hydrogen atom, a tert-butoxycarbonyl group, or a benzyloxycarbonyl group, among other listed groups, for the sake of ease in production.

$A_1$ in formula (2-1) and $A_2$ in formula (2-2) can be freely selected from an oxygen atom, a sulfur atom, and an $NR_8$ group, and they may be an oxygen atom for the sake of compatibility with pigments and ease in production.

The number of substitutions of the polymer that binds to the partial structure represented by formula (1) or (4) is not limited, and this polymer may have one or two substitutions for the sake of ease in production.

The linking group can be any kind of divalent linking group, and examples include a linking group having a carboxylic acid ester bond, a linking group having a sulfonic acid ester bond, a linking group having a carboxylic acid amide bond. The linking group may have a carboxylic acid ester bond or a carboxylic acid amide bond for the sake of ease in production.

The partial structure represented by formula (1) or (4) may have any kind of substituent to form the linking group. Examples include a substituent having a hydroxyl group, a substituent having a sulfonic acid group, a substituent having an amino group, and a substituent having a carboxyl group.

Examples of substituents having a hydroxyl group include a hydroxyl group, hydroxyalkyl groups such as a hydroxymethyl group, a hydroxyethyl group, and a hydroxypropyl group, and groups represented by $—R_{53}—O—R_{54}—OH$ (each of $R_{53}$ and $R_{54}$ independently represents an alkylene group containing one to four carbon atoms).

Examples of substituents having a sulfonic acid group include a sulfonic acid group and sulfoalkyl groups such as a sulfomethyl group, a sulfoethyl group, and a sulfopropyl group.

Examples of substituents having an amino group include an amino group and aminoalkyl groups such as an aminomethyl group, an aminoethyl group, and an aminopropyl group.

Examples of substituents having a carboxyl group include a carboxyl group and carboxyalkyl groups such as a carboxymethyl group, a carboxyethyl group, and a carboxypropyl group.

The linking group that links the partial structure represented by formula (1) to the polymer moiety may have a carboxylic acid ester bond or a carboxylic acid amide bond for the sake of compatibility with pigments and ease in production. If the polymer and the azo skeleton represented by formula (1) or (4) bind together through a functional group derived from the polymer, such as a carboxylic acid ester bond (—COO—), the binding site including this functional group is referred to as a linking group.

Specific examples of the linking group include the following $L_1$ to $L_9$.

[Chem.10]

$L_1$ $$*—\underset{\underset{O}{\|}}{C}—\overset{H}{N}—**$$

-continued

[Chem.11]

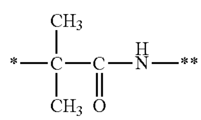

$L_2$

[Chem.12]

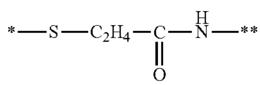

$L_3$

[Chem.13]

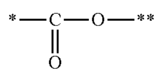

$L_4$

[Chem.14]

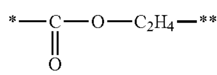

$L_5$

[Chem.15]

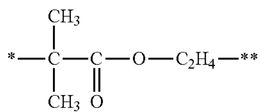

$L_6$

[Chem.16]

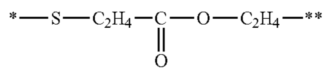

$L_7$

[Chem.17]

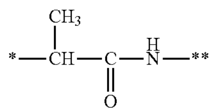

$L_8$

[Chem.18]

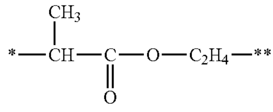

$L_9$ (The symbol "*" in $L_1$ to $L_9$ represents a site where the group binds to a carbon atom of the polymer moiety having a monomer unit represented by formula (3). The symbol "**" in $L_1$ to $L_9$ represents a site where the group binds to a carbon atom of the aromatic ring of Ar or a carbon atom of the aromatic ring having $R_2$ to $R_6$ in the partial structure represented by formula (1).)

Polymer Moiety of an Azo-Skeleton-Bearing Compound

The aforementioned polymer moiety is described.

Examples of alkyl groups for $R_9$ in formula (3) include linear, branched, or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group, although any kind of alkyl group can be used.

$R_9$ in formula (3) may be a hydrogen atom or a methyl group, among other listed groups, for the sake of the polymerizability of the polymerizable monomer that forms the monomer unit.

Examples of carboxylic acid ester groups for $R_{10}$ in formula (3) include linear or branched ester groups such as a methyl ester group, an ethyl ester group, an n-propyl ester group, an isopropyl ester group, an n-butyl ester group, an isobutyl ester group, a sec-butyl ester group, a tert-butyl ester group, an octyl ester group, a nonyl ester group, a decyl ester group, an undecyl ester group, a dodecyl ester group, a hexadecyl ester group, an octadecyl ester group, an eicosyl ester group, a docosyl ester group, a 2-ethylhexyl ester group, a phenyl ester group, a benzyl ester group, and a 2-hydroxyethyl ester group, although any kind of carboxylic acid ester group can be used.

Examples of carboxylic acid amide groups for $R_{10}$ in formula (3) include linear or branched amide groups such as an N-methyl amide group, an N,N-dimethyl amide group, an N-ethyl amide group, an N,N-diethyl amide group, an N-isopropyl amide group, an N,N-diisopropyl amide group, an N-n-butyramide group, an N,N-di-n-butyramide group, an N-isobutyramide group, an N,N-diisobutyramide group, an N-sec-butyramide group, an N,N-di-sec-butyramide group, an N-tert-butyramide group, an N-octyl amide group, an N,N-dioctyl amide group, an N-nonyl amide group, an N,N-dinonyl amide group, an N-decyl amide group, an N,N-didecyl amide group, an N-undecyl amide group, an N,N-diundecyl amide group, an N-dodecyl amide group, an N,N-didodecyl amide group, an N-hexadecyl amide group, an N-octadecyl amide group, an N-phenyl amide group, an N-(2-ethylhexyl)amide group, and an N,N-di(2-ethylhexyl) amide group, although any kind of carboxylic amide group can be used.

$R_{10}$ in formula (3) may have a substituent unless the substituent damages the polymerizability of the polymerizable monomer that forms the monomer unit or seriously affects the solubility of the azo-skeleton-bearing compound. Examples of substituents that may be present include alkoxy groups such as a methoxy group and an ethoxy group, amino groups such as an N-methylamino group and an N,N-dimethylamino group, acyl groups such as an acetyl group, and halogen atoms such as a fluorine atom and an chlorine atom.

$R_{10}$ in formula (3) may be a phenyl group or a carboxylic acid ester group, among other listed groups, for the sake of the dispersibility and solubility of the azo-skeleton-bearing compound in a medium.

The polymer moiety can have its compatibility with dispersion media controlled through the adjustment of the proportions of monomer units represented by formula (3). When the dispersion medium is a nonpolar solvent, e.g., styrene, increasing the proportion of a monomer unit having a phenyl group as $R_{10}$ in formula (3) provides enhanced compatibility with the dispersion medium. When the dispersion medium is a solvent having some polarity, e.g., an acrylic acid ester, increasing the proportion of a monomer unit having a carboxyl group, a carboxylic acid ester group, or a carboxylic acid amide group as $R_{10}$ in formula (3) provides enhanced compatibility with the dispersion medium.

The polymer may contain, for the sake of ease in production, a monomer unit whose $R_{10}$ is a carboxyl group through which the polymer forms a carboxylic acid ester bond or a carboxylic acid amide bond with one or more of $R_2$ to $R_6$ and Ar.

Furthermore, the polymer may have a terminal carboxyl group. The polymer may bind to the azo skeleton through this carboxyl group. In such a case, the carboxyl group may bind to one or more of $R_2$ to $R_6$ and Ar through a carboxylic acid ester bond or a carboxylic acid amide bond.

Examples of ways to introduce a terminal carboxyl group to the polymer moiety include the ATRP (atom transfer radical polymerization) described hereinafter, the use of a polymerization initiator having a carboxyl group, and the use of a mercaptan-based chain-transfer agent having a carboxyl group.

As for the molecular weight of the polymer moiety, the number-average molecular weight may be 500 or more for effective improvement of the dispersibility of a pigment. The number-average molecular weight of the polymer moiety may be 200000 or less for improved compatibility with non-water-soluble solvents. Preferably, the number-average molecular weight of the polymer moiety is in the range of 2000 to 50000 for the sake of ease in production.

As disclosed in PCT Japanese Translation Patent Publication No. 2003-531001, it is known that introducing a branched terminal aliphatic chain to a polyoxyalkylenecarbonyl-based dispersant improves the dispersibility of the dispersant. A polymer moiety according to an embodiment of the invention can also be given a branched terminal aliphatic chain through the use of a method that allows a telechelic polymer moiety to be synthesized, such as the ATRP described hereinafter.

As for the arrangement of the azo skeleton in the azo-skeleton-bearing compound, this structure may be distributed at random or localized at either end forming one or multiple blocks.

The number of azo skeletons in the azo-skeleton-bearing compound can be in the range of 0.5 to 10, preferably 0.5 to 5, per 100 monomers forming the polymer moiety for the sake of the balance between the compatibility with pigments and the compatibility with dispersion media.

In addition, an azo skeleton represented by formula (1) has tautomers represented by formulae (5) and (6), and these tautomers also fall within the scope of certain aspects of the invention claimed.

[Chem.19]

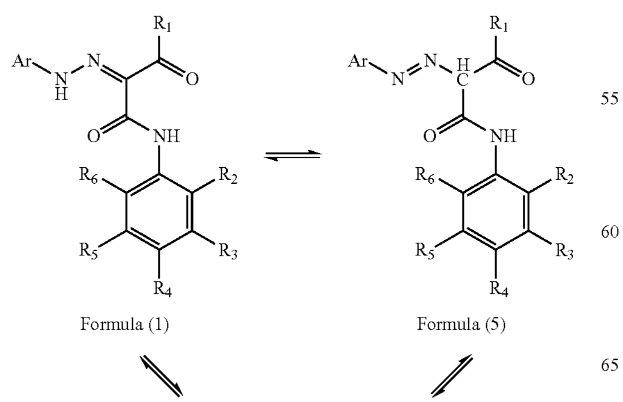

-continued

Formula (6)

($R_1$ to $R_6$ and Ar in formulae (5) and (6) have the same meaning as $R_1$ to $R_6$ and Ar, respectively, in formula (1).)

Method for Producing an Azo-Skeleton-Bearing Compound

A method for producing an azo-skeleton-bearing compound according to an embodiment of the invention is described in detail.

Known methods can be used to synthesize the azo-skeleton-bearing compound.

Specific examples of methods for synthesizing an azo-skeleton-bearing compound include methods (i) to (iv).

First, method (i) is described in detail with reference to an illustrative scheme below.

In method (i), an azo skeleton and a polymer moiety are individually synthesized first, and then the azo skeleton and the polymer moiety are combined through condensation reaction to form an azo-skeleton-bearing compound.

Method (i)

[Chem.20]

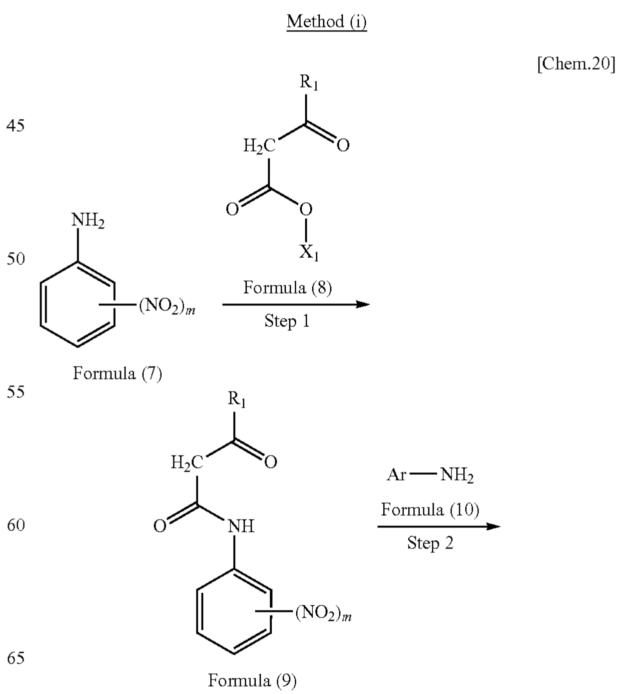

-continued

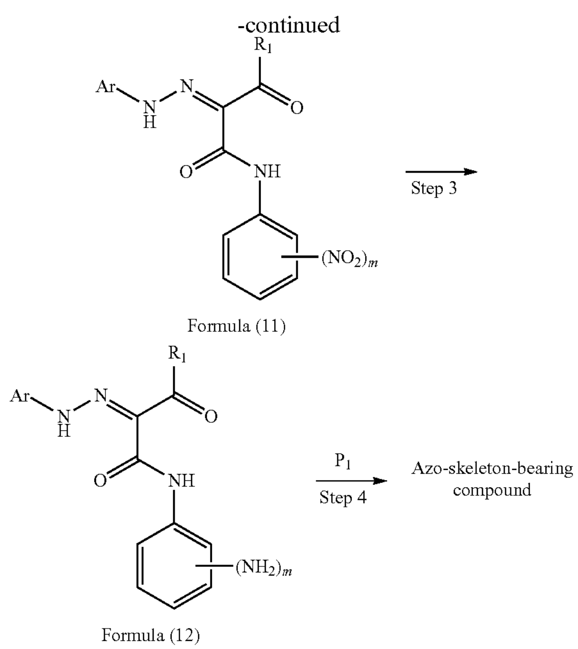

($R_1$ and Ar in formulae (7) to (12) have the same meaning as $R_1$ and Ar, respectively, in formula (1). $X_1$ in formula (8) represents a leaving group. $P_1$ represents a polymer moiety obtained through the polymerization of a polymerizable monomer that forms a monomer unit represented by formula (3). The character m in formulae (7), (9), (11), and (12) represents an integer of 1 or 2.)

The illustrated scheme of method (i) allows one to synthesize an azo-skeleton-bearing compound represented by formula (1) through steps 1 to 4. In step 1, a nitroaniline derivative represented by formula (7) is amidated with an acetoacetic acid analogue represented by formula (8) to form an intermediate (9), which is an acyl acetanilide analogue. In step 2, the intermediate (9) and an aniline derivative (10) are diazo-coupled to form an azo compound (11). In step 3, the nitro group(s) of the azo compound (11) is reduced to form an azo compound (12). In step 4, the azo compound (12) and a polymer moiety $P_1$ are combined through condensation reaction or using any other way.

First, step 1 is described.

Known processes can be used in step 1. For example, refer to Datta E. Ponde and other four, "The Journal of Organic Chemistry" (US), American Chemical Society, 1998, Vol. 63, No. 4, pp. 1058-1063. When $R_1$ in formula (9) is a methyl group, the product can also be synthesized through a process in which the raw material (8) is replaced with a diketene. For example, refer to Kiran Kumar Solingapuram Sai and other two, "The Journal of Organic Chemistry" (US), American Chemical Society, 2007, Vol. 72, No. 25, pp. 9761-9764.

The nitroaniline derivative (7) and the acetoacetic acid analogue (8) can be easily obtained as they have a wide variety of commercially available options. These materials can also be easily synthesized using known processes.

Although step 1 can be performed without solvent, the presence of solvent prevents the reaction from proceeding too rapidly. Examples of solvents that can be used include alcohols such as methanol, ethanol, and propanol, esters such as methyl acetate, ethyl acetate, and propyl acetate, ethers such as diethyl ether, tetrahydrofuran, and dioxane, hydrocarbons such as benzene, toluene, xylene, hexane, and heptane, halogenated hydrocarbons such as dichloromethane, dichloroethane, and chloroform, amides such as N,N-dimethylformamide, N-methylpyrrolidone, and N,N-dimethylimidazolidinone, nitriles such as acetonitrile and propionitrile, acids such as formic acid, acetic acid, and propionic acid, and water, although any kind of solvent can be used unless it inhibits the reaction. A mixture of two or more such solvents may optionally be used, and the mixing ratio of solvents in combination use can be freely determined according to the solubility of the substrate. The amount of use of the solvent can be freely determined, and it may be in the range of 1.0 to 20 times the mass of the compound represented by formula (7) for the sake of the reaction rate.

Step 1 is usually performed within a temperature range of 0 to 250 degrees Celsius and usually ends within 24 hours.

Next, step 2 is described.

Known processes can be used in step 2. A specific example is the process described below. First, in a methanol solvent an aniline derivative (10) is allowed to react with a diazotizing agent, such as sodium nitrite or nitrosylsulfuric acid, in the presence of an inorganic acid, such as hydrochloric acid or sulfuric acid, to form the corresponding diazonium salt. This diazonium salt is then coupled with the intermediate (9) to form an azo compound (11).

The aniline derivative (10) can be easily obtained as it has a wide variety of commercially available options. This material can also be easily synthesized using known processes.

Although step 2 can be performed without solvent, the presence of solvent prevents the reaction from proceeding too rapidly. Examples of solvents that can be used include alcohols such as methanol, ethanol, and propanol, esters such as methyl acetate, ethyl acetate, and propyl acetate, ethers such as diethyl ether, tetrahydrofuran, and dioxane, hydrocarbons such as benzene, toluene, xylene, hexane, and heptane, halogenated hydrocarbons such as dichloromethane, dichloroethane, and chloroform, amides such as N,N-dimethylformamide, N-methylpyrrolidone, and N,N-dimethylimidazolidinone, nitriles such as acetonitrile and propionitrile, acids such as formic acid, acetic acid, and propionic acid, and water, although any kind of solvent can be used unless it inhibits the reaction. A mixture of two or more such solvents may optionally be used, and the mixing ratio of solvents in combination use can be freely determined according to the solubility of the substrate. The amount of use of the solvent can be freely determined, and it may be in the range of 1.0 to 20 times the mass of the compound represented by formula (9) for the sake of the reaction rate.

Step 2 is usually performed within a temperature range of −50 to 100 degrees Celsius and usually ends within 24 hours.

Next, step 3 is described.

Known processes can be used in step 3. A specific example of a process in which materials including a metal compound are used is that described in the second series of "Jikken Kagaku Koza" (Experimental Chemistry), Maruzen Publishing, Vol. 17-2, pp. 162-179. Examples of catalytic hydrogenation processes that can be used include ones described in literature such as the first series of "Shin Jikken Kagaku Koza" (New Experimental Chemistry). Maruzen Publishing, Vol. 15, pp. 390-448 and WO 2009/060886.

Although step 3 can be performed without solvent, the presence of solvent prevents the reaction from proceeding too rapidly. Examples of solvents that can be used include alcohols such as methanol, ethanol, and propanol, esters such as methyl acetate, ethyl acetate, and propyl acetate, ethers such as diethyl ether, tetrahydrofuran, and dioxane, hydrocarbons such as benzene, toluene, xylene, hexane, and heptane, halogenated hydrocarbons such as dichloromethane, dichloroethane, and chloroform, and amides such as N,N-dimethylformamide, N-methylpyrrolidone, and N,N-dimethylimidazolidinone, although any kind of solvent can be used unless it inhibits the reaction. A mixture of two or more such solvents may optionally be used, and the mixing ratio of solvents in combination use can be freely determined. The amount of use of the solvent can be freely determined according to the solubility of the substrate, and it may be in the range of 1.0 to 20 times the mass of the compound represented by formula (11) for the sake of the reaction rate.

This step is usually performed within a temperature range of 0 to 250 degrees Celsius and usually ends within 24 hours.

A process for synthesizing the polymer moiety $P_1$, which is used in step 4, is described.

The polymer moiety $P_1$, can be synthesized using known polymerization processes (e.g., Krzysztof Matyjaszewski and another, “Chemical Reviews” (US), American Chemical Society, 2001, Vol. 101, pp. 2921-2990).

Specific examples of polymerization processes used to synthesize the polymer moiety include radical polymerization, cationic polymerization, and anionic polymerization, and radical polymerization, in particular, may be used for the sake of ease in production.

Radical polymerization can be performed through the use of a radical polymerization initiator, irradiation with, for example, radiation or laser light, the use of a photopolymerization initiator in combination with irradiation with light, and heating.

The radical polymerization initiator, which can be any kind of compound that initiates polymerization reaction by producing a radical, is selected from compounds that produce a radical in response to heat, light, radiation, or a redox reaction. Examples include azo compounds, organic peroxides, inorganic peroxides, organic metal compounds, and photopolymerization initiators. Specific examples include azo polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and 4,4'-azobis(4-cyanovaleric acid), organic-peroxide-based polymerization initiators such as benzoyl peroxide, di-tert-butyl peroxide, tert-butyl peroxyisopropyl carbonate, and tert-hexyl peroxybenzoate, and tert-butyl peroxybenzoate, inorganic-peroxide-based polymerization initiators such as potassium persulfate and ammonium persulfate, and redox initiators such as those based on ferrous hydrogen peroxide, benzoyl peroxide-dimethyl aniline, or cerium (IV) salt-alcohols. Examples of photopolymerization initiators include benzophenones, benzoin ethers, acetophenones, and thioxanthones. A combination of two or more such radical polymerization initiators may optionally be used.

The amount of the polymerization initiator used in this process can be adjusted within the range of 0.1 to 20 parts by mass per 100 parts by mass of the polymerizable monomer so that the copolymer should be obtained with a desired molecular weight distribution.

The polymer moiety represented by $P_1$ can also be produced using any kind of polymerization process selected from solution polymerization, suspension polymerization, emulsification polymerization, dispersion polymerization, precipitation polymerization, and bulk polymerization. In particular, it can be produced through solution polymerization in a solvent that dissolves the individual components for production, although this is not the only possible process. Specific examples of solvents that can be used include alcohols such as methanol, ethanol, and 2-propanol, ketones such as acetone and methyl ethyl ketone, ethers such as tetrahydrofuran and diethyl ether, polar organic solvents such as ethylene glycol monoalkyl ethers and their acetates, propylene glycol monoalkyl ethers and their acetates, and diethylene glycol monoalkyl ethers, and nonpolar solvents such as toluene and xylene as well as mixtures of such solvents. Any single or a mixture of solvents whose boiling point falls within a temperature range of 100 to 180 degrees Celsius can be used in particular.

The polymerization temperature depends on the kind of the polymerization initiator used and is not limited to any particular range. More specifically, the polymerization can usually be performed within the temperature range of −30 to 200 degrees Celsius, preferably 40 to 180 degrees Celsius.

The polymer moiety represented by $P_1$, can have its molecular weight distribution and molecular structure controlled through the use of known methods. More specifically, the polymer moiety $P_1$, can be produced with a controlled molecular weight distribution and a controlled molecular structure using methods such as ones in which an addition-fragmentation chain-transfer agent is used (see Japanese Patent Nos. 4254292 and 3721617), NMP processes based on the dissociation and binding of an amine oxide radical (e.g., Craig J. Hawker and other two, “Chemical Reviews” (US), American Chemical Society, 2001, Vol. 101, pp. 3661-3688). ATRP processes in which polymerization is initiated using a metal catalyst and a ligand with a halogen compound as a polymerization initiator (e.g., Masami Kamigaito and other two, “Chemical Reviews” (US), American Chemical Society, 2001, Vol. 101, pp. 3689-3746), RAFT processes in which the polymerization initiator is a compound such as a dithiocarboxylic acid ester or a xanthate compound (e.g., PCT Japanese Translation Patent Publication No. 2000-515181) as well as the MADIX process (e.g., WO 99/05099) and the DT process (e.g., Atsushi Goto and other six, “Journal of The American Chemical Society” (US), American Chemical Society, 2003, Vol. 125, pp. 8720-8721).

Next, step 4 is described.

In step 4, known processes can be used to initiate reaction between a polymer moiety $P_1$ having a carboxyl group and the amino group(s) of the azo compound (12) to synthesize an azo-skeleton-bearing compound in which the linking group has a carboxylic acid amide bond. Specific examples of processes that can be used include ones based on the use of a dehydration-condensation agent, such as 1-ethyl-3-(3-dimethylaminopropyl)carbodiimide hydrochloride (e.g., Melvin S. Newman and another, “The Journal of Organic Chemistry” (US), American Chemical Society, 1961, Vol. 26, No. 7, pp. 2525-2528), and the Schotten-Baumann method (e.g., Norman O. V. Sonntag, “Chemical Reviews” (US), American Chemical Society, 1953, Vol. 52, No. 2, pp. 237-416).

Although step 4 can be performed without solvent, the presence of solvent prevents the reaction from proceeding too rapidly. Any kind of solvent can be used unless it inhibits the reaction. Examples include ethers such as diethyl ether, tetrahydrofuran, and dioxane, hydrocarbons such as benzene, toluene, xylene, hexane, and heptane, halogenated hydrocarbons such as dichloromethane, dichloroethane, and chloroform, amides such as N,N-dimethylformamide, N-methylpyrrolidone, and N,N-dimethylimidazolidinone, and nitriles such as acetonitrile and propionitrile. If the solubility of the substrate necessitates, a mixture of two or more such solvents may be used, and the mixing ratio of solvents in combination use can be freely determined. The amount of use of the solvent can be freely determined, and it may be in the range of 1.0 to 20 times the mass of the polymer moiety represented by $P_1$, for the sake of the reaction rate.

Step 4 is usually performed within a temperature range of 0 to 250 degrees Celsius and usually ends within 24 hours.

Next, method (ii) is described in detail with reference to an illustrative scheme below.

In method (ii), an azo compound having a substituent that forms the linking group through which the azo compound binds to a polymer moiety is synthesized, the substituent located at a position different from that in method (i) ($Ar_1$ in formula (16)), and the azo compound and the polymer moiety are combined through condensation reaction to form an azo-skeleton-bearing compound.

Method (ii)

[Chem.21]

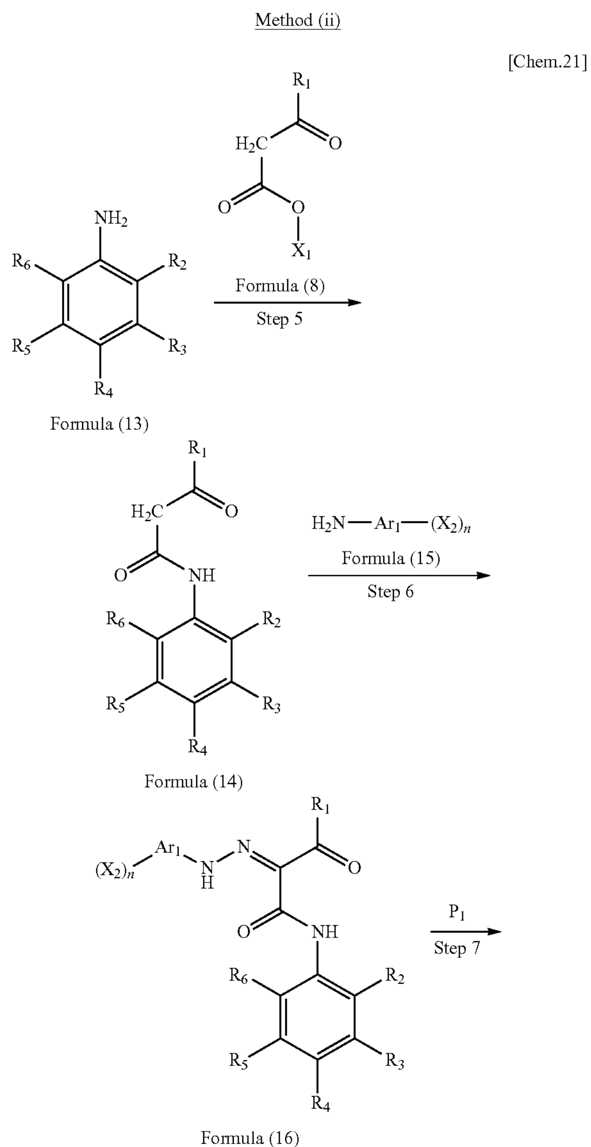

($R_1$ to $R_6$ in formulae (13) to (16) have the same meaning as $R_1$ to $R_6$ in formula (1). $X_1$ and $P_1$ have the same meaning as $X_1$ and $P_1$ in the scheme of method (i). $Ar_1$ in formulae (15) and (16) represents an arylene group. $X_2$ in formulae (15) and (16) represents a substituent that forms a divalent linking group by reacting with $P_1$, and n represents an integer of 1 or 2.)

The illustrated scheme of method (ii) allows one to synthesize an azo-skeleton-bearing compound through steps 5 to 7. In step 5, an aniline derivative represented by formula (13) is amidated with an acetoacetic acid analogue represented by formula (8) to form an intermediate (14), which is an acyl acetanilide analogue. In step 6, the intermediate (14) and an aniline derivative (15) are diazo-coupled to form an azo compound (16). In step 7, the azo compound (16) and a polymer moiety $P_1$ are combined through condensation reaction or using any other way.

First, step 5 is described.

In step 5, an intermediate (14) that is an acyl acetanilide analogue is synthesized as in step 1 of method (i).

Next, step 6 is described.

In step 6, an azo compound (16) can be synthesized as in step 2 in method (i).

The aniline derivative (15) can be easily obtained as it has a wide variety of commercially available options. This material can also be easily synthesized using known processes.

Next, step 7 is described.

In step 7, an azo-skeleton-bearing compound can be obtained through condensation reaction or any other way of interaction between an azo compound (16) and a polymer moiety $P_1$ as in the synthesis of a polymer moiety $P_1$ in method (i). To take a specific example, the use of a polymer moiety $P_1$ having a carboxyl group with an azo compound (16) in which $X_2$ is a substituent having a hydroxyl group gives an azo-skeleton-bearing compound in which the linking group has a carboxylic acid ester bond. Likewise, the use of a polymer moiety $P_1$ having a carboxyl group with an azo compound (16) in which $X_2$ is a substituent having an amino group gives an azo-skeleton-bearing compound in which the linking group has a carboxylic acid amide bond.

Next, method (iii) is described in detail with reference to an illustrative scheme below.

In method (iii), an azo compound having a polymerizable functional group is synthesized first, and then this azo compound and a polymerizable monomer that forms a monomer unit represented by formula (3) are copolymerized to form an azo-skeleton-bearing compound.

Method (iii)

[Chem.22]

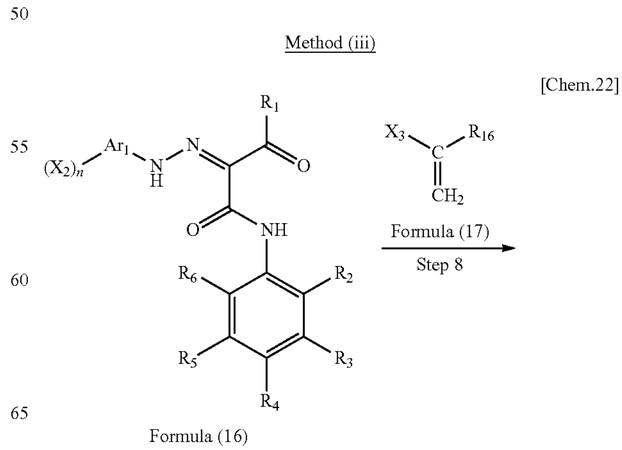

-continued

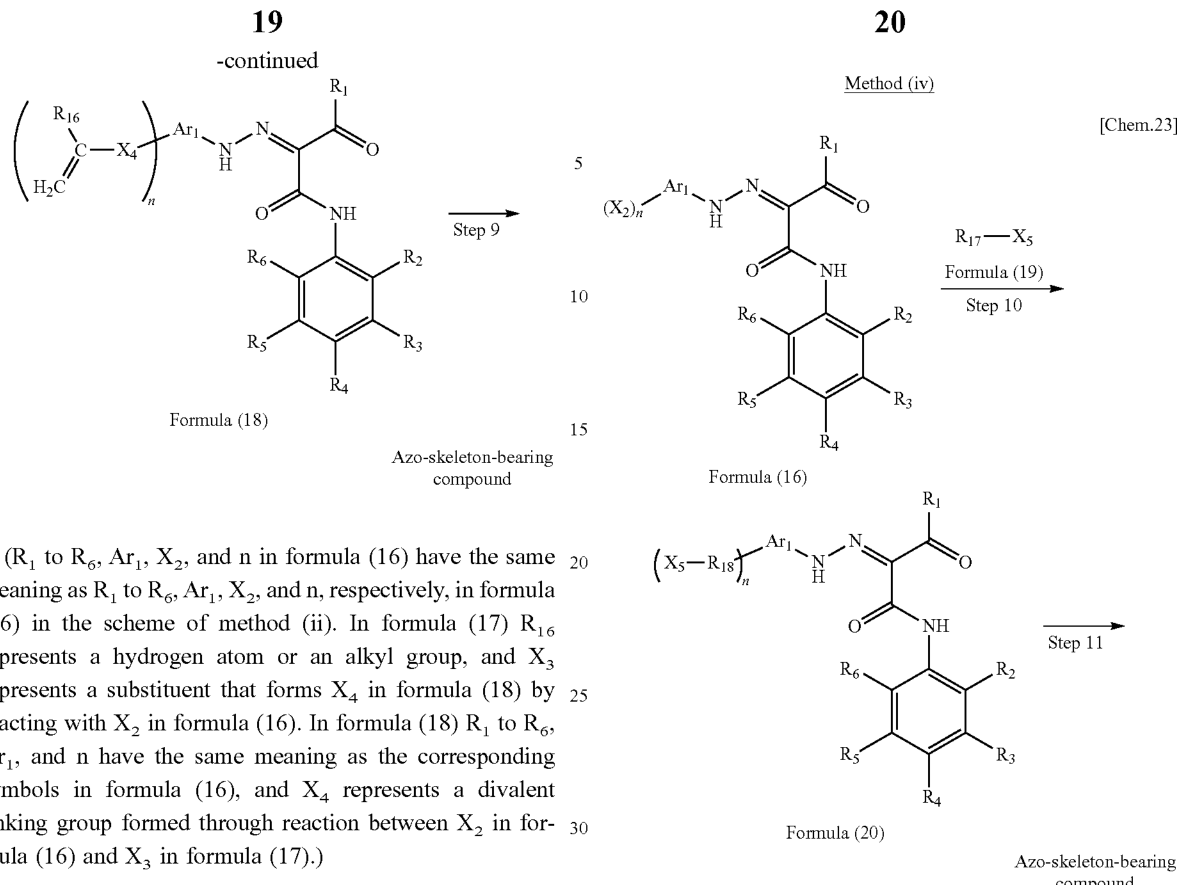

($R_1$ to $R_6$, $Ar_1$, $X_2$, and n in formula (16) have the same meaning as $R_1$ to $R_6$, $Ar_1$, $X_2$, and n, respectively, in formula (16) in the scheme of method (ii). In formula (17) $R_{16}$ represents a hydrogen atom or an alkyl group, and $X_3$ represents a substituent that forms $X_4$ in formula (18) by reacting with $X_2$ in formula (16). In formula (18) $R_1$ to $R_6$, $Ar_1$, and n have the same meaning as the corresponding symbols in formula (16), and $X_4$ represents a divalent linking group formed through reaction between $X_2$ in formula (16) and $X_3$ in formula (17).)

The illustrated scheme of method (iii) allows one to synthesize an azo-skeleton-bearing compound through steps 8 and 9. In step 8, an azo compound (16) reacts with a vinyl-containing compound represented by formula (17), thereby forming an azo compound (18) having a polymerizable functional group. In step 9, the azo compound (18) having a polymerizable functional group is copolymerized with a polymerizable monomer that forms a monomer unit represented by formula (3).

First, step 8 is described.

In step 8, an azo compound (18) having a polymerizable functional group can be synthesized as in step 4 of method (i).

In step 9, an azo-skeleton-bearing compound can be synthesized through the copolymerization of the azo skeleton (18) and a polymerizable monomer that forms a monomer unit represented by formula (3) as in the synthesis of $P_1$ in method (i).

Next, method (iv) is described in detail with reference to an illustrative scheme below.

In method (iv), a halogenated azo compound is synthesized first, and then this halogenated azo compound, which serves as a polymerization initiator, and a polymerizable monomer that forms a monomer unit represented by formula (3) are copolymerized to form an azo-skeleton-bearing compound.

($R_1$ to $R_6$, $Ar_1$, $X_2$, and n in formula (16) have the same meaning as $R_1$ to $R_6$, $Ar_1$, $X_2$, and n, respectively, in formula (16) in the scheme of method (ii). In formula (19) $R_{17}$ represents a substituent that forms $R_{18}$ in formula (22) by reacting with X2 in formula (16), and $X_5$ represents a chlorine atom, a bromine atom, or an iodine atom. In formula (20) $R_1$ to $R_4$, $Ar_1$, and n have the same meaning as the corresponding symbols in formula (16), and $R_{18}$ represents a divalent linking group formed through reaction between $X_2$ in formula (16) and $R_{17}$ in formula (19).)

The illustrated scheme allows one to synthesize an azo-skeleton-bearing compound through steps 10 and 11. In step 10, an azo compound (16) reacts with a halogenated compound represented by formula (19), thereby forming a halogenated azo compound (20). In step 1, the halogenated azo compound (20), which serves as a polymerization initiator, and a polymerizable monomer that forms a monomer unit represented by formula (3) are copolymerized.

First, step 10 is described.

In step 10, a halogenated azo compound (20) can be synthesized as in step 4 of method (i). To take a specific example, the use of a halogenated compound (19) having a carboxyl group with an azo compound (16) in which $X_2$ is a substituent having a hydroxyl group gives a halogenated azo compound (20). Likewise, the use of a halogenated compound (19) having a carboxyl group and an azo compound (16) in which $X_2$ is a substituent having an amino group gives a halogenated azo compound (20).

Examples of the halogenated compound (19) having a carboxyl group include chloroacetic acid, alpha-chloropropionic acid, alpha-chlorobutyric acid, alpha-chloroisobutyric acid, alpha-chlorovaleric acid, alpha-chloroisovaleric acid, alpha-chlorocaproic acid, alpha-chlorophenyl acetic acid, alpha-chlorodiphenyl acetic acid, alpha-chloro-alpha-phenyl propionic acid, alpha-chloro-beta-phenyl propionic acid, bromoacetic acid, alpha-bromopropionic acid, alpha-bromobutyric acid, alpha-bromoisobutyric acid, alpha-bromovaleric acid, alpha-bromoisovaleric acid, alpha-bromocaproic acid, alpha-bromophenyl acetic acid, alpha-bromodiphenyl acetic acid, alpha-bromo-alpha-phenyl propionic acid, alpha-bromo-beta-phenyl propionic acid, iodoacetic acid, alpha-iodopropionic acid, alpha-iodobutyric acid, alpha-iodoisobutyric acid, alpha-iodovaleric acid, alpha-iodoisovaleric acid, alpha-iodocaproic acid, alpha-iodophenyl acetic acid, alpha-iododiphenyl acetic acid, alpha-iodo-alpha-phenyl propionic acid, alpha-iodo-beta-phenyl propionic acid, beta-chlorobutyric acid, beta-bromoisobutyric acid, iododimethyl methyl benzoic acid, and 1-chloroethyl benzoic acid. Their acid halides and acid anhydrides can also be used in an embodiment of the invention.

Next, step 11 is described.

In step 11, an azo-skeleton-bearing compound can be synthesized using the ATRP processes mentioned in method (ii). More specifically, a halogenated azo compound (20), which serves as a polymerization initiator, and a polymerizable monomer that forms a monomer unit represented by formula (3) are copolymerized in the presence of a metal catalyst and a ligand.

In ATRP processes any kind of metal catalyst can be used, and it is possible to use at least one transition metal selected from Groups 7 to 11 in the periodic table. Specific examples of low-valent metals used in redox catalysts (redox conjugate complexes), which are catalysts that reversibly switch between a low-valent complex and a high-valent complex, include metals selected from the group consisting of $Cu^{+}$, $Ni^{0}$, $Ni^{+}$, $Ni^{2+}$, $Pd^{0}$, $Pd^{+}$, $Pt^{0}$, $Pt^{+}$, $Pt^{2+}$, $Rh^{+}$, $Rh^{2+}$, $Rh^{3+}$, $Co^{+}$, $Co^{2+}$, $Ir^{0}$, $Ir^{+}$, $Ir^{2+}$, $Ir^{3+}$, $Fe^{2+}$, $Ru^{2+}$, $Ru^{3+}$, $Ru^{4+}$, $Ru^{5+}$, $Os^{2+}$, $Os^{3+}$, $Re^{2+}$, $Re^{3+}$, $Re^{4+}$, $Re^{6+}$, $Mn^{2+}$, and $Mn^{3+}$, $Cu^{+}$, $Ru^{2+}$, $Fe^{2+}$, and $Ni^{2+}$ are preferred, in particular, $Cu^{+}$. Specific examples of monovalent copper compounds include cuprous chloride, cuprous bromide, cuprous iodide, and cuprous cyanide.

As for ligands used in ATRP processes, organic ligands are usually used. Examples include 2,2'-bipyridyl and its derivatives, 1,10-phenanthroline and its derivatives, tetramethyl ethylene diamine, N,N,N',N",N"-pentamethyl diethylene triamine, tris(dimethylaminoethyl)amine, triphenylphosphine, and tributylphosphine. In particular, aliphatic polyamines such as N,N,N',N",N"-pentamethyl diethylene triamine are preferred.

The azo-skeleton-bearing compounds and compounds represented by formulae (9), (11), (12), (14), (16), (18), and (20) obtained in the illustrated synthesis methods can be purified using ordinary isolation or purification processes for organic compounds. Examples of isolation or purification processes that can be used include recrystallization or reprecipitation in organic solvent and silica gel column chromatography. Purifying a compound using one or a combination of two or more such processes makes the compound purer.

Identification and Purity Measurement

The compounds represented by formulae (9), (11), (12), (14), (16), (18), and (20) were identified and their purity was measured using nuclear magnetic resonance spectroscopy (ECA-400, JEOL Ltd.), ESI-TOF MS (LC/MSD TOF, Agilent Technologies), and HPLC (LC-20A, Shimadzu).

The azo-skeleton-bearing compounds were identified and their molecular weight was measured using size-exclusion chromatography (SEC) (HLC-8220GPC, Tosoh Corporation), nuclear magnetic resonance spectroscopy (ECA-400, JEOL Ltd, or FT-NMR AVANCE-600, Bruker BioSpin), and acid value determination according to JIS K-0070 (Automatic Titrator COM-2500, Hiranuma Sangyo).

Pigment Dispersant and Pigment Composition

Next, a pigment dispersant and a pigment composition according to certain embodiments of the invention are described.

A pigment dispersant according to an embodiment of the invention contains the aforementioned azo-skeleton-bearing compound because this azo-skeleton-bearing compound is highly compatible with both pigments and non-water-soluble solvents. Such a pigment dispersant can be any single or a combination of two or more azo-skeleton-bearing compounds.

A pigment dispersant according to an embodiment of the invention can have any formula as long as it contains an azo-skeleton-bearing compound according to an embodiment of the invention.

A pigment composition according to an embodiment of the invention has the aforementioned azo-skeleton-bearing compound and a pigment. This pigment composition can be used in paints, inks, toners, and plastic molded articles.

Examples of yellow pigments that can be contained in a pigment composition according to an embodiment of the invention include appropriate ones selected from the yellow pigments listed in "Organic Pigments Handbook" published in 2006 (written and issued by Isao Hashimoto). Specific examples include monoazo pigments, bisazo pigments, polyazo pigments, isoindoline-based pigments, condensed azo pigments, azomethine-based pigments, anthraquinone-based pigments, and quinoxaline-based pigments. In particular, monoazo pigments, bisazo pigments, polyazo pigments, and isoindoline-based pigments are preferred.

More specifically, acetoacetanilide-based pigments such as C.I. Pigment Yellow 74, C.I. Pigment Yellow 83, C.I. Pigment Yellow 93, C.I. Pigment Yellow 128, C.I. Pigment Yellow 155, C.I. Pigment Yellow 175, and C.I. Pigment Yellow 180 and isoindoline-based pigments such as C.I. Pigment Yellow 139 and C.I. Pigment Yellow 185 are highly compatible with the azo-skeleton-bearing compound according to an embodiment of the invention. In particular, C.I. Pigment Yellow 155, C.I. Pigment Yellow 180, and C.I. Pigment Yellow 185 greatly benefit from the dispersion effect of the azo-skeleton-bearing compound according to an embodiment of the invention.

Any single or a combination of two or more such yellow pigments can be used.

As for yellow colorants that can be contained in a pigment composition according to an embodiment of the invention, known yellow colorants may be used in combination of the listed yellow pigments unless the colorant inhibits the dispersibility of the pigment.

Examples of colorants that can be used in combination with yellow pigments include compounds represented by condensed azo compounds, isoindolinone compounds, anthraquinone compounds, azo metal complexes, methine compounds, quinophthalone compounds, and allylamide compounds.

Specific examples of colorants that can be used include C.I. Pigment Yellow 12, C.I. Pigment Yellow 13, C.I. Pigment Yellow 14, C.I. Pigment Yellow 15, C.I. Pigment Yellow 17, C.I. Pigment Yellow 62, C.I. Pigment Yellow 94, C.I. Pigment Yellow 95, C.I. Pigment Yellow 97, C.I. Pigment Yellow 109, C.I. Pigment Yellow 110, C.I. Pigment Yellow 111, C.I. Pigment Yellow 120, C.I. Pigment Yellow 127, C.I. Pigment Yellow 129, C.I. Pigment Yellow 139, C.I. Pigment Yellow 147, C.I. Pigment Yellow 151, C.I. Pigment Yellow 154, C.I. Pigment Yellow 168, C.I. Pigment Yellow 174, C.I. Pigment Yellow 176, C.I. Pigment Yellow 181, C.I. Pigment Yellow 191, C.I. Pigment Yellow 194, C.I. Pigment Yellow 213, and C.I. Pigment Yellow 214, C.I. Vat Yellow 1, 3, and 20, Mineral Fast Yellow, Navel Yellow, Naphthol Yellow S, Hansa Yellow G. Permanent Yellow NCG, C.I. Solvent Yellow 9, and C.I. Solvent Yellow 17, C.I. Solvent Yellow 24, C.I. Solvent Yellow 31, C.I. Solvent Yellow 35, C.I. Solvent Yellow 58, C.I. Solvent Yellow 93, C.I. Solvent Yellow 100, C.I. Solvent Yellow 102, C.I. Solvent Yellow 103, C.I. Solvent Yellow 105, C.I. Solvent Yellow 112, C.I. Solvent Yellow 162, and C.I. Solvent Yellow 163.

Examples of magenta pigments that can be contained in a pigment composition according to an embodiment of the invention include appropriate ones selected from the magenta pigments listed in "Organic Pigments Handbook" published in 2006 (written and issued by Isao Hashimoto) (i.e., quinacridone-based pigments, monoazo naphthol-based pigments, bisazo naphthol-based pigments, perylene-based pigments, thioindigo-based pigments, diketopyrrolo-pyrrole-based pigments, naphthol AS-based pigments, and BONA lake-based pigments). In particular, quinacridone-based pigments, diketopyrrolopyrrole-based pigments, naphthol AS-based pigments, and BONA lake-based pigments are preferred.

In particular, quinacridone-based pigments represented by formula (21), diketopyrrolopyrrole-based pigments represented by formula (22), and naphthol AS-based pigments and BONA lake-based pigments represented by formula (23) are highly compatible with the azo-skeleton-bearing compound according to an embodiment of the invention.

[Chem. 24]

Formula (21)

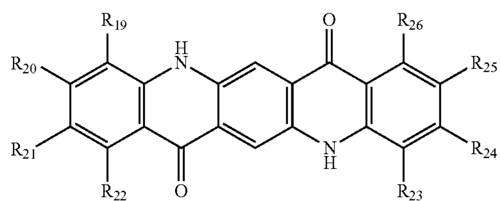

(In formula (21), each of $R_{19}$ to $R_{26}$ independently represents a hydrogen atom, a chlorine atom, or a methyl group.)

[Chem. 25]

Formula (22)

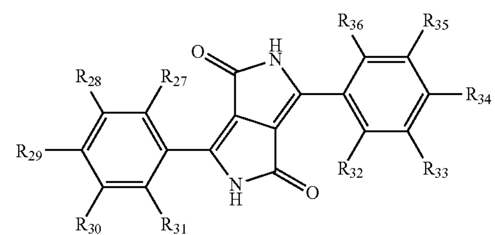

(In formula (22), each of $R_{27}$ to $R_{36}$ independently represents a hydrogen atom, a chlorine atom, a tert-butyl group, a cyano group, or a phenyl group.)

[Chem. 26]

Formula (23)

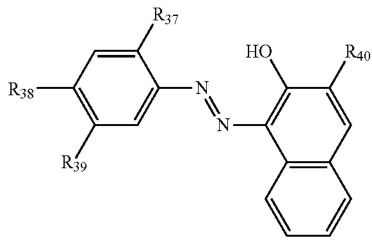

(In formula (23), each of $R_{37}$ to $R_{39}$ independently represents a hydrogen atom, a methoxy group, a methyl group, a nitro group, a chlorine atom, an N,N-diethylaminosulfonyl group, a sulfonic acid group, a sulfonic acid salt group, or a $CONHR_{41}$ group and $R_{40}$ represents an amino group, a carboxylic acid group, a carboxylic acid salt group, or a $CONHR_{42}$ group. Each of $R_{41}$ and $R_{42}$ independently represents a hydrogen atom or a phenyl group.)

Examples of quinacridone-based pigments represented by formula (21) include C.I. Pigment Red 202, C.I. Pigment Red 122, C.I. Pigment Red 192, and C.I. Pigment Red 209.

In formula (21), $R_{19}$, $R_{20}$, $R_{22}$ to $R_{24}$, and $R_{26}$ may be hydrogen atoms with each of $R_{21}$ and $R_{25}$ being a hydrogen atom, a chlorine atom, or a methyl group for the sake of compatibility with the azo-skeleton-bearing compound according to an embodiment of the invention.

Examples of diketopyrrolopyrrole-based pigments represented by formula (22) include C.I. Pigment Red 255, C.I. Pigment Red 254, and C.I. Pigment Red 264.

In formula (22), $R_{27}$, $R_{28}$, $R_{30}$ to $R_{33}$, $R_{35}$, and $R_{36}$ may be hydrogen atoms with each of $R_{29}$ and $R_{34}$ being a hydrogen atom or a phenyl group for the sake of compatibility with the azo-skeleton-bearing compound according to an embodiment of the invention.

Examples of naphthol AS-based pigments represented by formula (23) include C.I. Pigment Red 2, C.I. Pigment Red 3, C.I. Pigment Red 5, C.I. Pigment Red 6, C.I. Pigment Red 7, C.I. Pigment Red 23, C.I. Pigment Red 150, C.I. Pigment Red 146 or C.I. Pigment Red 184, and C.I. Pigment Red 269.

Examples of BONA lake-based pigments represented by formula (23) include C.I. Pigment Red 48:2, C.I. Pigment Red 48:3, C.I. Pigment Red 48:4, and C.I. Pigment Red 57:1.

As for $R_{37}$ to $R_{42}$ in formula (23), one or more of $R_{37}$ to $R_{39}$ may be a $CONHR_{41}$ group, among other listed groups, with $R_{40}$ being a $CONHR_{42}$ group for the sake of compatibility with the azo-skeleton-bearing compounds according to an embodiment of the invention. $R_{42}$ may additionally be a hydrogen atom for the sake of compatibility with the azo-skeleton-bearing compound according to an embodiment of the invention.

In an embodiment of the invention, quinacridone-based pigments such as C.I. Pigment Red 122 and C.I. Pigment Red 202 and naphthol AS-based pigments such as C.I. Pigment Red 255, C.I. Pigment Red 264, and C.I. Pigment Red 150, among other listed magenta pigments, may be used for the sake of compatibility with the azo-skeleton-bearing compound according to an embodiment of the invention.

Any single or a combination of two or more such magenta pigments can be used.

As for magenta colorants that can be contained in a pigment composition according to an embodiment of the invention, known magenta colorants may be used in combination of the listed magenta pigments unless the colorant inhibits the dispersibility of the pigment.

Examples of magenta colorants that can be used in combination with magenta pigments include compounds represented by condensed azo compounds, anthraquinone compounds, basic dye lake compounds, benzimidazolone compounds, thioindigo compounds, and perylene compounds.

Specific examples of colorants that can be used include C.I. Pigment Red 81:1, C.I. Pigment Red 144, C.I. Pigment Red 166, C.I. Pigment Red 169, C.I. Pigment Red 177, C.I. Pigment Red 185, C.I. Pigment Red 220, C.I. Pigment Red 221, and C.I. Pigment Red 238.

Examples of cyan pigments that can be contained in a pigment composition according to an embodiment of the invention include phthalocyanine pigments represented by formula (24).

[Chem. 27]

Formula (24)

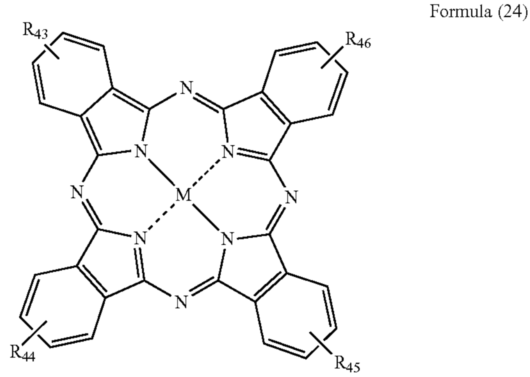

(In formula (24), each of $R_{43}$ to $R_{46}$ independently represents a hydrogen atom, an alkyl group, a sulfonic acid group, or a sulfonic acid salt group, and M represents a metal atom or a hydrogen atom.)

Examples of phthalocyanine pigments represented by formula (24) include C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:5, C.I. Pigment Blue 15:6, C.I. Pigment Blue 16, C.I. Pigment Blue 17, C.I. Pigment Blue 17:1, C.I. Pigment Blue 68. C.I. Pigment Blue 70, C.I. Pigment Blue 75, C.I. Pigment Blue 76, and C.I. Pigment Blue 79.

In particular, C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:5, and C.I. Pigment Blue 15:6 may be used for the sake of compatibility with the azo-skeleton-bearing compound according to an embodiment of the invention.

Any single or a combination of two or more such cyan pigments can be used.

As for cyan colorants that can be contained in a pigment composition according to an embodiment of the invention, known cyan colorants may be used in combination of the listed cyan pigments unless the colorant inhibits the dispersibility of the pigment.

Examples of cyan colorants that can be used in combination with cyan pigments include C.I. Pigment Blue 1, C.I. Pigment Blue 1:2, C.I. Pigment Blue 1:3, C.I. Pigment Blue 2, C.I. Pigment Blue 2:1, C.I. Pigment Blue 2:2, C.I. Pigment Blue 3, C.I. Pigment Blue 4, C.I. Pigment Blue 5, C.I. Pigment Blue 6, C.I. Pigment Blue 7, C.I. Pigment Blue 8, C.I. Pigment Blue 9, C.I. Pigment Blue 9:1, C.I. Pigment Blue 10, C.I. Pigment Blue 10:1, C.I. Pigment Blue 11, C.I. Pigment Blue 12, C.I. Pigment Blue 13, C.I. Pigment Blue 14, C.I. Pigment Blue 18, C.I. Pigment Blue 19, C.I. Pigment Blue 20, C.I. Pigment Blue 21, C.I. Pigment Blue 22, C.I. Pigment Blue 23, C.I. Pigment Blue 24, C.I. Pigment Blue 24:1, C.I. Pigment Blue 25, C.I. Pigment Blue 26, C.I. Pigment Blue 27, C.I. Pigment Blue 28, C.I. Pigment Blue 29, C.I. Pigment Blue 30, C.I. Pigment Blue 31, C.I. Pigment Blue 32, C.I. Pigment Blue 33, C.I. Pigment Blue 34, C.I. Pigment Blue 35, C.I. Pigment Blue 36, C.I. Pigment Blue 36:1, C.I. Pigment Blue 52, C.I. Pigment Blue 53, C.I. Pigment Blue 56, C.I. Pigment Blue 56:1, C.I. Pigment Blue 57, C.I. Pigment Blue 58, C.I. Pigment Blue 59, C.I. Pigment Blue 60, C.I. Pigment Blue 61, C.I. Pigment Blue 61:1, C.I. Pigment Blue 62, C.I. Pigment Blue 63, C.I. Pigment Blue 64, C.I. Pigment Blue 65, C.I. Pigment Blue 66, C.I. Pigment Blue 67, C.I. Pigment Blue 69, C.I. Pigment Blue 71, C.I. Pigment Blue 72, C.I. Pigment Blue 73, C.I. Pigment Blue 74, C.I. Pigment Blue 77, C.I. Pigment Blue 78, C.I. Pigment Blue 80, C.I. Pigment Blue 81, C.I. Pigment Blue 82, C.I. Pigment Blue 83, and C.I. Pigment Blue 84.

It is also possible to use any colorant other than cyan colorants to adjust the color tone. For example, mixing C.I. Pigment Green 7 in C.I. Pigment Blue 15:3 improves the color purity of the cyan.

Examples of black pigments that can be contained in a pigment composition according to an embodiment of the invention include carbon black.

Any kind of carbon black can be used in an embodiment of the invention, and examples include carbon blacks obtained using production processes such as the thermal process, the acetylene process, the channel process, the furnace process, and the lamp black process.

The average primary particle diameter of a carbon black used in an embodiment of the invention is not limited and can be 14 to 80 nm, preferably 25 to 50 nm, for the sake of the color tone.

The average primary particle diameter of carbon black can be measured by taking its enlarged image using a scanning electron microscope.

The DBP oil absorption of a carbon black used in an embodiment of the invention is not limited and can be 30 to 200 mL/100 g, preferably 40 to 150 mL/100 g. Ensuring the DBP oil absorption of carbon black falls within this range leads to enhanced color developability of printed images.

The DBP oil absorption of carbon black is the amount of DBP (dibutyl phthalate) absorbed by 100 g of carbon black and can be measured in accordance with "JIS K6217."

The pH of carbon black is not limited unless the effect of the azo-skeleton-bearing compound to help the carbon black disperse is seriously affected. The pH of carbon black can be determined by measuring the pH of a mixture of the carbon black and distilled water using a pH electrode.

The specific surface area of carbon black is not limited and can be 300 $m^2/g$ or less, preferably 100 $m^2/g$ or less. Ensuring the specific surface area of carbon black falls within this range allows the amount of addition of the azo-skeleton-bearing compound to be further reduced.

The specific surface area of carbon black is the BET specific surface area and can be measured in accordance with "ISO 4652."

Any single or a combination of two or more of the above-listed carbon blacks can be used.

As for black colorants that can be used in an embodiment of the invention, known black colorants may be used in combination of the listed carbon blacks unless the colorant inhibits the dispersibility of the carbon black.

Examples of black colorants that can be used in combination with carbon black include C.I. Pigment Black 1, C.I. Pigment Black 10, C.I. Pigment Black 31, C.I. Natural Black 1, C.I. Natural Black 2, C.I. Natural Black 3, C.I. Natural Black 4, C.I. Natural Black 5, C.I. Natural Black 6, and activated charcoal.

Furthermore, a black colorant contained in a pigment composition according to an embodiment of the invention may be used in combination with any known magenta colorant, cyan colorant, or yellow colorant for tone adjustment.

Pigments that can be used in an embodiment of the invention are not limited to those described above. Pigments other than the mentioned yellow pigments, magenta pigments, cyan pigments, and carbon blacks can also be used if they are compatible with the pigment dispersant according to an embodiment of the invention.

The pigment may be a crude pigment (a pigment produced from the same raw material as any listed pigment but not prepared through purification, the control of the crystallographic form and particle diameter, and surface treatment). The pigment may also be a prepared pigment composition unless it seriously affects the advantages of the azo-skeleton-bearing compound.

The composition ratio of the pigment and the azo-skeleton-bearing compound in a pigment composition according to an embodiment of the invention on a mass basis (mass of the pigment:mass of the azo-skeleton-bearing compound) can be in the range of 100:0.1 to 100:100 for the sake of the dispersibility of the pigment. Preferably, this composition ratio is in the range of 100:0.5 to 100:20.

The pigment composition can be produced through a wet process or a dry process. The use of a wet process provides a simple way to produce a uniform pigment composition because the azo-skeleton-bearing compound according to an embodiment of the invention is highly compatible with non-water-soluble solvents. The following is a specific example of how the pigment composition can be produced.

A pigment dispersant is dissolved in a dispersion medium optionally with a polymer, and then a powder of the pigment is gradually added and thoroughly mixed with the dispersion medium while the solution is stirred. Applying mechanical shear force using a dispersing machine makes the pigment dispersant adsorbed onto the surface of the pigment, thereby allowing uniform fine particles of the pigment to be microscopically dispersed in a consistent manner. Examples of dispersing machines that can be used include a kneader, a roll mill, a ball mill, a paint shaker, a dissolver, an attritor, a sand mill, and a high-speed mill.

A pigment composition according to an embodiment of the invention may contain an auxiliary agent added during production. Examples of auxiliary agents that can be added include surfactants, dispersants, fillers, standardizing agents, polymers, waxes, antifoams, antistatic agents, antidust agents, extenders, shading colorants, preservatives, drying retarders, rheology control additives, moisturizing agents, antioxidants, UV absorbers, and photostabilizers. A pigment dispersant according to an embodiment of the invention may be added before the production of crude pigment.

Pigment Dispersion

Next, a pigment dispersion according to an embodiment of the invention is described.

A pigment dispersion according to an embodiment of the invention has the aforementioned pigment composition and a non-water-soluble solvent as a dispersion medium. The pigment dispersion may be a dispersion of the pigment composition in the non-water-soluble solvent or a dispersion of the individual components of the pigment composition in the non-water-soluble solvent. The following is an example of how the pigment dispersion can be produced.

A pigment dispersant is dissolved in a dispersion medium optionally with a polymer, and then a powder of the pigment composition is gradually added and thoroughly mixed with the dispersion medium while the solution is stirred. Applying mechanical shear force using a dispersing machine such as a ball mill, a paint shaker, a dissolver, an attritor, a sand mill, or a high-speed mill allows uniform fine particles of the pigment to be dispersed in a consistent manner.

The kind of the non-water-soluble solvent that serves as a dispersion medium in a pigment dispersion according to an embodiment of the invention depends on the purposes and applications of the pigment dispersion and is not limited. Examples include esters such as methyl acetate, ethyl acetate, and propyl acetate, hydrocarbons such as hexane, octane, petroleum ether, cyclohexane, benzene, toluene, and xylene, and halogenated hydrocarbons such as carbon tetrachloride, trichloroethylene, and tetrabromoethane.

The non-water-soluble solvent that serves as a dispersion medium in a pigment dispersion according to an embodiment of the invention may be a polymerizable monomer. The following lists some polymerizable monomers.

Examples include styrene, alpha-methyl styrene, alpha-ethyl styrene, o-methyl styrene, m-methyl styrene, p-methyl styrene, p-methoxystyrene, p-phenyl styrene, p-chlorostyrene, 3,4-dichlorostyrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinyl naphthalene, acrylonitrile, methacrylonitrile, and acrylamide. In particular, the non-water-soluble solvent may be styrene for the sake of compatibility with the azo-skeleton-bearing compound according to an embodiment of the invention.

The kind of the polymer that may be dissolved in the non-water-soluble solvent depends on the purposes and applications of the pigment composition and is not limited. Examples include polystyrene polymers, styrene copolymers, polyacrylic acid polymers, polymethacrylic acid polymers, polyacrylate polymers, polymethacrylate polymers, acrylate copolymers, methacrylate copolymers, polyester polymers, polyvinyl ether polymers, polyvinyl alcohol polymers, polyvinyl butyral polymers, polyurethane polymers, and polypeptide polymers. A mixture of two or more such polymers may also be used.

Toner

Next, a toner according to an embodiment of the invention is described.

A toner according to an embodiment of the invention has toner particles containing a binder resin and a colorant. The use of the aforementioned pigment composition as a colorant provides the toner with good tint strength because the pigment stays highly dispersible in the toner particles.

The binder resin can be any known and commonly used polymer.

Specific examples include styrene-methacrylic acid copolymers, styrene-acrylic acid copolymers, polyester polymers, epoxy polymers, and styrene-butadiene copolymers.

As for the toner particles, they can also be directly obtained through polymerizing a polymerizable monomer using a polymerization process. The following lists some polymerizable monomers that can be used for this purpose.

Examples include styrene-based monomers such as alpha-methyl styrene, alpha-ethyl styrene, o-methyl styrene, m-methyl styrene, p-methyl styrene, o-ethyl styrene, m-ethyl styrene, and p-ethyl styrene, methacrylate-based monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and methacrylic acid amides, acrylate-based monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and acrylic acid amides, and olefin-based monomers such as butadiene, isoprene, and cyclohexene.

It is possible to use any single or a combination of appropriate monomers mixed to make the theoretical glass transition temperature (Tg) fall within the range of 40 to 75 degrees Celsius (refer to the third edition of "Polymer Handbook" (US), edited by J. Brandrup and E. H. Immergut, John Wiley & Sons, 1989, pp. 209-277). Ensuring the theoretical glass transition temperature falls within this range enhances the storage stability and durability of the toner and the vividness of full-color images.

The distribution of additives, such as a colorant, a charge-controlling agent, and wax, in the toner particles can be controlled by using a nonpolar polymer such as polystyrene in combination with a polar polymer such as a polyester polymer or a polycarbonate polymer as binder resins. For example, when the toner particles are directly produced using suspension polymerization, the polar polymer is added during the polymerization reaction from a dispersion step to a polymerization step. The polar polymer is added in accordance with the polarity balance between the polymerizable monomer composition that forms the toner particles and an aqueous medium. This makes it possible to control the system to ensure that the concentration of the polar polymer gradually changes in the direction from the surface toward the center of each toner particle, e.g., the polar polymer forms a thin film over the surface of the toner particle. At this stage a desired form of existence of the colorant in the toner particles can be achieved through the use of a polar polymer that interacts with the azo-skeleton-bearing compound, the colorant, and a charge-controlling agent.

In an embodiment of the invention, it is also possible to use a cross-linking agent during the synthesis of a binder resin to enhance the mechanical strength of the toner particles and control the molecular weight of the binder resin.

This cross-linking agent can be a bifunctional cross-linking agent or a multifunctional cross-linking agent having three or more functional groups.

Examples of bifunctional cross-linking agents include divinylbenzene, bis(4-acryloxy polyethoxy phenyl)propane, diacrylates such as ethylene glycol diacrylate, 1,3-butylene glycol diacrylate, 1,4-butanediol diacrylate, 1,5-pentanediol diacrylate, 1,6-hexanediol diacrylate, neopentylglycol diacrylate, diethylene glycol diacrylate, triethylene glycol diacrylate, tetraethylene glycol diacrylate, diacrylates of polyethylene glycols #200, #400, and #600, dipropylene glycol diacrylate, polypropylene glycol diacrylate, and polyester-type diacrylates, and dimethacrylate equivalents of such diacrylates.

Examples of multifunctional cross-linking agents having three or more functional groups include pentaerythritol triacrylate, trimethylolethane triacrylate, trimethylol propane triacrylate, tetramethylol methane tetraacrylate, oligoester acrylates and methacrylates, 2,2-bis(4-methacryloxy phenyl)propane, diallyl phthalate, triallyl cyanurate, triallyl isocyanurate, and triallyl trimellitate.

The amount of the cross-linking agent can be in the range of 0.05 to 10 parts by mass, preferably 0.1 to 5 parts by mass, per 100 parts by mass of the polymerizable monomer for the sake of the fixation and offset resistance of the toner.

In an embodiment of the invention, it is also possible to use wax during the synthesis of the binder resin to prevent adhesion to a fixing member.

Examples of waxes that can be used include petroleum-based waxes such as paraffin wax, microcrystalline wax, and petrolatum and their derivatives, montan wax and its derivatives, hydrocarbon waxes produced using the Fischer-Tropsch process and their derivatives, polyolefin waxes represented by polyethylene and their derivatives, and natural waxes such as carnauba wax and candelilla wax and their derivatives. The derivatives include oxides, block copolymers formed with a vinyl monomer, and graft-modified forms. Other examples include alcohols such as higher aliphatic alcohols, fatty acids such as stearic acid and palmitic acid, fatty acid amides, fatty acid esters, hydrogenated castor oil and its derivatives, vegetable waxes, and animal waxes. Any single or a combination of such waxes can be used.

The amount of the wax can be in the range of 2.5 to 15.0 parts by mass, preferably 3.0 to 10.0 parts by mass, per 100 parts by mass of the binder resin. Ensuring the amount of wax falls within this range leads to enhanced fixation and chargeability. A charge-controlling agent may optionally be added to the toner particles with the aim of controlling the optimum amount of triboelectric charge based on the system used to develop the toner.

Known charge-controlling agents can be used. In particular, charge controlling agents that are charged quickly and able to maintain a certain amount of charge in a stable manner can be used. When the toner particles are produced directly from a polymerizable monomer using a polymerization process such as suspension polymerization, it is possible to use, in particular, a charge-controlling agent that is unlikely to inhibit polymerization and substantially free of substances soluble in aqueous media.

Negative charge-controlling agents and positive charge-controlling agents can be used.

Examples of negative charge-controlling agents include polymers or copolymers having a sulfonic acid group, a sulfonic acid salt group, or a sulfonic acid ester group, salicylic acid derivatives and their metal complexes, monoazo metal compounds, acetylacetone metal compounds, aromatic hydroxycarboxylic acids, aromatic monocarboxylic or polycarboxylic acids and their metal salts, anhydrides, and esters, phenol derivatives such as bisphenols, urea derivatives, compounds based on naphthoic acid metal complexes, boron compounds, quaternary ammonium salts, calixarenes, and polymer-based charge-controlling agents.

Examples of positive charge-controlling agents include nigrosine and certain forms of nigrosine modified with fatty acid metal salts, guanidine compounds, imidazole compounds, quaternary ammonium salts such as tributylbenzylammonium 1-hydroxy-4-naphtholsulfonate and tetrabutylammonium tetrafluoroborate, their analogous onium salts such as phosphonium salts and lake pigments based on such onium salts, triphenylmethane dyes and lake pigments based on them (examples of laking agents include phosphotungstic acid, phosphomolybdic acid, phosphotungstic-molybdic acid, tannic acid, lauric acid, gallic acid, ferricyanides, and ferricyanides), metal salts of higher fatty acids, diorganotin oxides such as dibutyltin oxide, dioctyltin oxide, and dicyclohexyltin oxide, diorganotin borates such as dibutyltin borate, dioctyltin borate, and dicyclohexyltin borate, and polymer-based charge-controlling agents.

Any single or a combination of two or more such charge-controlling agents can be used.

The toner particles in a toner according to an embodiment of the invention may contain an inorganic fine powder as a fluidizer. Examples of inorganic fine powders that can be used include silica, titanium oxide, alumina, and their double oxides, with or without surface treatment.

Method for Producing Toner Particles

Examples of processes that can be used to produce toner particles according to an embodiment of the invention include the hitherto used pulverization, suspension polymerization, suspension granulation, and emulsification polymerization processes. The toner particles can be produced using suspension polymerization or suspension granulation, among other listed processes, for the sake of the environmental burdens that occur during production and ease in controlling the particle diameter.

The following is an example of how toner particles can be produced using suspension polymerization.

First, materials such as a colorant containing a pigment composition according to an embodiment of the invention, a polymerizable monomer, wax, and a polymerization initiator are mixed to form a polymerizable monomer composition. Then the polymerizable monomer composition is dispersed in an aqueous medium to form particles of the polymerizable monomer composition. Then the polymerizable monomer existing in the particles of the polymerizable monomer composition is polymerized in the aqueous medium, yielding toner particles.

The polymerizable monomer composition may be prepared through a process including dispersing the colorant in a first polymerizable monomer to form a liquid dispersion and mixing this liquid dispersion with a second polymerizable monomer. This means that thoroughly dispersing the pigment composition with a first polymerizable monomer and then mixing the resulting dispersion and the other materials of the toner with a second polymerizable monomer allows the pigment to be dispersed better among the toner particles.

The polymerization initiator used in this suspension polymerization process can be any known polymerization initiator. Examples include azo compounds, organic peroxides, inorganic peroxides, organic metal compounds, and photopolymerization initiators. Specific examples include azo polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and dimethyl 2,2'-azobis(isobutyrate), organic-peroxide-based polymerization initiators such as benzoyl peroxide, di-tert-butyl peroxide, tert-butyl peroxyisopropyl monocarbonate, and tert-hexyl peroxybenzoate, and tert-butyl peroxybenzoate, inorganic-peroxide-based polymerization initiators such as potassium persulfate and ammonium persulfate, and polymerization initiators based on ferrous hydrogen peroxide, polymerization initiators based on BPO-dimethyl aniline, and polymerization initiators based on cerium (IV) salt-alcohols. Examples of photopolymerization initiators include benzophenones, benzoin ethers, and ketals. Any single or a combination of two or more such polymerization initiators can be used.

The amount of the polymerization initiator can be in the range of 0.1 to 20 parts by mass, preferably 0.1 to 10 parts by mass, per 100 parts by mass of the polymerizable monomer.

The aqueous medium used in this suspension polymerization process may contain a dispersion stabilizer. This dispersion stabilizer can be any known inorganic or organic dispersion stabilizer.

Examples of inorganic dispersion stabilizers that can be used include calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica, and alumina.

Examples or organic dispersion stabilizers that can be used include polyvinyl alcohol, gelatin, methylcellulose, methylhydroxypropylcellulose, ethylcellulose, sodium carboxymethylcellulose, and starch.

Nonionic, anionic, and cationic surfactants can also be used. Examples include sodium dodecyl sulfate, tetradecyl sodium sulfate, pentadecyl sodium sulfate, octyl sodium sulfate, sodium oleate, sodium laurate, potassium stearate, and calcium oleate.

In an embodiment of the invention, an inorganic dispersion stabilizer that is soluble in acids and sparingly soluble in water may be used, among other listed dispersion stabilizers. In an embodiment of the invention, a sparingly water-soluble inorganic dispersion stabilizer may be added to the aqueous medium in such a manner that the amount of the dispersion stabilizer should fall within the range of 0.2 to 2.0 parts by mass per 100 parts by mass of the polymerizable monomer. The use of such a dispersion stabilizer within this range of quantity improves the stability of droplets of the polymerizable monomer composition in the aqueous medium. In an embodiment of the invention, the aqueous medium may be prepared using 300 to 3000 parts by mass of water per 100 parts by mass of the polymerizable monomer composition.

In an embodiment of the invention, an aqueous medium containing such a sparingly water-soluble inorganic dispersion stabilizer may be prepared through direct dispersion of a commercially available dispersion stabilizer. The sparingly water-soluble inorganic dispersion stabilizer may be formed in rapidly stirred water to yield fine and uniform-sized particles of the dispersion stabilizer. For example, when calcium phosphate is used as a dispersion stabilizer, mixing an aqueous sodium phosphate solution with an aqueous calcium chloride solution while rapidly stirring the mixture yields fine and uniform-sized particles of calcium phosphate.

Toner particles according to an embodiment of the invention may be produced using suspension granulation. The use of a production process based on suspension granulation, which does not involve heating, prevents a decrease in the glass transition temperature of the toner that would occur with the use of a low-melting-point wax because the resin and this type of wax are mutually dissolved when heated. Furthermore, suspension granulation allows many options for selecting a toner material that serves as a binder resin and can be easily performed using a polyester polymer, which is generally considered to be advantageous in terms of fixation, as a main ingredient. It is therefore an advantageous production process when used to produce toner particles containing any polymer that prevents the use of suspension polymerization.

The following is an example of how toner particles can be produced using suspension granulation. First, materials such as a colorant containing a pigment composition according to an embodiment of the invention, a binder resin, and wax are mixed in a solvent to form a solvent composition. Then the solvent composition is dispersed in an aqueous medium to form particles of the solvent composition, yielding a toner particle suspension. Removing the solvent by heating or depressurizing the resulting suspension yields toner particles.

The solvent composition used in this method may be prepared through a process including dispersing the colorant in a first solvent and mixing the resulting liquid dispersion with a second solvent. This means that thoroughly dispersing the colorant with a first solvent and then mixing the resulting dispersion and the other materials of the toner with a second solvent allows the pigment to be dispersed better among the toner particles.

Examples of solvents that can be used in this suspension granulation process include hydrocarbons such as toluene, xylene, and hexane, halogenated hydrocarbons such as methylene chloride, chloroform, dichloroethane, trichloroethane, and carbon tetrachloride, alcohols such as methanol, ethanol, butanol, and isopropyl alcohol, polyhydric alcohols such as ethylene glycol, propylene glycol, diethylene glycol, and triethylene glycol, cellosolves such as methyl cellosolve and ethyl cellosolve, ketones such as acetone, methyl ethyl ketone, and methyl isobutyl ketone, ethers such as benzyl alcohol ethyl ether, benzyl alcohol isopropyl ether, and tetrahydrofuran, and esters such as methyl acetate, ethyl acetate, and butyl acetate. Any single or a combination of two or more such solvents can be used. Among other listed solvents, ones having a low boiling point and in which the binder resin is sufficiently soluble can be easily removed from the toner particle suspension.

The amount of the solvent can be in the range of 50 to 5000 parts by mass, preferably 120 to 1000 parts by mass, per 100 parts by mass of the binder resin.

The aqueous medium used in this suspension granulation process may contain a dispersion stabilizer. This dispersion stabilizer can be any known inorganic or organic dispersion stabilizer. Examples of inorganic dispersion stabilizers that can be used include calcium phosphate, calcium carbonate, aluminum hydroxide, calcium sulfate, and barium carbonate. Examples of organic dispersion stabilizers that can be used include water-soluble polymers such as polyvinyl alcohol, methylcellulose, hydroxyethylcellulose, ethylcellulose, sodium carboxymethylcellulose, sodium polyacrylate, and sodium polymethacrylate, anionic surfactants such as sodium dodecylbenzene sulfonate, sodium octadecyl sulfate, sodium oleate, sodium laurate, and potassium stearate, cationic surfactants such as lauryl amine acetate, stearyl amine acetate, and lauryl trimethyl ammonium chloride, amphoteric surfactants such as lauryl dimethyl amine oxide, and nonionic surfactants such as polyoxyethylene alkyl ethers, polyoxyethylene alkyl phenyl ethers, and polyoxyethylene alkyl amines.

The amount of the dispersion stabilizer can be in the range of 0.01 to 20 parts by mass per 100 parts by mass of the binder resin for the sake of the stability of droplets the solvent composition in the aqueous medium.

The weight-average particle diameter of the toner (hereinafter also denoted by D4) can be in the range of 3.0 to 15.0 micrometers, preferably 4.0 to 12.0 micrometers.

Making the weight-average particle diameter of the toner fall within this range ensures good charge stability, thereby reducing the fog and toner scattering that can occur upon continuous development with multiple sheets. Doing so also leads to improved reproducibility in halftone areas and helps to reduce the surface unevenness of the resulting images.

The ratio of the weight-average particle diameter D4 to the number-average particle diameter (hereinafter also denoted by D1) of the toner (the ratio hereinafter also denoted by D4/D1) can be 1.35 or less, preferably 1.30 or less. Ensuring D4/D1 falls within this range reduces the development of fog and limits the lowering of transfer efficiency, thereby helping to obtain high-resolution images.

D4 and D1 of the toner can be adjusted through the selection of the method for producing the toner particles. For example, when suspension polymerization is used, these parameters can be adjusted through the control of conditions such as the concentration of a dispersion stabilizer used during the preparation of an aqueous medium and the speed and duration of stirring for reaction.

The toner according to an embodiment of the invention can be a magnetic toner or a nonmagnetic toner. When used as a magnetic toner, the toner according to an embodiment of the invention may contain toner particles mixed with a magnetic material. Examples of magnetic materials for this purpose include iron oxides such as magnetite, maghemite, and ferrite, iron oxides containing other metal oxides, metals such as Fe, Co, and Ni, alloys of these metals and metals such as Al, Co, Cu, Pb, Mg, Ni, Sn, Zn, Sb, Be, Bi, Cd, Ca, Mn, Se, Ti, W, and V, and mixtures of these materials. Specific examples of magnetic materials that can be used include fine particles of triiron tetroxide or gamma-iron sesquioxide.

The average particle diameter of the magnetic material can be in the range of 0.1 to 2 micrometers, preferably 0.1 to 0.3 micrometers. The magnetic properties of the magnetic material in a magnetic field of 795.8 kA/m can be as follows for the sake of the ability for development of the toner: coercive force, 1.6 to 12 kA/m; saturation magnetization, 5 to 200 $Am^2/kg$ (preferably, 50 to 100 $Am^2/kg$); residual magnetization, 2 to 20 $Am^2/kg$.

The amount of the magnetic material can be in the range of 10 to 200 parts by mass, preferably 20 to 150 parts by mass, per 100 parts by mass of the binder resin.

EXAMPLES

The following describes certain aspects of the invention in more detail by providing examples and comparative examples. No aspect of the invention is limited to these examples. The terms "parts" and "%" in the following description are based on mass unless otherwise specified.

The following describes measurement methods used in production examples.

(1) Molecular Weight Measurement

The molecular weight of azo-skeleton-bearing compounds is determined as a polystyrene-equivalent value using size-exclusion chromatography (SEC). The process of the SEC-based molecular weight measurement was as follows.

A sample was added to the eluate indicated below to make the concentration of the sample 1.0%, and the resulting solution was filtered through a 0.2-micrometer solvent-resistant membrane filter after being left at room temperature for 24 hours. The obtained sample solution was analyzed under the following conditions.

Equipment: High-speed GPC "HLC-8220GPC" (Tosoh Corporation)

Columns: Two connected LF-804 columns

Eluent: THF

Flow rate: 1.0 mL/min

Oven temperature: 40 degrees Celsius

Sample injection volume: 0.025 mL

The molecular weight of samples was determined using a molecular-weight calibration curve created using polystyrene reference standards (Tosoh Corporation TSK standard polystyrenes F-850, F-450, F-288, F-128, F-80, F-40, F-20, F-10, F-4, F-2, F-1, A-5000, A-2500, A-1000, and A-500).

(2) Acid Value Measurement

The process of the measurement of the acid value of azo-skeleton-bearing compounds was as follows.

The basic operations are as described in JIS K-0070.

1) First, 0.5 to 2.0 g of a sample is accurately weighed. The obtained mass is defined as M (g).

2) In a 50-mL beaker, the sample is dissolved in 25 mL of a mixture of tetrahydrofuran and ethanol (2/1).

3) The solution is titrated with a 0.1 mol/L KOH solution in ethanol using a potentiometric titrator (for example, Hiranuma Sangyo Automatic Titrator "COM-2500" can be used).

4) The amount of the KOH solution consumed is defined as S (mL). A blank is also analyzed, and the amount of the KOH solution consumed in the blank analysis is defined as B (mL).

5) The acid value is calculated using the following equation. The term f is the factor of the KOH solution.

$$\text{Acid value } [\text{mg}\,KOH/\text{g}] = \frac{(S-B)\times f\times 5.61}{M} \quad \text{[Math. 1]}$$

(3) Composition Analysis

The structure of polymer moieties and azo-skeleton-bearing compounds was determined using the equipment listed below.

$^{1}$H NMR:

ECA-400, JEOL Ltd. (with heavy chloroform as solvent)

$^{13}$C NMR:

FT-NMR AVANCE-600, Bruker BioSpin (with heavy chloroform as solvent)

The inverse-gated decoupling sequence was applied, with chromium (III) acetylacetonate as a relaxation agent, to make $^{13}$C NMR quantitative for composition analysis.

Example 1

Azo-skeleton-bearing compounds were obtained as follows.

<Example of the Production of Compound (25)>

Azo-skeleton-bearing compound (25) having the structure illustrated below was produced through the following scheme.

[Chem.28]

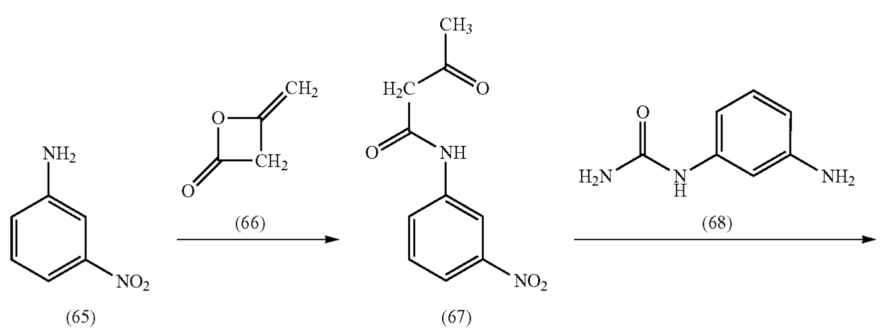

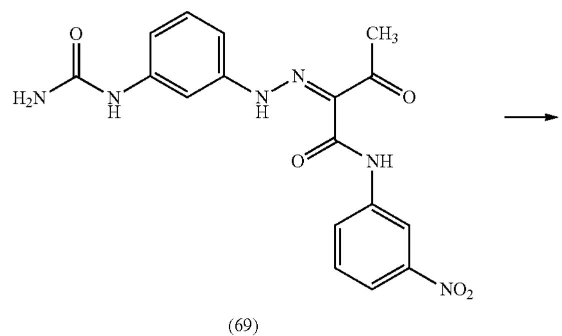

-continued

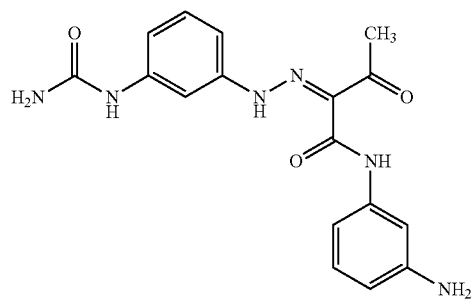

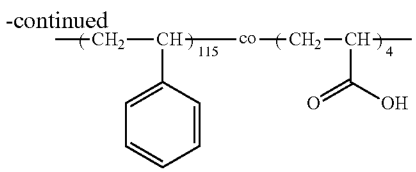

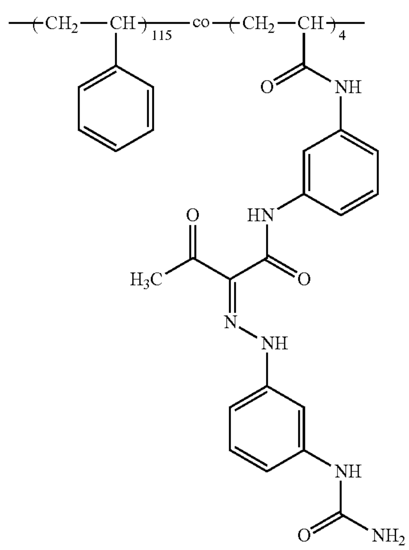

(In these structural formulae, the sign "co" means that the individual monomer units of the copolymer are randomly arranged.)

A mixture of 140 parts of acetic acid with 25.0 parts of compound (65), 15.4 parts of compound (66), and 15.0 parts of acetone was stirred at 65 degrees Celsius for 3 hours. After the reaction was complete, the mixture was poured into 1200 parts of water, and the resulting liquid was filtered, yielding 38.4 parts of compound (67) (yield: 96.0%).

Then a mixture of 7.49 parts of compound (68) with 71.0 parts of N,N-dimethylformamide and 14.5 parts of concentrated hydrochloric acid was ice-cooled to 5 degrees Celsius or less. The cooled solution was stirred with a solution of 3.56 parts of sodium nitrite in 20.0 parts of water at the same temperature for 1 hour (a diazonium salt solution). A mixture of 94.4 parts of N,N-dimethylformamide with 10.0 parts of compound (67) and 32.1 parts of calcium carbonate was ice-cooled to 5 degrees Celsius or less, the diazonium salt solution was added, and the reaction was allowed to proceed at 5 degrees Celsius or less for 3 hours. After the reaction was complete, the reaction solution was filtered, and the solvent was distilled away under reduced pressure. The resulting precipitate was washed with dilute hydrochloric acid and water, yielding 15.0 parts of compound (69) (yield: 80.2%).

Then a mixture of 188 parts of N,N-dimethylformamide with 15.0 parts of compound (69) and 1.67 parts of palladium on activated charcoal (5% palladium) was stirred in a hydrogen gas atmosphere (reaction pressure: 0.1 to 0.4 MPa) at room temperature for 16 hours. After the reaction was complete, the reaction solution was passed through activated alumina to release some components including palladium on activated charcoal. The solvent in the filtrate was distilled away under reduced pressure, and the resulting precipitate was washed with methanol, yielding 10.7 parts of compound (70) (yield: 81.7%).

Separately, 100 parts of propylene glycol monomethyl ether was heated to reflux at a liquid temperature of 120 degrees Celsius or more while the system was purged with nitrogen, and then a mixture of 51.5 parts of styrene, 1.48 parts of acrylic acid, and 1.00 part of tert-butyl peroxybenzoate (an organic-peroxide-based polymerization initiator, NOF Corporation; trade name, PERBUTYL Z) was added dropwise over 3 hours. After the dropping of the entire volume and 3 hours of stirring, the solution was distilled at atmospheric pressure while being heated to a temperature of 170 degrees Celsius, and after the temperature of the solution reached 170 degrees Celsius the solution was distilled under a reduced pressure of 1 hPa for 1 hour, yielding a plastic solid. The solid was purified through reprecipitation using n-hexane in tetrahydrofuran, yielding 51.6 parts of compound (P-1).

A solution of 10.0 parts of the obtained compound (P-1) in 100 parts of chloroform was stirred at room temperature for 24 hours while 2.23 parts of thionyl chloride was added dropwise. Then the reaction solution was condensed to release chloroform and an excess of thionyl chloride, the resulting plastic solid was collected and dissolved in 61.1 parts of N,N-dimethylacetamide, and the obtained solution was stirred with 1.49 parts of compound (70) in a nitrogen atmosphere at 65 degrees Celsius for 3 hours. After the reaction was complete, the reaction solution was condensed and subjected to reprecipitation using methanol, yielding 9.80 parts of azo-skeleton-bearing compound (25).

The obtained compound was identified as having the structure of azo-skeleton-bearing compound (25) by the measurement described above. The following provides the results of the analysis.

Results of the Analysis of Azo-Skeleton-Bearing Compound (25)

(1) Results of molecular weight measurement (GPC):

Weight-average molecular weight (Mw)=18,427; number-average molecular weight (Mn)=8,677

(2) Results of acid value measurement:

3.3 mg KOH/g (3) Results of $^{13}C$ NMR (150 MHz, $CDCl_3$, room temperature) (see FIG. 1):

Delta (ppm)=199.4 (1C), 174.7-174.2 (1C), 162.7 (1C), 156.6, 145.6-145.0 (27.4C), 144.0, 142.2, 140.4, 137.7, 128.2-127.4, 125.6-125.5, 116.6, 112.4, 110.0, 107.3, 46.3-40.3, 26.2

These results of $^{13}C$ NMR data analysis were used to determine the proportions of the carbon atoms assigned to the individual peaks in the monomer units of the copolymer. These measurement results and the number-average molecular weight obtained using GPC were used to calculate the number of each monomer unit of azo-skeleton-bearing compound (25), through which it was found that the compound had 115 styrene units and 4 azo skeletons.

<Example of the Production of Compound (39)>

Azo-skeleton-bearing compound (39) having the structure illustrated below was produced through the following scheme.

[Chem.29]

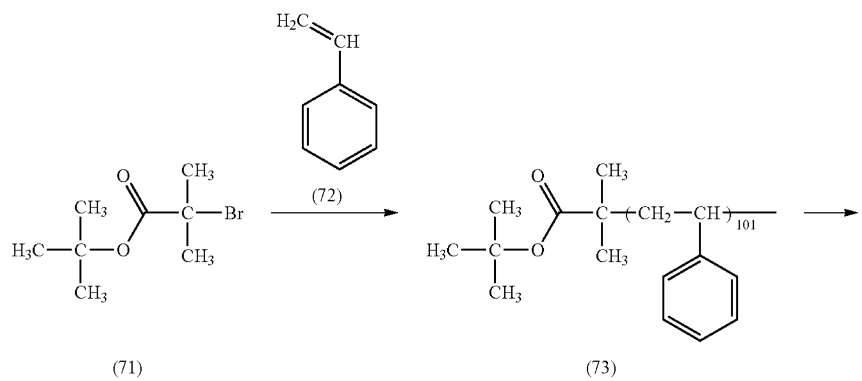

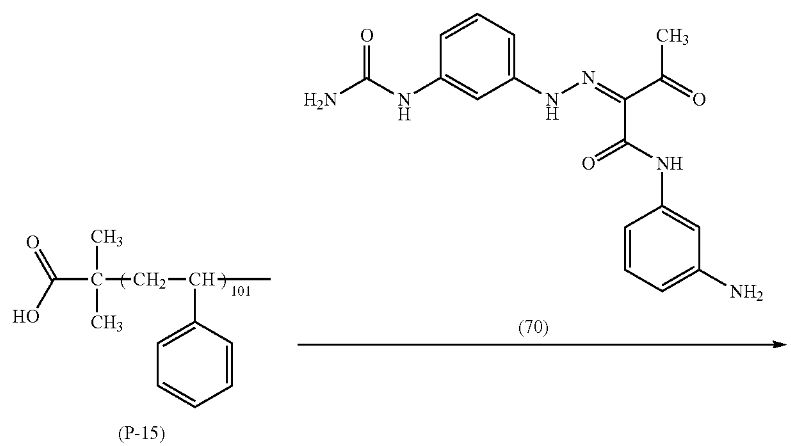

-continued

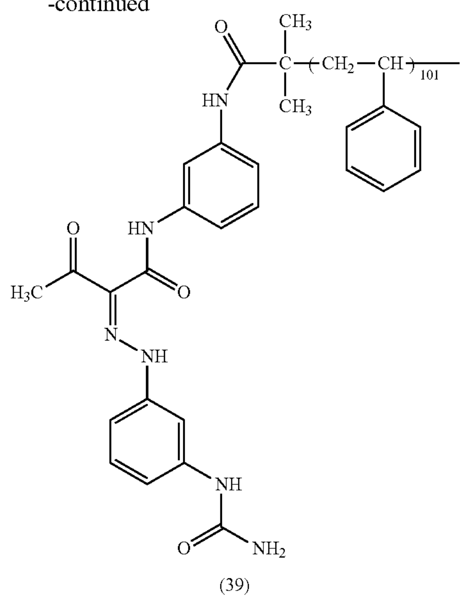

A mixture of 5.0 parts of anisole with 1.1 parts of compound (71), 50 parts of styrene (72), and 0.83 parts of N,N,N',N",N"-pentamethyl diethylene triamine was lyophilized three times, and then 0.69 parts of copper bromide was added in a nitrogen atmosphere. After the solution was left in a nitrogen atmosphere at 100 degrees Celsius for 8 hours for reaction, the reaction solution was exposed to the air to stop the reaction. After the reaction was complete, the reaction solution was condensed and subjected to reprecipitation using methanol, and the obtained precipitate was dissolved in tetrahydrofuran. This solution was passed through activated alumina to release copper bromide. The solvent was distilled away under reduced pressure, and the precipitate was dried under reduced pressure, yielding 40 parts of polymer (73).

A solution of 40 parts of the obtained polymer (73) in 200 parts of 1,4-dioxane was stirred with 100 parts of 12 M aqueous hydrochloric acid at 120 degrees Celsius for 12 hours. After the reaction was complete, the reaction solution was condensed and subjected to reprecipitation using methanol, and the obtained precipitate was dried under reduced pressure, yielding 36 parts of compound (P-15).

Then a solution of 5.00 parts of compound (P-15) in 50.0 parts of chloroform was stirred at room temperature for 24 hours while 0.346 parts of thionyl chloride was added dropwise. Then the reaction solution was condensed to release chloroform and an excess of thionyl chloride, the resulting plastic solid was collected and dissolved in 34.6 parts of N,N-dimethylacetamide, and the obtained solution was stirred with 0.231 parts of compound (70) in a nitrogen atmosphere at 65 degrees Celsius for 7.5 hours. After the reaction was complete, the reaction solution was condensed and subjected to reprecipitation using methanol, yielding 4.56 parts of azo-skeleton-bearing compound (39).

The obtained compound was identified as having the structure of azo-skeleton-bearing compound (39) by the measurement described above. The following provides the results of the analysis.

Results of the Analysis of Azo-Skeleton-Bearing Compound (39)

(1) Results of molecular weight measurement (GPC):

Weight-average molecular weight (Mw)=12,102; number-average molecular weight (Mn)=10,861

(2) Results of acid value measurement:

0.974 mg KOH/g (3) Results of $^{13}C$ NMR (150 MHz, $CDCl_3$, room temperature) (see FIG. 2):

Delta (ppm)=199.5 (1C), 175.8 (1C), 162.8 (1C), 146.0-145.1 (113.1C), 142.4 (1C), 138.0 (1C), 137.6 (1C), 128.2-127.1, 125.6-125.4, 116.7 (1C), 116.4 (1C), 112.5 (1C), 110.0 (1C), 108.0 (1C), 46.4-41.7, 40.6-40.3, 27.0-25.4, 21.5 (1C)

These results of $^{13}C$ NMR data analysis were used to determine the number of the copolymer-constituting carbon atoms assigned to the individual peaks. These measurement results were used to calculate the number of each monomer unit of azo-skeleton-bearing compound (39), through which it was found that the compound had 101 styrene units and 1 azo skeleton.

<Example of the Production of Compound (54)>

Azo-skeleton-bearing compound (54) having the structure illustrated below was produced through the following scheme.

[Chem.30]

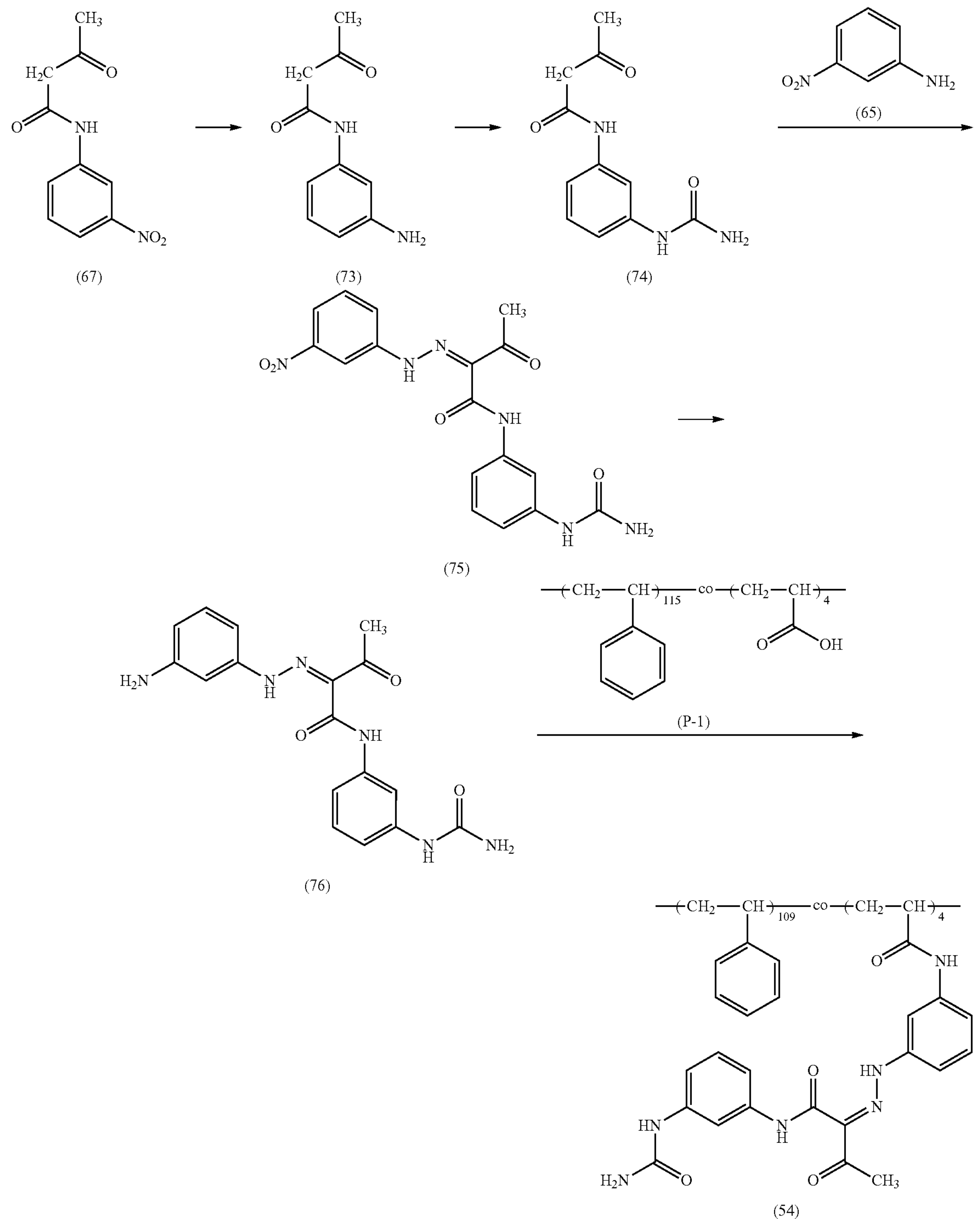

(In this scheme, the sign "co" means that the individual monomer units of the copolymer are randomly arranged.)

A mixture of 283 parts of N,N-dimethylformamide with 70.0 parts of compound (65) and 7.04 parts of palladium on activated charcoal (5% palladium) was stirred in a hydrogen gas atmosphere (reaction pressure: 0.1 to 0.4 MPa) at room temperature for 111 hours. After the reaction was complete, the reaction solution was passed through activated alumina to release some components including palladium on activated charcoal. The filtrate was condensed and subjected to reprecipitation through the addition of methanol, yielding 45.1 parts of compound (73) (yield: 74.9%).

Then to a solution of 25.0 parts of compound (73) in 200 parts of water and 100 parts of acetic acid, a solution of 13.5 parts of potassium cyanate in 25.0 parts of water was added dropwise at room temperature. After the entire volume dropped, the reaction solution was stirred for 4 hours at an elevated temperature of 50 degrees Celsius. After the reaction was complete, the reaction solution was poured into 500 parts of water, the resulting liquid was filtered, the filtrate was condensed under reduced pressure, and the pH of the condensed filtrate was neutralized. The resulting precipitate was collected through filtration and washed with methanol, yielding 19.9 parts of compound (74) (yield: 63.0%).

A mixture of 5.69 parts of compound (65) with 56.6 parts of N,N-dimethylformamide and 12.6 parts of concentrated hydrochloric acid was ice-cooled to 5 degrees Celsius or less. The cooled solution was stirred with a solution of 2.97 parts of sodium nitrite in 20.0 parts of water at the same temperature for 1 hour (a diazonium salt solution). A mixture of 94.4 parts of N,N-dimethylformamide with 10.0 parts of compound (74) and 28.0 parts of calcium carbonate was ice-cooled to 5 degrees Celsius or less, the diazonium salt solution was added, and the reaction was allowed to proceed at 5 degrees Celsius or less for 3 hours. After the reaction was complete, the reaction solution was filtered, and the solvent was distilled away under reduced pressure. The resulting precipitate was washed with dilute hydrochloric acid, water, and methanol, yielding 6.43 parts of compound (75) (yield: 39.3%).

A mixture of 142 parts of N,N-dimethylformamide with 6.00 parts of compound (75) and 0.683 parts of palladium on activated charcoal (5% palladium) was stirred in a hydrogen gas atmosphere (reaction pressure: 0.1 to 0.4 MPa) at room temperature for 18 hours. After the reaction was complete, the reaction solution was passed through activated alumina to release some components including palladium on activated charcoal. The filtrate was condensed, and the resulting precipitate was washed with methanol, yielding 4.23 parts of compound (76) (yield: 77.9%).

Then a solution of 10.0 parts of compound (P-1) in 100 parts of chloroform was stirred at room temperature for 24 hours while 2.23 parts of thionyl chloride was added dropwise. Then the reaction solution was condensed to release chloroform and an excess of thionyl chloride, the resulting plastic solid was collected and dissolved in 61.1 parts of N,N-dimethylacetamide, and the obtained solution was stirred with 1.51 parts of compound (76) in a nitrogen atmosphere at 65 degrees Celsius for 7.5 hours. After the reaction was complete, the reaction solution was condensed and subjected to reprecipitation using methanol, yielding 10.9 parts of azo-skeleton-bearing compound (54).

The obtained compound was identified as having the structure of azo-skeleton-bearing compound (54) by the measurement described above. The following provides the results of the analysis.

Results of the Analysis of Azo-Skeleton-Bearing Compound (54)

(1) Results of molecular weight measurement (GPC):

Weight-average molecular weight (Mw)=19,317; number-average molecular weight (Mn)=11,338

(2) Results of acid value measurement:

3.30 mg KOH/g (3) Results of $^{13}C$ NMR (150 MHz, $CDCl_3$, room temperature) (see FIG. 3):

Delta (ppm)=199.3 (1C), 174.7-174.0 (1C), 162.8 (1C), 156.9 (1C), 146.0-145.2 (30.2C), 145.1, 142.0 (1C), 139.6 (1C), 138.7 (1C), 137.7 (1C), 129.4-125.5, 116.3-115.3, 112.3-111.3, 107.5 (1C), 46.4-40.3, 26.0 (1C)

These results of $^{13}C$ NMR data analysis were used to determine the number of the copolymer-constituting carbon atoms assigned to the individual peaks. These measurement results were used to calculate the number of each monomer unit of azo-skeleton-bearing compound (54), through which it was found that the compound had 109 styrene units and 4 azo skeletons.

<Example of the Production of Compound (63)>

Azo-skeleton-bearing compound (63) having the structure illustrated below was produced through the following scheme.

[Chem.31]

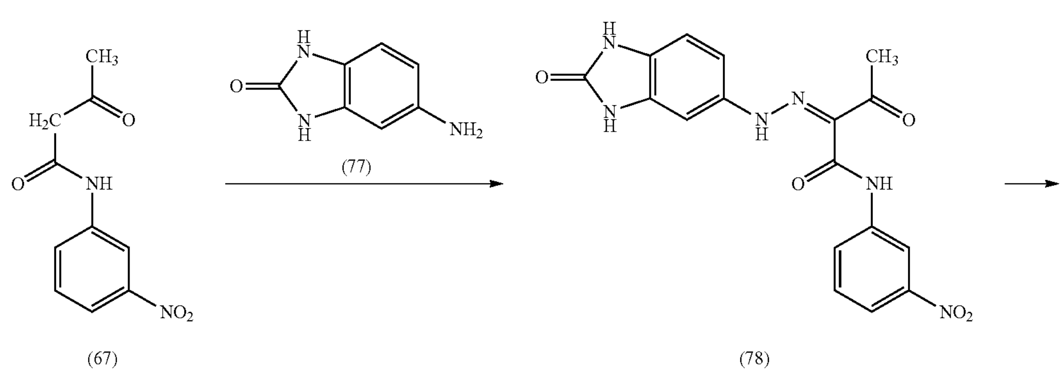

-continued

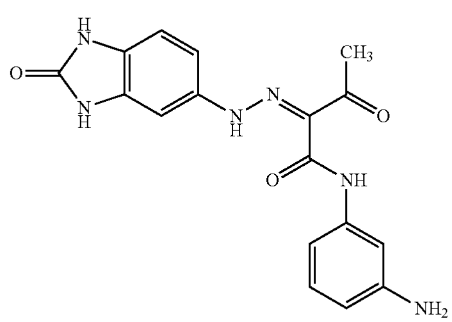

(79)

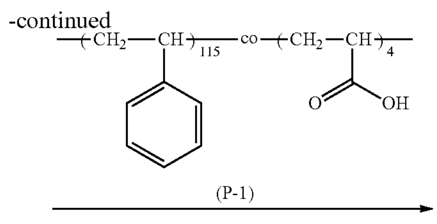

(P-1)

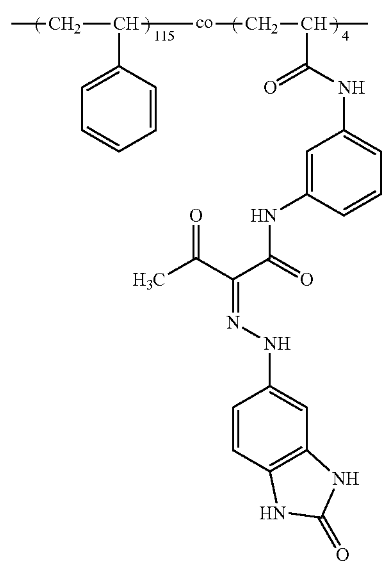

(63)

(In this scheme, the sign "co" means that the individual monomer units of the copolymer are randomly arranged.)

A mixture of 15.0 parts of compound (77) with 142 parts of N,N-dimethylformamide and 30.8 parts of concentrated hydrochloric acid was ice-cooled to 5 degrees Celsius or less. The cooled solution was stirred with a solution of 7.25 parts of sodium nitrite in 50.0 parts of water at the same temperature for 1 hour (a diazonium salt solution). A mixture of 142 parts of N,N-dimethylformamide with 21.9 parts of compound (67) and 68.4 parts of calcium carbonate was ice-cooled to 5 degrees Celsius or less, the diazonium salt solution was added, and the reaction was allowed to proceed at 5 degrees Celsius or less for 3 hours. After the reaction was complete, the reaction solution was filtered, and the solvent was distilled away under reduced pressure. The resulting precipitate was washed with dilute hydrochloric acid, water, and methanol, yielding 36.0 parts of compound (78) (yield: 94.3%).

To a mixture of the obtained compound (78) and 203 parts of 1,4-dioxane, a solution of 12.4 parts of sodium hydrosulfide in 80 parts of water was added dropwise at room temperature. After the entire volume dropped, the solution was stirred for 26 hours at an elevated temperature of 50 degrees Celsius. After the reaction was complete, the reaction solution was poured into water, and the resulting precipitate was collected through filtration and washed with dilute hydrochloric acid, water, and methanol, yielding 10.0 parts of compound (79) (yield: 50.6%).

Then a solution of 10.0 parts of compound (P-1) in 100 parts of chloroform was stirred at room temperature for 24 hours while 2.23 parts of thionyl chloride was added dropwise. Then the reaction solution was condensed to release chloroform and an excess of thionyl chloride, the resulting plastic solid was collected and dissolved in 61.1 parts of N,N-dimethylacetamide, and the obtained solution was stirred with 1.58 parts of compound (79) in a nitrogen atmosphere at 65 degrees Celsius for 8 hours. After the reaction was complete, the reaction solution was condensed and subjected to reprecipitation using methanol, the resulting precipitate was collected through filtration, and the collected precipitate was washed through dispersion in methanol, yielding 10.8 parts of azo-skeleton-bearing compound (63).

The obtained compound was identified as having the structure of azo-skeleton-bearing compound (63) by the measurement described above. The following provides the results of the analysis.

Results of the Analysis of Azo-Skeleton-Bearing Compound (63)

(1) Results of molecular weight measurement (GPC):

Weight-average molecular weight (Mw)=21,468; number-average molecular weight (Mn)=12,324

(2) Results of acid value measurement:

2.09 mg KOH/g (3) Results of $^{13}C$ NMR (150 MHz, $CDCl_3$, room temperature) (see FIG. 4):

Delta (ppm)=199.1 (1C), 174.4-173.8 (1C), 163.1 (1C), 158.5-157.3, 146.0-145.1 (44.9C), 144.1, 138.1, 130.2-125.5, 116.1, 112.0, 98.5 (1C), 46.4-40.3, 26.1 (1C)

These results of $^{13}C$ NMR data analysis were used to determine the number of the copolymer-constituting carbon atoms assigned to the individual peaks. These measurement results were used to calculate the number of each monomer unit of azo-skeleton-bearing compound (63), through which it was found that the compound had 103 styrene units and 3 azo skeletons.

<Example of the Production of Compound (50)>

Azo-skeleton-bearing compound (50) having the structure illustrated below was produced through the following scheme.

(In this scheme, the sign "co" means that the individual monomer units of the copolymer are randomly arranged.)

A mixture of 10.0 parts of compound (80) with 94.4 parts of N,N-dimethylformamide and 15.4 parts of concentrated hydrochloric acid was ice-cooled to 5 degrees Celsius or less. The cooled solution was stirred with a solution of 3.62 parts of sodium nitrite in 25 parts of water at the same temperature for 1 hour. Then 0.48 parts of amidosulfonic acid was added (a diazonium salt solution). A mixture of 94.4 parts of N,N-dimethylformamide with 10.9 parts of compound (67) and 34.2 parts of calcium carbonate was ice-cooled to 5 degrees Celsius or less, the diazonium salt solution was added, and the reaction was allowed to proceed

[Chem.32]

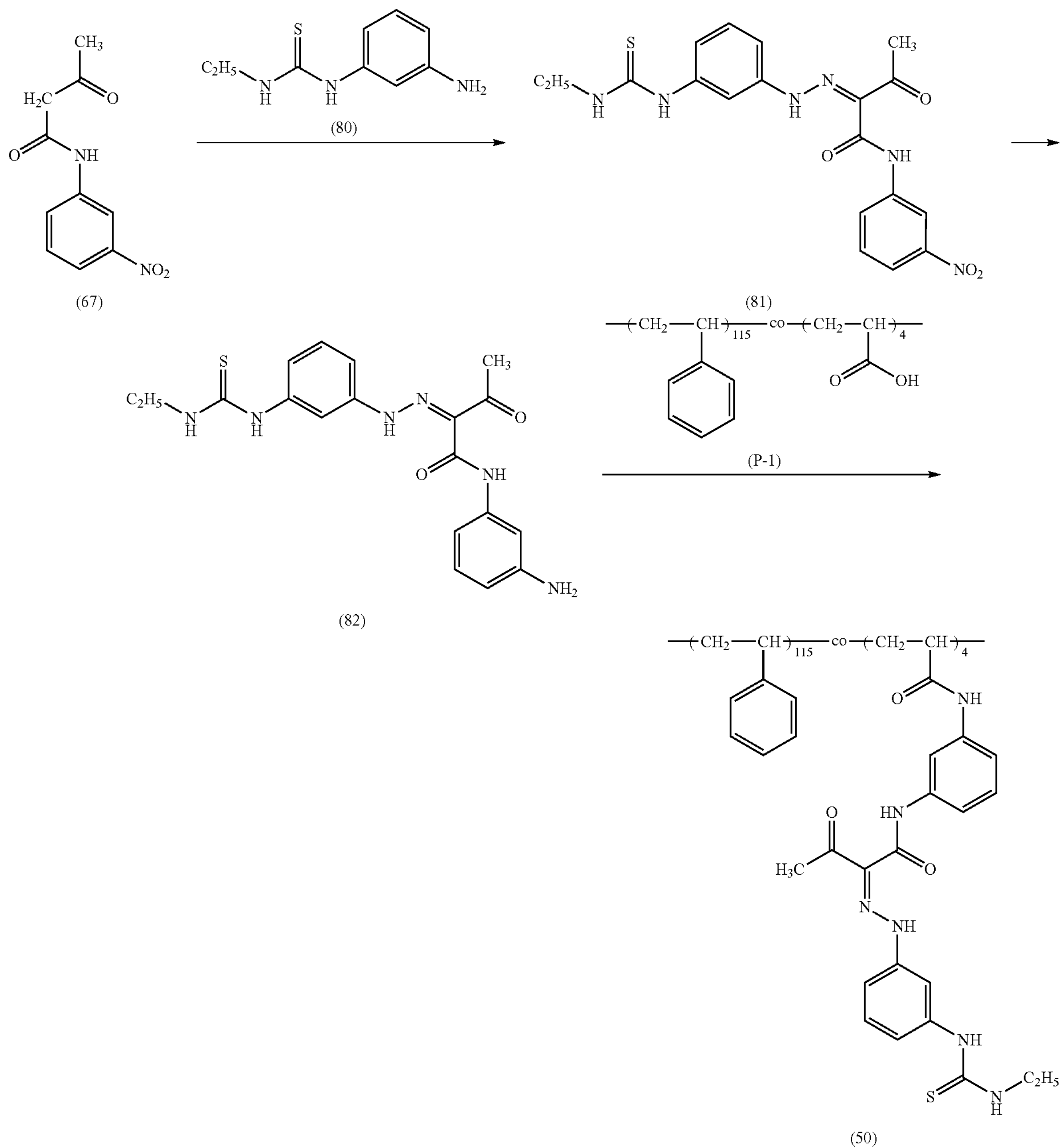

at 5 degrees Celsius or less for 3 hours. After the reaction was complete, the reaction solution was filtered, and the solvent was distilled away under reduced pressure. The resulting precipitate was washed with dilute hydrochloric acid, water, and methanol, yielding 13.7 parts of compound (81) (yield: 63.5%).

To a mixture of 5.0 parts of the obtained compound (81) and 103 parts of 1,4-dioxane, a solution of 1.83 parts of sodium hydrosulfide in 40 parts of water was added dropwise at room temperature. After the entire volume dropped, the solution was stirred for 28 hours at an elevated temperature of 50 degrees Celsius. After the reaction was complete, the reaction solution was poured into water, and the resulting precipitate was collected through filtration and washed with dilute hydrochloric acid, water, and methanol, yielding 2.9 parts of compound (82) (yield: 59.5%).

Then a solution of 10.0 parts of compound (P-1) in 100 parts of chloroform was stirred at room temperature for 24 hours while 2.23 parts of thionyl chloride was added dropwise. Then the reaction solution was condensed to release chloroform and an excess of thionyl chloride, the resulting plastic solid was collected and dissolved in 61.1 parts of N,N-dimethylacetamide, and the obtained solution was stirred with 1.77 parts of compound (82) in a nitrogen atmosphere at 65 degrees Celsius for 8 hours. After the reaction was complete, the reaction solution was condensed and subjected to reprecipitation using methanol, the resulting precipitate was collected through filtration, and the collected precipitate was washed through dispersion in methanol, yielding 11.0 parts of azo-skeleton-bearing compound (50).

The obtained compound was identified as having the structure of azo-skeleton-bearing compound (50) by the measurement described above. The following provides the results of the analysis.

Results of the Analysis of Azo-Skeleton-Bearing Compound (50)

(1) Results of molecular weight measurement (GPC):

Weight-average molecular weight (Mw)=16,345; number-average molecular weight (Mn)=12,346

(2) Results of acid value measurement:

3.00 mg KOH/g (3) Results of $^{13}C$ NMR (150 MHz, $CDCl_3$, room temperature) (see FIG. 5):

Delta (ppm)=199.4 (1C), 180.3 (1C), 174.4-173.7 (1C), 162.6 (1C), 145.8-145.1 (28.5C), 143.9, 143.1 (1C), 138.2-137.3, 131.0, 128.2-127.3, 125.6-125.5, 121.3 (1C), 116.4 (2C), 114.1 (1C), 112.2-111.6 (2C), 46.4-40.3, 26.3 (1C), 14.6 (1C)

These results of $^{13}C$ NMR data analysis were used to determine the number of the copolymer-constituting carbon atoms assigned to the individual peaks. These measurement results were used to calculate the number of each monomer unit of azo-skeleton-bearing compound (50), through which it was found that the compound had 102 styrene units and 4 azo skeletons.

<Example of the Production of Compound (53)>

Azo-skeleton-bearing compound (53) having the structure illustrated below was produced through the following scheme.

[Chem.33]

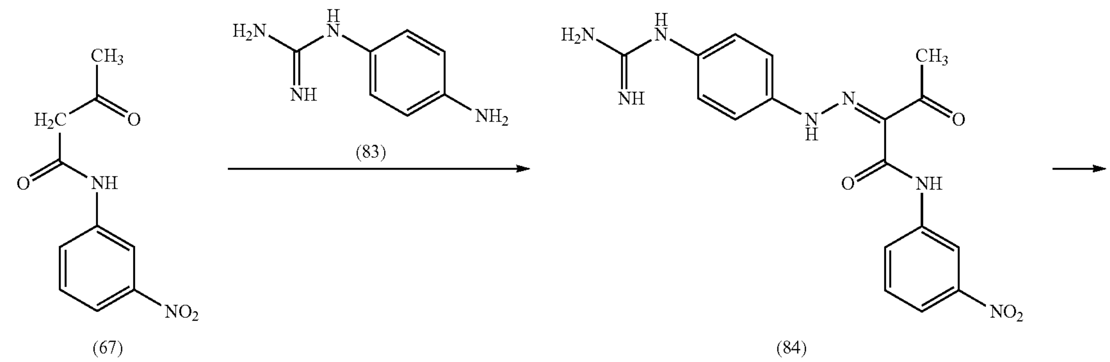

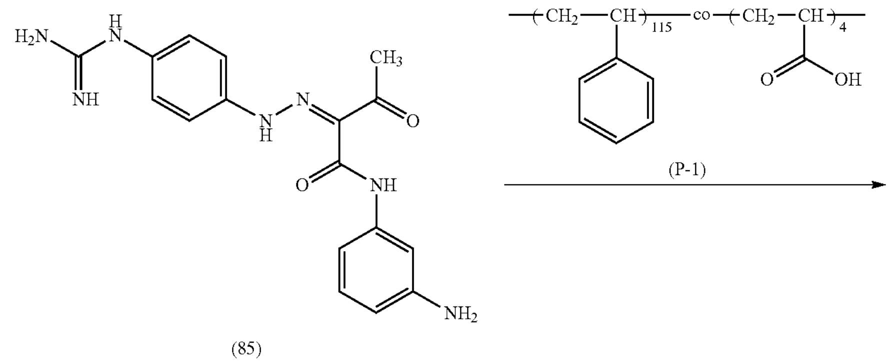

-continued

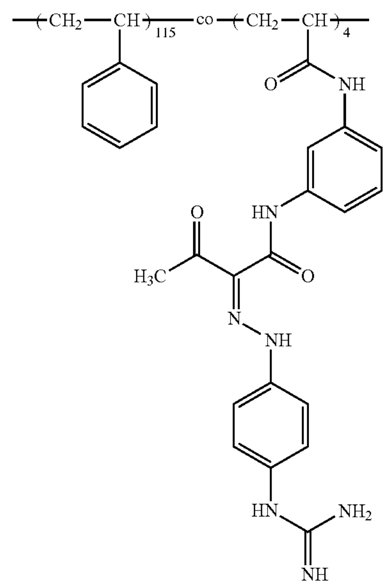

(53)

(In this scheme, the sign "co" means that the individual monomer units of the copolymer are randomly arranged.)

A mixture of 10.0 parts of compound (83) with 94.4 parts of N,N-dimethylformamide and 20.6 parts of concentrated hydrochloric acid was ice-cooled to 5 degrees Celsius or less. The cooled solution was stirred with a solution of 4.84 parts of sodium nitrite in 40 parts of water at the same temperature for 1 hour. Then 0.64 parts of amidosulfonic acid was added (a diazonium salt solution). A mixture of 94.4 parts of N,N-dimethylformamide with 14.6 parts of compound (67) and 45.7 parts of calcium carbonate was ice-cooled to 5 degrees Celsius or less, the diazonium salt solution was added, and the reaction was allowed to proceed at 5 degrees Celsius or less for 3 hours. After the reaction was complete, the reaction solution was filtered, and the collected precipitate was washed with dilute hydrochloric acid and water, yielding 22.7 parts of compound (84) (yield: 87.9%).

To a mixture of 15.0 parts of the obtained compound (84) and 155 parts of 1,4-dioxane, a solution of 9.12 parts of sodium hydrosulfide in 20 parts of water was added dropwise at room temperature. After the entire volume dropped, the solution was stirred for 24 hours at an elevated temperature of 65 degrees Celsius. After the reaction was complete, the reaction solution was poured into water, and the resulting precipitate was collected through filtration and washed with dilute hydrochloric acid, water, and methanol, yielding 4.9 parts of compound (85) (yield: 36.3%).

Then a solution of 10.0 parts of compound (P-1) in 100 parts of chloroform was stirred at room temperature for 24 hours while 2.23 parts of thionyl chloride was added dropwise. Then the reaction solution was condensed to release chloroform and an excess of thionyl chloride, the resulting plastic solid was collected and dissolved in 61.1 parts of N,N-dimethylacetamide, and the obtained solution was stirred with 1.62 parts of compound (85) in a nitrogen atmosphere at 65 degrees Celsius for 5 hours. After the reaction was complete, the reaction solution was condensed and subjected to reprecipitation using methanol, the resulting precipitate was collected through filtration, and the collected precipitate was washed through dispersion in methanol, yielding 11.0 parts of azo-skeleton-bearing compound (53).

The obtained compound was identified as having the structure of azo-skeleton-bearing compound (53) by the measurement described above. The following provides the results of the analysis.

Results of the Analysis of Azo-Skeleton-Bearing Compound (53)

(1) Results of molecular weight measurement (GPC):

Weight-average molecular weight (Mw)=17,590; number-average molecular weight (Mn)=15,780

(2) Results of acid value measurement:

0.00 mg KOH/g (3) Results of $^{13}C$ NMR (150 MHz, $CDCl_3$, room temperature) (see FIG. 6):

Delta (ppm)=199.3 (1C), 174.1 (1C), 162.6 (1C), 156.7 (1C), 145.5 (46.5C), 137.8-137.3 (3C), 128.0-127.3, 126.2-125.5, 117.1-116.3, 112.0 (1C), 96.5 (1C), 44.1-40.3, 26.2 (1C), 21.6 (1C)

These results of $^{13}C$ NMR data analysis were used to determine the number of the copolymer-constituting carbon atoms assigned to the individual peaks. These measurement results were used to calculate the number of each monomer unit of azo-skeleton-bearing compound (53), through which it was found that the compound had 136 styrene units and 4 azo skeletons.

<Examples of the Production of Compounds (26) to (38), (40) to (49), (51), (52), (55) to (62), and (64)>

Azo-skeleton-bearing compounds (26) to (38), (40) to (49), (51), (52), (55) to (62), and (64) detailed in Table 2 were produced through the same operations as in the examples of the production of compounds (25), (39), (50), (53), (54), and (63), except that the raw materials were changed.

Table 1 summarizes the structure of their polymer moiety, and Table 2 summarizes the structure of these azo-skeleton-bearing compounds.

TABLE 1

| Polymer Moieties | | | | | | | | | | | |
|---|---|---|---|---|---|---|---|---|---|---|---|
| Polymer moiety no. | Monomer sequence | X | $Y_1$ | $Y_2$ | Z | $R_{47}$ | $R_{48}$ | $R_{49}$ | $R_{50}$ | $R_{51}$ | $R_{52}$ |
| P-1 | poly(X-co-Z) | 115 | 0 | 0 | 4 | H | — | — | — | — | H |
| P-2 | poly($Y_1$-co-Z) | 0 | 90 | 0 | 10 | — | H | $COOC_4H_9$(n) | — | — | H |
| P-3 | poly(X-co-$Y_1$-co-Z) | 220 | 4 | 0 | 4 | H | H | $COOCH_3$ | — | — | H |
| P-4 | poly(X-co-$Y_1$-co-Z) | 101 | 3 | 0 | 5 | H | H | $COOCH_3$ | — | — | H |
| P-5 | poly(X-co-$Y_1$-co-Z) | 52 | 2 | 0 | 2 | H | H | $COOCH_3$ | — | — | H |
| P-6 | poly(X-co-$Y_1$-co-Z) | 101 | 4 | 0 | 4 | $CH_3$ | $CH_3$ | $COOCH_3$ | — | — | H |
| P-7 | poly(X-co-$Y_1$-co-Z) | 240 | 14 | 0 | 5 | H | H | $COOC_4H_9$(n) | — | — | H |
| P-8 | poly(X-co-$Y_1$-co-Z) | 88 | 8 | 0 | 4 | H | H | $COOCH_2CH(C_2H_5)C_4H_9$ | — | — | H |
| P-9 | poly(X-co-$Y_1$-co-Z) | 88 | 8 | 0 | 4 | H | H | $COOC_{18}H_{37}$(n) | — | — | H |
| P-10 | poly(X-co-$Y_1$-co-Z) | 99 | 4 | 0 | 4 | H | H | $COOC_{22}H_{45}$(n) | — | — | H |
| P-11 | poly(X-co-$Y_1$-co-$Y_2$-co-Z) | 75 | 13 | 3 | 3 | H | H | $COOCH_3$ | H | $COOC_{22}H_{45}$(n) | H |
| P-12 | poly(X-co-$Y_1$-co-$Y_2$-co-Z) | 59 | 28 | 4 | 3 | H | H | $COOC_4H_9$(n) | H | $COOC_{22}H_{45}$(n) | H |
| P-13 | polyX-b-polyZ | 84 | 0 | 0 | 5 | H | — | — | — | — | H |
| P-14 | Poly(X-co-$Y_1$)-b-polyZ | 74 | 14 | 0 | 2 | H | H | $COOC_4H_9$(n) | — | — | H |
| P-15 | α-W-polyX | 101 | 0 | 0 | 0 | H | — | — | — | — | — |
| P-16 | α-W-poly$Y_1$ | 0 | 101 | 0 | 0 | — | H | $COOC_4H_9$(n) | — | — | — |
| P-17 | α-W-poly(X-co-$Y_1$) | 71 | 18 | 0 | 0 | H | H | $COOCH_3$ | — | — | — |
| P-18 | α-W-poly(X-co-$Y_1$) | 71 | 18 | 0 | 0 | H | H | $COOC_4H_9$(n) | — | — | — |
| P-19 | α-W-poly(X-co-$Y_1$) | 71 | 18 | 0 | 0 | H | H | $CONH_2$ | — | — | — |
| P-20 | α-W-poly(X-co-$Y_1$) | 71 | 18 | 0 | 0 | H | H | COOBn | — | — | — |

(In Table 1, the prefix alpha means that either end of the structure has a substituent. W represents a COOH group, and X, $Y_1$, $Y_2$, and Z represent the monomer units illustrated below. "Bn" represents an unsubstituted benzyl group, and (n) means that the alkyl group is linear. The sign co means that the individual monomer units of the copolymer are randomly arranged. The sign b means that the individual monomer units of the copolymer are arranged in blocks.)

[Chem. 34]

X

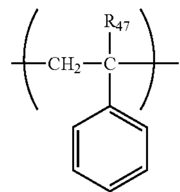

(In formula X, $R_{47}$ represents a hydrogen atom or an alkyl group.)

[Chem. 35]

$Y_1$

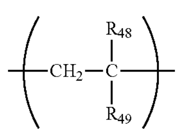

(In formula $Y_1$, $R_{48}$ represents a hydrogen atom or an alkyl group, and $R_{49}$ represents a carboxylic acid ester group or a carboxylic acid amide group.)

[Chem. 36]

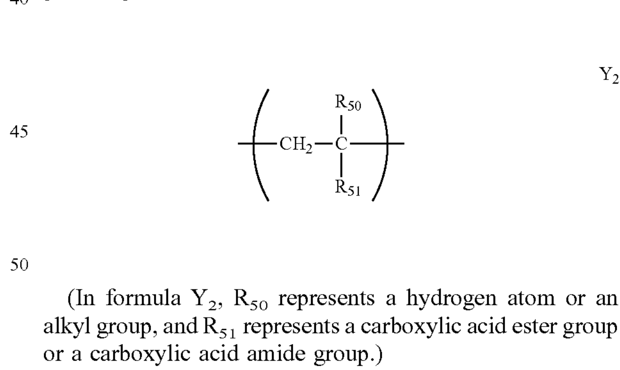

(In formula $Y_2$, $R_{50}$ represents a hydrogen atom or an alkyl group, and $R_{51}$ represents a carboxylic acid ester group or a carboxylic acid amide group.)

[Chem. 37]

Z $R_{52}$, $CH_2$, C, O, OH (In formula Z, $R_{52}$ represents a hydrogen atom or an alkyl group.)

TABLE 2

Azo-Skeleton-Bearing Compounds

| Compound no. | Polymer moiety | Link to polymer moiety | No. of introduced azo skeletons | $R_1$ | $R_2$ | $R_3$ | $R_4$ | $R_5$ | $R_6$ | $R_{11}$ | $R_{12}$ | $R_{13}$ | $R_{14}$ | $R_{15}$ |
|---|---|---|---|---|---|---|---|---|---|---|---|---|---|---|
| (25) | P-1 | Z | 4 | $CH_3$ | H | H | H | $L_1$ | H | H | $NHCONH_2$ | H | H | H |
| (26) | P-2 | Z | 10 | $CH_3$ | H | H | H | $L_1$ | H | H | $NHCONH_2$ | H | H | H |
| (27) | P-3 | Z | 4 | $CH_3$ | H | H | H | $L_1$ | H | H | $NHCONH_2$ | H | H | H |
| (28) | P-4 | Z | 5 | $CH_3$ | H | H | H | $L_1$ | H | H | $NHCONH_2$ | H | H | H |
| (29) | P-5 | Z | 2 | $CH_3$ | H | H | H | $L_1$ | H | H | $NHCONH_2$ | H | H | H |
| (30) | P-6 | Z | 4 | $CH_3$ | H | H | H | $L_1$ | H | H | $NHCONH_2$ | H | H | H |
| (31) | P-7 | Z | 5 | $CH_3$ | H | H | H | $L_1$ | H | H | $NHCONH_2$ | H | H | H |
| (32) | P-8 | Z | 4 | $CH_3$ | H | H | H | $L_1$ | H | H | $NHCONH_2$ | H | H | H |
| (33) | P-9 | Z | 4 | $CH_3$ | H | H | H | $L_1$ | H | H | $NHCONH_2$ | H | H | H |
| (34) | P-10 | Z | 4 | $CH_3$ | H | H | H | $L_1$ | H | H | $NHCONH_2$ | H | H | H |
| (35) | P-11 | Z | 3 | $CH_3$ | H | H | H | $L_1$ | H | H | $NHCONH_2$ | H | H | H |
| (36) | P-12 | Z | 3 | $CH_3$ | H | H | H | $L_1$ | H | H | $NHCONH_2$ | H | H | H |
| (37) | P-13 | Z | 5 | $CH_3$ | H | H | H | $L_1$ | H | H | $NHCONH_2$ | H | H | H |
| (38) | P-14 | Z | 2 | $CH_3$ | H | H | H | $L_1$ | H | H | $NHCONH_2$ | H | H | H |
| (39) | P-15 | W | 1 | $CH_3$ | H | H | H | $L_2$ | H | H | $NHCONH_2$ | H | H | H |
| (40) | P-16 | W | 1 | $CH_3$ | H | H | H | $L_3$ | H | H | $NHCONH_2$ | H | H | H |
| (41) | P-17 | W | 1 | $CH_3$ | H | H | H | $L_4$ | H | H | $NHCONH_2$ | H | H | H |
| (42) | P-18 | W | 1 | $CH_3$ | H | H | H | $L_5$ | H | H | $NHCONH_2$ | H | H | H |
| (43) | P-19 | W | 1 | $CH_3$ | H | H | H | $L_6$ | H | H | $NHCONH_2$ | H | H | H |
| (44) | P-20 | W | 1 | $CH_3$ | H | H | H | $L_7$ | H | H | $NHCONH_2$ | H | H | H |
| (45) | P-1 | Z | 4 | $CH_3$ | H | H | H | $L_1$ | H | $NHCONH_2$ | H | H | H | H |
| (46) | P-1 | Z | 4 | $CH_3$ | H | H | H | $L_1$ | H | H | H | $NHCONH_2$ | H | H |
| (47) | P-1 | Z | 4 | $CH_3$ | H | H | H | $L_1$ | H | H | NHCONHBn | H | H | H |
| (48) | P-1 | Z | 4 | $CH_3$ | H | H | H | $L_1$ | H | H | NHCONHEt | H | H | H |
| (49) | P-1 | Z | 4 | $CH_3$ | H | H | H | $L_1$ | H | H | NHCSN—$I_2$ | H | H | H |
| (50) | P-1 | Z | 4 | $CH_3$ | H | H | H | $L_1$ | H | H | NHCSNHEt | H | H | H |
| (51) | P-1 | Z | 4 | $CH_3$ | H | H | H | $L_1$ | H | H | NHCN(Boc)NHBoc | H | H | H |
| (52) | P-1 | Z | 4 | $CH_3$ | H | H | H | $L_1$ | H | H | NHCN(Cbz)NHCbz | H | H | H |
| (53) | P-1 | Z | 4 | $CH_3$ | H | H | H | $L_1$ | H | H | H | $NHCNHNH_2$ | H | H |
| (54) | P-1 | Z | 4 | $CH_3$ | H | H | H | $NHCONH_2$ | H | H | $L_1$ | H | H | H |
| (55) | P-1 | Z | 4 | $CH_3$ | H | H | $NHCONH_2$ | H | H | H | $L_1$ | H | H | H |
| (56) | P-1 | Z | 4 | $CH_3$ | H | H | H | $L_1$ | H | H | $NHCONH_2$ | Cl | H | H |
| (57) | P-1 | Z | 4 | $CH_3$ | H | H | H | $L_1$ | H | H | $NHCONH_2$ | $CH_3$ | H | H |
| (58) | P-1 | Z | 4 | $CH_3$ | H | H | H | $L_1$ | H | H | $NHCONH_2$ | OH | H | H |
| (59) | P-1 | Z | 4 | $CH_3$ | H | H | H | $L_1$ | H | H | $NHCONH_2$ | $OCH_3$ | H | H |
| (60) | P-1 | Z | 4 | $CH_3$ | H | H | H | $L_1$ | H | H | $NHCONH_2$ | COOH | H | H |
| (61) | P-1 | Z | 4 | $CH_3$ | H | H | H | $L_1$ | H | H | CN | $NHCONH_2$ | H | H |
| (62) | P-1 | Z | 4 | $CH_3$ | H | H | H | $L_1$ | H | $CF_3$ | H | $NHCONH_2$ | H | H |
| (63) | P-1 | Z | 3 | $CH_3$ | H | H | H | $L_1$ | H | H | H | —NHCONH— | | H |
| (64) | P-1 | Z | 4 | $CH_3$ | H | H | —NHCONH— | | H | H | $L_1$ | H | H | H |

(In Table 2, $R_1$ to $R_6$ and $R_{11}$ to $R_{15}$ have the same meaning as $R_1$ to $R_6$ and $R_{11}$ to $R_{15}$, respectively, in formula (4). "Et," "Bn," "Boc," and "Cbz" represent an ethyl group, a benzyl group, a tert-butoxycarbonyl group, and a benzyloxycarbonyl group, respectively. In Table 2, compounds with "Z" as the "link to polymer moiety" form a linking group by binding to a COOH group in monomer unit "Z" in the polymer moiety in Table 1. Compounds with "W" as the "link to polymer moiety" form a linking group by binding to the COOH group represented by "W" in the polymer moiety in Table 1. $L_1$ to $L_7$ in Table 2 are linking groups having the following structures.)

[Chem.38]

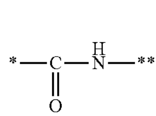

$L_1$

-continued

[Chem.39]

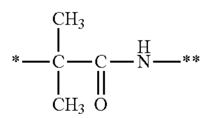

$L_2$

[Chem.40]

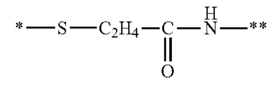

$L_3$

[Chem.41]

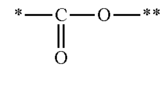

$L_4$

[Chem.42]

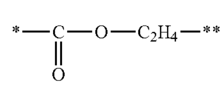

$L_5$

-continued

[Chem.43]

L6

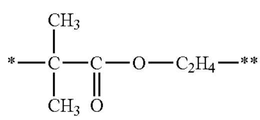

[Chem.44]

L7

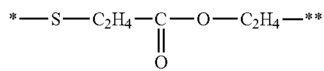

(The symbol "*" in $L_1$ to $L_7$ is a site where the group binds to a carbon atom in the polymer moiety in Table 1, and "**" is a binding site in the azo skeleton in Table 2.)

Comparative Example 1

Then the following comparative azo compound (65) was synthesized in accordance with Example 2 in Japanese Patent Laid-Open No. 2012-067285 (Example 3 of the synthesis of a pigment compound).

[Chem. 45]

Formula (65)

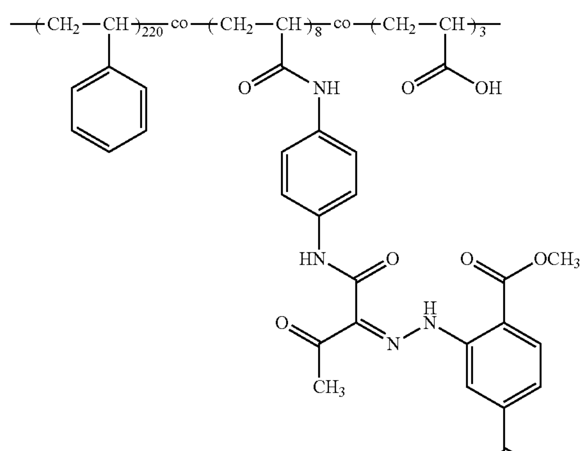

Example 2-1

Yellow pigment dispersions were prepared as follows.

Example 1 of the Preparation of Yellow Pigment Dispersion

Yellow pigment represented by formula (Pig-A) (C.I. Pigment Yellow 155), 18.0 parts
Azo-skeleton-bearing compound (25), 180 parts
Styrene as a non-water-soluble solvent, 180 parts
Glass beads (1-mm diameter), 130 parts A mixture of these materials was dispersed using an attritor (Nippon Coke & Engineering) for 3 hours and then filtered through a mesh screen, yielding yellow pigment dispersion (Dis-Y1).

[Chem. 46]

(Pig-A)

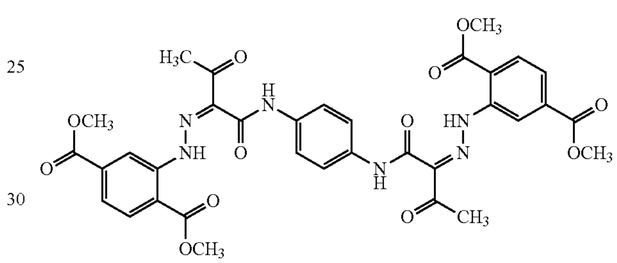

Example 2 of the Preparation of Yellow Pigment Dispersion

Yellow pigment dispersions (Dis-Y2) to (Dis-Y40) were obtained through the same operations as in Example 1 of the preparation of yellow pigment dispersion, except that azo-skeleton-bearing compound (25) was changed to one of azo-skeleton-bearing compounds (26) to (64).

Example 3 of the Preparation of Yellow Pigment Dispersion

Yellow pigment dispersions (Dis-Y41) and (Dis-Y42) were obtained through the same operations as in Example 1 of the preparation of yellow pigment dispersion, except that C.I. Pigment Yellow 155, formula (Pig-A), was changed to C.I. Pigment Yellow 180, formula (Pig-B), or C.I. Pigment Yellow 185, formula (Pig-C).

[Chem. 47]

(Pig-B)

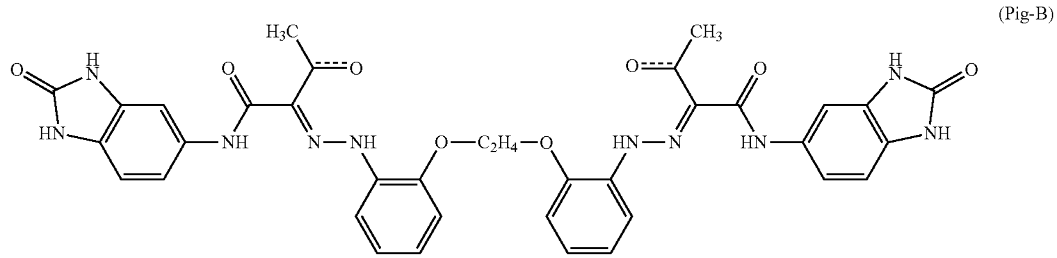

-continued

[Chem. 48]

(Pig-C)

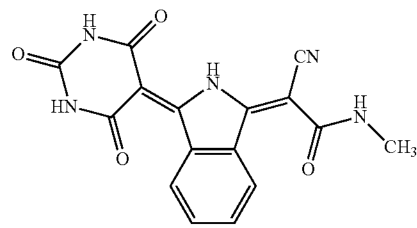

Example 4 of the Preparation of Yellow Pigment Dispersion

Yellow pigment represented by formula (Pig-A) (C.I. Pigment Yellow 155), 42.0 parts Azo-skeleton-bearing compound (25), 4.2 parts These materials were dry-mixed using NHS-0 hybridization system (Nara Machinery), yielding a pigment composition.

The obtained pigment composition, 19.8 parts

Styrene, 180 parts

Glass beads (1-mm diameter), 130 parts

A mixture of these materials was dispersed using a paint shaker (Toyo Seiki Seisakusho) for 1 hour and then filtered through a mesh screen, yielding yellow pigment dispersion (Dis-Y43).

Comparative Example 2-1

Reference yellow pigment dispersions to provide reference values for evaluation and comparative yellow pigment dispersions were prepared as follows.

Example 1 of the Preparation of Reference Yellow Pigment Dispersion

Reference yellow pigment dispersion (Dis-Y44) was obtained through the same operations as in Example 1 of the preparation of yellow pigment dispersion, except that azo-skeleton-bearing compound (25) was not added.

Example 2 of the Preparation of Reference Yellow Pigment Dispersion

Reference yellow pigment dispersions (Dis-Y45) and (Dis-Y46) were obtained through the same operations as in Example 3 of the preparation of yellow pigment dispersion, except that azo-skeleton-bearing compound (25) was not added.

Example 3 of the Preparation of Reference Yellow Pigment Dispersion

Reference yellow pigment dispersion (Dis-Y47) was obtained through the same operations as in Example 4 of the preparation of yellow pigment dispersion, except that azo-skeleton-bearing compound (25) was not added.

Example 1 of the Preparation of Comparative Yellow Pigment Dispersion

Comparative yellow pigment dispersions (Dis-Y48) to (Dis-Y51) were obtained through the same operations as in Example 1 of the preparation of yellow pigment dispersion, except that azo-skeleton-bearing compound (25) was changed as follows.

Comparative Yellow Pigment Dispersion (Dis-Y48):

Comparative azo compound (65) (comparative compound 1)

Comparative Yellow Pigment Dispersion (Dis-Y49):

DISPARLON DA-703-50 (Kusumoto Chemicals, acid value=15 mg KOH/g, amine value=40 mg KOH/g), described in PTL 2 (comparative compound 2)

Comparative Yellow Pigment Dispersion (Dis-Y50):

The methyl methacrylate-sodium styrene sulfonate copolymer described in PTL 3 (comparative compound 3)

Comparative Yellow Pigment Dispersion (Dis-Y51):

The styrene-butyl acrylate block copolymer described in PTL 4 (the proportions of the monomer units on a mass basis=95/5) (Mw=9,718) (comparative compound 4)

Example 2-2

Magenta pigment dispersions were prepared as follows.

Example 1 of the Preparation of Magenta Pigment Dispersion

Magenta pigment represented by formula (Pig-D) (C.I. Pigment Red 122), 18.0 parts Azo-skeleton-bearing compound (25), 180 parts Styrene as a non-water-soluble solvent, 180 parts Glass beads (1-mm diameter), 130 parts A mixture of these materials was dispersed using an attritor (Nippon Coke & Engineering) for 3 hours and then filtered through a mesh screen, yielding magenta pigment dispersion (Dis-M1).

[Chem. 49]

(Pig-D)

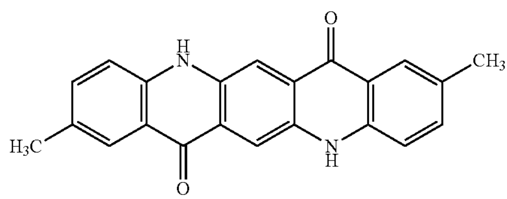

Example 2 of the Preparation of Magenta Pigment Dispersion

Magenta pigment dispersions (Dis-M2) to (Dis-M40) were obtained through the same operations as in Example 1 of the preparation of magenta pigment dispersion, except that azo-skeleton-bearing compound (25) was changed to one of azo-skeleton-bearing compounds (26) to (64).

Example 3 of the Preparation of Magenta Pigment Dispersion

Magenta pigment dispersions (Dis-M41) and (Dis-M42) were obtained through the same operations as in Example 1 of the preparation of magenta pigment dispersion, except that C.I. Pigment Red 122, formula (Pig-D), was changed to C.I. Pigment Red 255, formula (Pig-E), or C.I. Pigment Red 150, formula (Pig-F).

[Chem. 50]

(Pig-E)

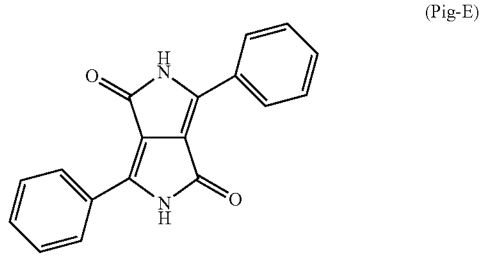

[Chem. 51]

(Pig-F)

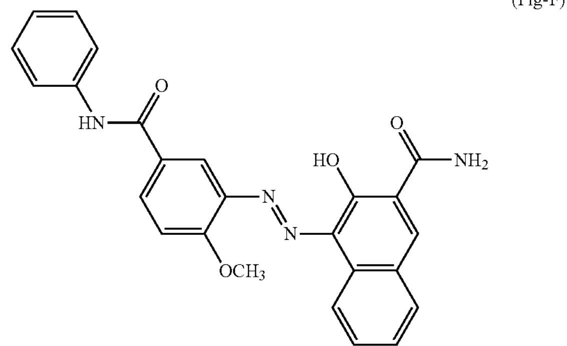

Example 4 of the Preparation of Magenta Pigment Dispersion

Magenta pigment represented by formula (Pig-D) (C.I. Pigment Red 122), 42.0 parts Azo-skeleton-bearing compound (25), 4.2 parts These materials were dry-mixed using NHS-0 hybridization system (Nara Machinery), yielding a pigment composition.

The obtained pigment composition, 19.8 parts

Styrene, 180 parts

Glass beads (1-mm diameter), 130 parts

A mixture of these materials was dispersed using a paint shaker (Toyo Seiki Seisakusho) for 1 hour and then filtered through a mesh screen, yielding magenta pigment dispersion (Dis-M43).

Comparative Example 2-2

Reference magenta pigment dispersions to provide reference values for evaluation and comparative magenta pigment dispersions were prepared as follows.

Example 1 of the Preparation of Reference Magenta Pigment Dispersion

Reference magenta pigment dispersion (Dis-M44) was obtained through the same operations as in Example 1 of the preparation of magenta pigment dispersion, except that azo-skeleton-bearing compound (25) was not added.

Example 2 of the Preparation of Reference Magenta Pigment Dispersion

Reference magenta pigment dispersions (Dis-M45) and (Dis-M46) were obtained through the same operations as in Example 3 of the preparation of magenta pigment dispersion, except that azo-skeleton-bearing compound (25) was not added.

Example 3 of the Preparation of Reference Magenta Pigment Dispersion

Reference magenta pigment dispersion (Dis-M47) was obtained through the same operations as in Example 4 of the preparation of magenta pigment dispersion, except that azo-skeleton-bearing compound (25) was not added.

Example 1 of the Preparation of Comparative Magenta Pigment Dispersion

Comparative magenta pigment dispersions (Dis-M48) to (Dis-M51) were obtained through the same operations as in Example 1 of the preparation of magenta pigment dispersion, except that azo-skeleton-bearing compound (25) was changed as follows.

Comparative Magenta Pigment Dispersion (Dis-M48):

Comparative azo compound (65) (comparative compound 1)

Comparative Magenta Pigment Dispersion (Dis-M49):

DISPARLON DA-703-50 (Kusumoto Chemicals, acid value=15 mg KOH/g, amine value=40 mg KOH/g), described in PTL 2 (comparative compound 2)

Comparative Magenta Pigment Dispersion (Dis-M50):

The methyl methacrylate-sodium styrene sulfonate copolymer described in PTL 3 (comparative compound 3)

Comparative Magenta Pigment Dispersion (Dis-M51):

The styrene-butyl acrylate block copolymer described in PTL 4 (the proportions of the monomer units on a mass basis=95/5) (Mw=9,718) (comparative compound 4)

Example 2-3

Cyan pigment dispersions were prepared as follows.

Example 1 of the Preparation of Cyan Pigment Dispersion

Cyan pigment represented by formula (Pig-G) (C.I. Pigment Blue 15:3), 18.0 parts Azo-skeleton-bearing compound (25), 180 parts Styrene as a non-water-soluble solvent, 180 parts Glass beads (1-mm diameter), 130 parts A mixture of these materials was dispersed using an attritor (Nippon Coke & Engineering) for 3 hours and then filtered through a mesh screen, yielding cyan pigment dispersion (Dis-C1).

[Chem. 52]

(Pig-G)

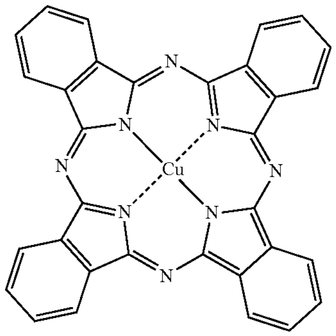

Example 2 of the Preparation of Cyan Pigment Dispersion

Cyan pigment dispersions (Dis-C2) to (Dis-C40) were obtained through the same operations as in Example 1 of the preparation of cyan pigment dispersion, except that azo-skeleton-bearing compound (25) was changed to one of azo-skeleton-bearing compounds (26) to (64).

Example 3 of the Preparation of Cyan Pigment Dispersion

Cyan pigment dispersions (Dis-C41) and (Dis-C42) were obtained through the same operations as in Example 1 of the preparation of cyan pigment dispersion, except that C.I. Pigment Blue 15:3, formula (Pig-G), was changed to C.I. Pigment Blue 16, formula (Pig-H), or C.I. Pigment Blue 17:1, formula (Pig-I).

[Chem. 53]

(Pig-H)

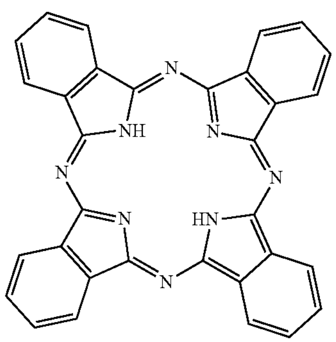

-continued

[Chem. 54]

(Pig-I)

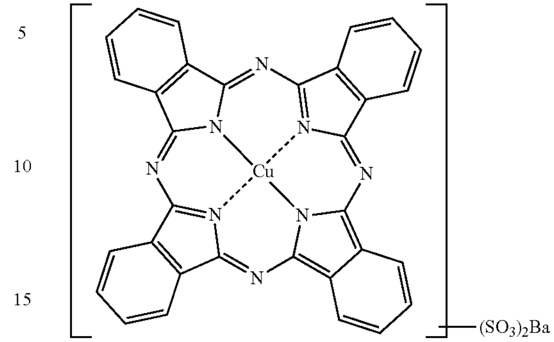

Example 4 of the Preparation of Cyan Pigment Dispersion

Cyan pigment represented by formula (Pig-G) (C.I. Pigment Blue 15:3), 42.0 parts Azo-skeleton-bearing compound (25), 4.2 parts These materials were dry-mixed using NHS-0 hybridization system (Nara Machinery), yielding a pigment composition.

The obtained pigment composition, 19.8 parts

Styrene, 180 parts

Glass beads (1-mm diameter), 130 parts

A mixture of these materials was dispersed using a paint shaker (Toyo Seiki Seisakusho) for 1 hour and then filtered through a mesh screen, yielding cyan pigment dispersion (Dis-C43).

Comparative Example 2-3

Cyan pigment dispersions to provide reference values for evaluation and comparative cyan pigment dispersions were prepared as follows.

Example 1 of the Preparation of Reference Cyan Pigment Dispersion

Reference cyan pigment dispersion (Dis-C44) was obtained through the same operations as in Example 1 of the preparation of cyan pigment dispersion, except that azo-skeleton-bearing compound (25) was not added.

Example 2 of the Preparation of Reference Cyan Pigment Dispersion

Reference cyan pigment dispersions (Dis-C45) and (Dis-C46) were obtained through the same operations as in Example 3 of the preparation of cyan pigment dispersion, except that azo-skeleton-bearing compound (25) was not added.

Example 3 of the Preparation of Reference Cyan Pigment Dispersion

Reference cyan pigment dispersion (Dis-C47) was obtained through the same operations as in Example 4 of the preparation of cyan pigment dispersion, except that azo-skeleton-bearing compound (25) was not added.

Example 1 of the Preparation of Comparative Cyan Pigment Dispersion

Comparative cyan pigment dispersions (Dis-C48) to (Dis-C51) were obtained through the same operations as in Example 1 of the preparation of cyan pigment dispersion, except that azo-skeleton-bearing compound (25) was changed as follows.

Comparative Cyan Pigment Dispersion (Dis-C48):

Comparative azo compound (65) (comparative compound 1)

Comparative Cyan Pigment Dispersion (Dis-C49):

DISPARLON DA-703-50 (Kusumoto Chemicals, acid value=15 mg KOH/g, amine value=40 mg KOH/g), described in PTL 2 (comparative compound 2)

Comparative Cyan Pigment Dispersion (Dis-C50):

The methyl methacrylate-sodium styrene sulfonate copolymer described in PTL 3 (comparative compound 3)

Comparative Cyan Pigment Dispersion (Dis-C51):

The styrene-butyl acrylate block copolymer described in PTL 4 (the proportions of the monomer units on a mass basis=95/5) (Mw=9,718) (comparative compound 4)

Example 2-4

Black pigment dispersions were prepared as follows.

Example 1 of the Preparation of Cyan Pigment Dispersion

Carbon black as a black pigment (specific surface area=65 $m^2$/g, average particle diameter=30 nm, pH=9.0), 30.0 parts Azo-skeleton-bearing compound (25), 3.0 parts Styrene as a non-water-soluble solvent, 150 parts Glass beads (1-mm diameter), 130 parts A mixture of these materials was dispersed using an attritor (Nippon Coke & Engineering) for 3 hours and then filtered through a mesh screen, yielding black pigment dispersion (Dis-Bk1).

Example 2 of the Preparation of Black Pigment Dispersion

Black pigment dispersions (Dis-Bk2) to (Dis-Bk40) were obtained through the same operations as in Example 1 of the preparation of black pigment dispersion, except that azo-skeleton-bearing compound (25) was changed to one of azo-skeleton-bearing compounds (26) to (64).

Example 3 of the Preparation of Black Pigment Dispersion

Black pigment dispersions (Dis-Bk41) and (Dis-Bk42) were obtained through the same operations as in Example 1 of the preparation of black pigment dispersion, except that the carbon black (specific surface area=65 $m^2$/g, average particle diameter=30 nm, pH=9.0) was changed to another kind of carbon black (specific surface area=77 $m^2$/g, average particle diameter=28 nm, pH=7.5 or specific surface area=370 $m^2$/g, average particle diameter=13 nm, pH=3.0).

Example 4 of the Preparation of Black Pigment Dispersion

Carbon black as a black pigment (specific surface area=65 $m^2$/g, average particle diameter=30 nm, pH=9.0), 42.0 parts Azo-skeleton-bearing compound (25), 4.2 parts These materials were dry-mixed using NHS-0 hybridization system (Nara Machinery), yielding a pigment composition.

The obtained pigment composition, 33.0 parts

Styrene, 150 parts

Glass beads (1-mm diameter), 130 parts

A mixture of these materials was dispersed using a paint shaker (Toyo Seiki Seisakusho) for 1 hour and then filtered through a mesh screen, yielding black pigment dispersion (Dis-Bk43).

Comparative Example 2-4

Black pigment dispersions to provide reference values for evaluation and comparative black pigment dispersions were prepared as follows.

Example 1 of the Preparation of Reference Black Pigment Dispersion

Reference black pigment dispersion (Dis-Bk44) was obtained through the same operations as in Example 1 of the preparation of black pigment dispersion, except that azo-skeleton-bearing compound (25) was not added.

Example 2 of the Preparation of Reference Black Pigment Dispersion

Reference black pigment dispersions (Dis-Bk45) and (Dis-Bk46) were obtained through the same operations as in Example 3 of the preparation of black pigment dispersion, except that azo-skeleton-bearing compound (25) was not added.

Example 3 of the Preparation of Reference Black Pigment Dispersion

Reference cyan pigment dispersion (Dis-Bk47) was obtained through the same operations as in Example 4 of the preparation of cyan pigment dispersion, except that azo-skeleton-bearing compound (25) was not added.

Example 1 of the Preparation of Comparative Black Pigment Dispersion

Comparative black pigment dispersions (Dis-Bk48) to (Dis-Bk51) were obtained through the same operations as in Example 1 of the preparation of black pigment dispersion, except that azo-skeleton-bearing compound (25) was changed as follows.

Comparative Black Pigment Dispersion (Dis-Bk48):

Comparative azo compound (65) (comparative compound 1)

Comparative Black Pigment Dispersion (Dis-Bk49):

DISPARLON DA-703-50 (Kusumoto Chemicals, acid value=15 mg KOH/g, amine value=40 mg KOH/g), described in PTL 2 (comparative compound 2)

Comparative Black Pigment Dispersion (Dis-Bk50):

The methyl methacrylate-sodium styrene sulfonate copolymer described in PTL 3 (comparative compound 3)

Comparative Black Pigment Dispersion (Dis-Bk51):

The styrene-butyl acrylate block copolymer described in PTL 4 (the proportions of the monomer units on a mass basis=95/5) (Mw=9,718) (comparative compound 4)

Example 3-1

These pigment dispersions of different colors were evaluated as follows.

Evaluation of Pigment Dispersibility

The dispersibility of pigment in the azo-skeleton-bearing compounds according to certain embodiments of the invention was evaluated through a gloss test in which the following pigment dispersions were used to form coatings.

Yellow pigment dispersions (Dis-Y1) to (Dis-Y43)

Magenta pigment dispersions (Dis-M1) to (Dis-M43)

Cyan pigment dispersions (Dis-C1) to (Dis-C43)

Black pigment dispersions (Dis-Bk1) to (Dis-Bk43)

The following is a detailed description of the evaluation method.

The pigment dispersion was dropped on a piece of art paper (SA Kinfuji 180 kg 80×160, Oji Paper) using a chemical dropper, evenly spread over the art paper using a wire bar (#10), and dried, and the gloss of the dried coating (angle of reflection: 75 degrees) was measured using VG2000 Gloss Meter (Nippon Denshoku Industries) and evaluated using the criteria below. The smoothness of a coating, and therefore the gloss of the coating, improves with increasing fineness of the dispersion of pigment.

The percentage improvements of gloss level achieved with yellow pigment dispersions (Dis-Y1) to (Dis-Y40) were based on the gloss level obtained using reference yellow pigment dispersion (Dis-Y44). The percentage improvement of gloss level achieved with yellow pigment dispersion (Dis-Y41) was based on the gloss level obtained using reference yellow pigment dispersion (Dis-Y45). The percentage improvement of gloss level achieved with yellow pigment dispersion (Dis-Y42) was based on the gloss level obtained using reference yellow pigment dispersion (Dis-Y46). The percentage improvement of gloss level achieved with yellow pigment dispersion (Dis-Y43) was based on the gloss level obtained using reference yellow pigment dispersion (Dis-Y47).

The percentage improvements of gloss level achieved with magenta pigment dispersions (Dis-M1) to (Dis-M40) were based on the gloss level obtained using reference magenta pigment dispersion (Dis-M44). The percentage improvement of gloss level achieved with magenta pigment dispersion (Dis-M41) was based on the gloss level obtained using reference magenta pigment dispersion (Dis-M45). The percentage improvement of gloss level achieved with magenta pigment dispersion (Dis-M42) was based on the gloss level obtained using reference magenta pigment dispersion (Dis-M46). The percentage improvement of gloss level achieved with magenta pigment dispersion (Dis-M43) was based on the gloss level obtained using reference magenta pigment dispersion (Dis-M47).

The percentage improvements of gloss level achieved with cyan pigment dispersions (Dis-C1) to (Dis-C40) were based on the gloss level obtained using reference cyan pigment dispersion (Dis-C44). The percentage improvement of gloss level achieved with cyan pigment dispersion (Dis-C41) was based on the gloss level obtained using reference cyan pigment dispersion (Dis-C45). The percentage improvement of gloss level achieved with cyan pigment dispersion (Dis-C42) was based on the gloss level obtained using reference cyan pigment dispersion (Dis-C46). The percentage improvement of gloss level achieved with cyan pigment dispersion (Dis-C43) was based on the gloss level obtained using reference cyan pigment dispersion (Dis-C47).

The following is the criteria used to evaluate pigment dispersions for each color.

Criteria Used to Evaluate Yellow Pigment Dispersions

A: The percentage improvement of gloss level was 10% or more.

B: The percentage improvement of gloss level was 5% or more and less than 10%.

C: The percentage improvement of gloss level was 0% or more and less than 5%.

D: The gloss level decreased.

Yellow pigment dispersions were judged to be good in terms of the dispersibility of pigment if the percentage improvement of gloss level therewith was 5% or more.

Criteria Used to Evaluate Magenta Pigment Dispersions

A: The percentage improvement of gloss level was 35% or more.

B: The percentage improvement of gloss level was 20% or more and less than 35%.

C: The percentage improvement of gloss level was 5% or more and less than 20%.

D: The percentage improvement of gloss level was less than 5% less than 20%.

Magenta pigment dispersions were judged to be good in terms of the dispersibility of pigment if the percentage improvement of gloss level therewith was 20% or more.

Criteria Used to Evaluate Cyan Pigment Dispersions

A: The percentage improvement of gloss level was 25% or more.

B: The percentage improvement of gloss level was 15% or more and less than 25%.

C: The percentage improvement of gloss level was 5% or more and less than 15%.

D: The percentage improvement of gloss level was less than 5%.

Cyan pigment dispersions were judged to be good in terms of the dispersibility of pigment if the percentage improvement of gloss level therewith was 15% or more.

Criteria Used to Evaluate Black Pigment Dispersions

A: The gloss level was 80 or more.

B: The gloss level was 50 or more and less than 80.

C: The gloss level was 20 or more and less than 50.

D: The gloss level was less than 20.

Black pigment dispersions were judged to be good in terms of the dispersibility of pigment if the gloss level obtained therewith was 50 or more.

Comparative Example 3-2

The gloss of coatings of comparative yellow pigment dispersions (Dis-Y48) to (Dis-Y51), comparative magenta pigment dispersions (Dis-M48) to (Dis-M51), comparative cyan pigment dispersions (Dis-C48) to (Dis-C51), and comparative black pigment dispersions (Dis-Bk48) to (Dis-Bk51) was evaluated as in Example 3-1.

The percentage improvements of gloss level with comparative yellow pigment dispersions (Dis-Y48) to (Dis-Y51) were based on the gloss level obtained using reference yellow pigment dispersion (Dis-Y44). The percentage improvements of gloss level with comparative magenta pigment dispersions (Dis-M48) to (Dis-M51) were based on the gloss level obtained using reference magenta pigment dispersion (Dis-M44). The percentage improvements of gloss level with comparative cyan pigment dispersions (Dis-C48) to (Dis-C51) were based on the gloss level obtained using reference cyan pigment dispersion (Dis-C44).

Table 3 summarizes the results of the evaluation of the yellow pigment dispersions, the magenta pigment dispersions, the cyan pigment dispersions, and the black pigment dispersions.

TABLE 3

Results of the Evaluation of Pigment Dispersions

| Compound no. | Yellow | | Magenta | | Cyan | | Black | |
|---|---|---|---|---|---|---|---|---|
| | Liquid dispersion | Gloss (gloss level) | Liquid dispersion | Gloss (gloss level) | Liquid dispersion | Gloss (gloss level) | Liquid dispersion | Gloss (gloss level) |
| (25) | Dis-Y 1 | A(70) | Dis-M 1 | A(75) | Dis-C 1 | A(59) | Dis-Bk 1 | A(103) |
| (26) | Dis-Y 2 | A(65) | Dis-M 2 | A(65) | Dis-C 2 | A(58) | Dis-Bk 2 | A(81) |
| (27) | Dis-Y 3 | A(68) | Dis-M 3 | A(70) | Dis-C 3 | A(60) | Dis-Bk 3 | A(105) |
| (28) | Dis-Y 4 | A(66) | Dis-M 4 | A(66) | Dis-C 4 | A(59) | Dis-Bk 4 | A(84) |
| (29) | Dis-Y 5 | A(66) | Dis-M 5 | A(71) | Dis-C 5 | A(58) | Dis-Bk 5 | A(92) |
| (30) | Dis-Y 6 | A(67) | Dis-M 6 | A(68) | Dis-C 6 | A(60) | Dis-Bk 6 | A(90) |
| (31) | Dis-Y 7 | A(70) | Dis-M 7 | A(69) | Dis-C 7 | A(61) | Dis-Bk 7 | A(101) |
| (32) | Dis-Y 8 | A(68) | Dis-M 8 | A(77) | Dis-C 8 | A(61) | Dis-Bk 8 | A(108) |
| (33) | Dis-Y 9 | A(70) | Dis-M 9 | A(76) | Dis-C 9 | A(63) | Dis-Bk 9 | A(109) |
| (34) | Dis-Y 10 | A(71) | Dis-M 10 | A(78) | Dis-C 10 | A(60) | Dis-Bk 10 | A(110) |
| (35) | Dis-Y 11 | A(70) | Dis-M 11 | A(73) | Dis-C 11 | A(59) | Dis-Bk 11 | A(112) |
| (36) | Dis-Y 12 | A(69) | Dis-M 12 | A(74) | Dis-C 12 | A(61) | Dis-Bk 12 | A(109) |
| (37) | Dis-Y 13 | A(66) | Dis-M 13 | A(72) | Dis-C 13 | A(59) | Dis-Bk 13 | A(96) |
| (38) | Dis-Y 14 | A(71) | Dis-M 14 | A(77) | Dis-C 14 | A(62) | Dis-Bk 14 | A(112) |
| (39) | Dis-Y 15 | A(71) | Dis-M 15 | A(78) | Dis-C 15 | A(60) | Dis-Bk 15 | A(110) |
| (40) | Dis-Y 16 | A(63) | Dis-M 16 | A(67) | Dis-C 16 | A(58) | Dis-Bk 16 | A(94) |
| (41) | Dis-Y 17 | A(67) | Dis-M 17 | A(70) | Dis-C 17 | A(62) | Dis-Bk 17 | A(98) |
| (42) | Dis-Y 18 | A(69) | Dis-M 18 | A(71) | Dis-C 18 | A(63) | Dis-Bk 18 | A(102) |
| (43) | Dis-Y 19 | A(72) | Dis-M 19 | A(79) | Dis-C 19 | A(60) | Dis-Bk 19 | A(95) |
| (44) | Dis-Y 20 | A(64) | Dis-M 20 | A(66) | Dis-C 20 | A(58) | Dis-Bk 20 | A(88) |
| (45) | Dis-Y 21 | A(69) | Dis-M 21 | A(74) | Dis-C 21 | A(58) | Dis-Bk 21 | A(102) |
| (46) | Dis-Y 22 | A(73) | Dis-M 22 | A(77) | Dis-C 22 | A(60) | Dis-Bk 22 | A(105) |
| (47) | Dis-Y 23 | A(70) | Dis-M 23 | A(74) | Dis-C 23 | A(59) | Dis-Bk 23 | A(101) |
| (48) | Dis-Y 24 | A(68) | Dis-M 24 | A(73) | Dis-C 24 | A(61) | Dis-Bk 24 | A(102) |
| (49) | Dis-Y 25 | A(69) | Dis-M 25 | A(75) | Dis-C 25 | A(58) | Dis-Bk 25 | A(98) |
| (50) | Dis-Y 26 | A(67) | Dis-M 26 | A(74) | Dis-C 26 | A(58) | Dis-Bk 26 | A(96) |
| (51) | Dis-Y 27 | A(70) | Dis-M 27 | A(73) | Dis-C 27 | A(62) | Dis-Bk 27 | A(101) |
| (52) | Dis-Y 28 | A(68) | Dis-M 28 | A(70) | Dis-C 28 | A(63) | Dis-Bk 28 | A(103) |
| (53) | Dis-Y 29 | A(72) | Dis-M 29 | A(78) | Dis-C 29 | A(63) | Dis-Bk 29 | A(109) |
| (54) | Dis-Y 30 | A(70) | Dis-M 30 | A(75) | Dis-C 30 | A(61) | Dis-Bk 30 | A(87) |
| (55) | Dis-Y 31 | A(69) | Dis-M 31 | A(73) | Dis-C 31 | A(60) | Dis-Bk 31 | A(86) |
| (56) | Dis-Y 32 | A(69) | Dis-M 32 | A(74) | Dis-C 32 | A(60) | Dis-Bk 32 | A(105) |
| (57) | Dis-Y 33 | A(70) | Dis-M 33 | A(67) | Dis-C 33 | A(58) | Dis-Bk 33 | A(85) |
| (58) | Dis-Y 34 | A(66) | Dis-M 34 | A(70) | Dis-C 34 | A(59) | Dis-Bk 34 | A(108) |
| (59) | Dis-Y 35 | A(68) | Dis-M 35 | A(65) | Dis-C 35 | A(58) | Dis-Bk 35 | A(90) |
| (60) | Dis-Y 36 | A(68) | Dis-M 36 | A(78) | Dis-C 36 | A(64) | Dis-Bk 36 | A(82) |
| (61) | Dis-Y 37 | A(68) | Dis-M 37 | A(72) | Dis-C 37 | A(60) | Dis-Bk 37 | A(97) |
| (62) | Dis-Y 38 | A(69) | Dis-M 38 | A(69) | Dis-C 38 | A(58) | Dis-Bk 38 | A(85) |
| (63) | Dis-Y 39 | A(71) | Dis-M 39 | A(77) | Dis-C 39 | A(62) | Dis-Bk 39 | A(105) |
| (64) | Dis-Y 40 | A(68) | Dis-M 40 | A(79) | Dis-C 40 | B(55) | Dis-Bk 40 | A(85) |
| (25) | Dis-Y 41 | A(70) | Dis-M 41 | A(57) | Dis-C 41 | B (78) | Dis-Bk 41 | B(69) |
| (25) | Dis-Y 42 | A(73) | Dis-M 42 | A(89) | Dis-C 42 | B (77) | Dis-Bk 42 | A(89) |
| (25) | Dis-Y 43 | A(68) | Dis-M 43 | A(69) | Dis-C 43 | A(59) | Dis-Bk 43 | A(82) |
| NA | Dis-Y 44 | (57) | Dis-M 44 | (47) | Dis-C 44 | (46) | Dis-Bk 44 | D(6) |
| NA | Dis-Y 45 | (60) | Dis-M 45 | (30) | Dis-C 45 | (63) | Dis-Bk 45 | C(42) |
| NA | Dis-Y 46 | (53) | Dis-M 46 | (56) | Dis-C 46 | (63) | Dis-Bk 46 | D(2) |
| NA | Dis-Y 47 | (55) | Dis-M 47 | (48) | Dis-C 47 | (44) | Dis-Bk 47 | D(5) |
| (65) | Dis-Y 48 | B(61) | Dis-M 48 | A(66) | Dis-C 48 | C(49) | Dis-Bk 48 | A(105) |
| Comparative compound 1 | | | | | | | | |
| Comparative compound 2 | Dis-Y 49 | B(60) | Dis-M 49 | B(62) | Dis-C 49 | B(55) | Dis-Bk 49 | B(77) |
| Comparative compound 3 | Dis-Y 50 | B(60) | Dis-M 50 | B(63) | Dis-C 50 | B(55) | Dis-Bk 50 | B(64) |
| Comparative compound 4 | Dis-Y 51 | C(59) | Dis-M 51 | C(56) | Dis-C 51 | D(47) | Dis-Bk 51 | D(6) |

Example 4-1

Yellow toners were produced using suspension polymerization as follows.

Example 1 of the Production of Yellow Toner

Preparation of an Aqueous Medium

In a four-neck flask equipped with T.K. HOMO MIXER high-speed mixer (PRIMIX Corporation) a mixture of 710 parts of ion-exchanged water and 450 parts of a 0.1 mol/L aqueous $Na_3PO_4$ solution was warmed to 60 degrees Celsius, with the rotation speed adjusted to 12000 rpm. Then 68 parts of a 1.0 mol/L aqueous $CaCl_2$ solution was slowly added, yielding an aqueous medium containing fine particles of $Ca_3(PO_4)_2$ as a dispersion stabilizer sparingly soluble in water.

Suspension Polymerization

- Yellow pigment dispersion (Dis-Y1), 132 parts
- Styrene monomer, 46 parts
- n-Butyl acrylate monomer, 34 parts
- A polar polymer (a saturated polyester polymer composed of terephthalic acid and propylene-oxide-modified bisphenol A; acid value, 15 mg KOH/g; peak molecular weight, 6000), 10 parts
- An ester wax (maximum endothermic peak in DSC=70 degrees Celsius, Mn=704), 25 parts
- An aluminum salicylate compound (Orient Chemical Industries; trade name, BONTRON E-108), 2 parts
- A divinylbenzene monomer, 0.1 parts A mixture of these materials uniformly dissolved and dispersed using T.K. HOMO MIXER high-speed mixer (PRIMIX Corporation) at an elevated temperature of 60 degrees Celsius and 5000 rpm.

After the addition of 10 parts of 2,2'-azobis(2,4-dimethylvaleronitrile) as a polymerization initiator, the dispersion was added to the aqueous medium and granulated for 15 minutes at a constant rotation speed of 12000 rpm. Polymerization was allowed to proceed for 5 hours at a liquid temperature of 60 degrees Celsius and then for 8 hours at an elevated liquid temperature of 80 degrees Celsius while the liquid was mixed using propeller mixing blades instead of the high-speed mixer. After the polymerization reaction was complete, the liquid was distilled at 80 degrees Celsius and reduced pressure to release any residual monomers and cooled to 30 degrees Celsius, yielding a liquid dispersion containing polymer fine particles.

<Washing and Dehydration>

In a wash container this liquid dispersion containing polymer fine particles was acidified with dilute hydrochloric acid while being stirred. Then at a pH of 1.5, the liquid dispersion was stirred for 2 hours. Phosphoric acid-calcium compounds including $Ca_3(PO_4)_2$ were dissolved, and the resulting solution was separated into solid and liquid phases through a filtration system. The collected polymer fine particles were put into water, the resulting liquid was stirred to form a liquid dispersion once again, and this liquid dispersion was separated into solid and liquid phases through a filtration system. This process of dispersing polymer fine particles in water and separating the resulting liquid dispersion into solid and liquid phases were repeated until the phosphoric acid-calcium compounds including $Ca_3(PO_4)_2$ were sufficiently removed. The polymer fine particles collected after the last round of solid-liquid separation were thoroughly dried using a desiccator, yielding toner particles.

Then 100 parts of the toner particles was dry-mixed with the following external additives for 5 minutes using a Henschel mixer (Nippon Coke & Engineering), yielding yellow toner (Tnr-Y1).

- A hydrophobic silica fine powder surface-treated with hexamethyldisilazane (number-average diameter of primary particles: 7 nm), 1.0 part
- A rutile titanium oxide fine powder (number-average diameter of primary particles: 45 nm), 0.15 parts
- A rutile titanium oxide fine powder (number-average diameter of primary particles: 200 nm), 0.5 parts Example 2 of the Production of Yellow Toner Yellow toners (Tnr-Y2) to (Tnr-Y40) according to certain embodiments of the invention were obtained through the same operations as in Example 1 of the production of yellow toner, except that yellow pigment dispersion (Dis-Y1) was changed to one of yellow pigment dispersions (Dis-Y2) to (Dis-Y40).

Example 3 of the Production of Yellow Toner

Yellow toners (Tnr-Y41) and (Tnr-Y42) were obtained through the same operations as in Example 1 of the production of yellow toner, except that yellow pigment dispersion (Dis-Y1) was changed to yellow pigment dispersion (Dis-Y41) or (Dis-Y42).

Comparative Example 4-1

Reference yellow toners to provide reference values for evaluation and comparative yellow toners were produced as follows.

Examples 1 of the Production of Reference Yellow Toner

Reference yellow toners (Tnr-Y43) to (Tnr-Y45) were obtained through the same operations as in Example 1 of the production of yellow toner, except that yellow pigment dispersion (Dis-Y1) was changed to one of yellow pigment dispersions (Dis-Y44) to (Dis-Y46).

Example 1 of the Production of Comparative Yellow Toner

Comparative yellow toners (Tnr-Y46) to (Tnr-Y49) were obtained through the same operations as in Example 1 of the production of yellow toner, except that yellow pigment dispersion (Dis-Y1) was changed to one of yellow pigment dispersions (Dis-Y48) to (Dis-Y51).

Example 4-2

Magenta toners were produced using suspension polymerization as follows.

Example 1 of the Production of Magenta Toner

Magenta toner (Tnr-M1) was obtained through the same operations as in Example 1 of the production of yellow toner, except that yellow pigment dispersion (Dis-Y1) was changed to magenta pigment dispersion (Dis-M1).

Example 2 of the Production of Magenta Toner

Magenta toners (Tnr-M2) to (Tnr-M40) according to certain embodiments of the invention were obtained through the same operations as in Example 1 of the production of magenta toner, except that magenta pigment dispersion (Dis-M1) was changed to one of magenta pigment dispersions (Dis-M2) to (Dis-M40).

Example 3 of the Production of Magenta Toner

Magenta toners (Tnr-M41) and (Tnr-M42) were obtained through the same operations as in Example 1 of the production of magenta toner, except that magenta pigment dispersion (Dis-M1) was changed to magenta pigment dispersion (Dis-M41) or (Dis-M42).

Comparative Example 4-2

Reference magenta toners to provide reference values for evaluation and comparative magenta toners were produced as follows.

Examples 1 of the Production of Reference Magenta Toner

Reference magenta toners (Tnr-M43) to (Tnr-M45) were obtained through the same operations as in Example 1 of the production of magenta toner, except that magenta pigment dispersion (Dis-M1) was changed to one of magenta pigment dispersions (Dis-M44) to (Dis-M46).

Example 1 of the Production of Comparative Magenta Toner

Comparative magenta toners (Tnr-M46) to (Tnr-M49) were obtained through the same operations as in Example 1 of the production of magenta toner, except that magenta pigment dispersion (Dis-M1) was changed to one of magenta pigment dispersions (Dis-M48) to (Dis-M51).

Example 4-3

Cyan toners were produced using suspension polymerization as follows.

Example 1 of the Production of Cyan Toner

Cyan toner (Tnr-C1) was obtained through the same operations as in Example 1 of the production of yellow toner, except that yellow pigment dispersion (Dis-Y1) was changed to cyan pigment dispersion (Dis-C1).

Example 2 of the Production of Cyan Toner

Cyan toners (Tnr-C2) to (Tnr-C40) according to certain embodiments of the invention were obtained through the same operations as in Example 1 of the production of cyan toner, except that cyan pigment dispersion (Dis-C1) was changed to one of cyan pigment dispersions (Dis-C2) to (Dis-C40).

Example 3 of the Production of Cyan Toner

Cyan toners (Tnr-C41) and (Tnr-C42) were obtained through the same operations as in Example 1 of the production of cyan toner, except that cyan pigment dispersion (Dis-C1) was changed to cyan pigment dispersion (Dis-C41) or (Dis-C42).

Comparative Example 4-3

Reference cyan toners to provide reference values for evaluation and comparative cyan toners were produced as follows.

Examples 1 of the Production of Reference Cyan Toner

Reference cyan toners (Tnr-C43) to (Tnr-C45) were obtained through the same operations as in Example 1 of the production of cyan toner, except that cyan pigment dispersion (Dis-C1) was changed to one of cyan pigment dispersions (Dis-C44) to (Dis-C46).

Example 1 of the Production of Comparative Cyan Toner

Comparative cyan toners (Tnr-C46) to (Tnr-C49) were obtained through the same operations as in Example 1 of the production of cyan toner, except that cyan pigment dispersion (Dis-C1) was changed to one of cyan pigment dispersions (Dis-C48) to (Dis-C51).

Example 4-4

Black toners were produced using suspension polymerization as follows.

Example 1 of the Production of Black Toner

Black toner (Tnr-Bk1) was obtained through the same operations as in Example 1 of the production of yellow toner, except that yellow pigment dispersion (Dis-Y1) was changed to black pigment dispersion (Dis-Bk1).

Example 2 of the Production of Black Toner

Black toners (Tnr-Bk2) to (Tnr-Bk40) according to certain embodiments of the invention were obtained through the same operations as in Example 1 of the production of black toner, except that black pigment dispersion (Dis-Bk1) was changed to one of black pigment dispersions (Dis-Bk2) to (Dis-Bk40).

Example 3 of the Production of Black Toner

Black toners (Tnr-Bk41) and (Tnr-Bk42) were obtained through the same operations as in Example 1 of the production of black toner, except that black pigment dispersion (Dis-Bk1) was changed to black pigment dispersion (Dis-Bk41) or (Dis-Bk42).

Comparative Example 4-4

Reference black toners to provide reference values for evaluation and comparative black toners were produced as follows.

Examples 1 of the Production of Reference Black Toner

Reference black toners (Tnr-Bk43) to (Tnr-Bk45) were obtained through the same operations as in Example 1 of the production of black toner, except that black pigment dispersion (Dis-Bk1) was changed to one of black pigment dispersions (Dis-Bk44) to (Dis-Bk46).

Example 1 of the Production of Comparative Black Toner

Comparative black toners (Tnr-Bk46) to (Tnr-Bk49) were obtained through the same operations as in Example 1 of the production of black toner, except that black pigment dispersion (Dis-Bk1) was changed to one of black pigment dispersions (Dis-Bk48) to (Dis-Bk51).

Example 5-1

Yellow toners were produced using suspension granulation as follows.

Example 4 of the Production of Yellow Toner

Preparation of Yellow Pigment Dispersion

Ethyl acetate, 180 parts

C.I. Pigment Yellow 155, 12 parts

Azo-skeleton-bearing compound (25), 1.2 parts

Glass beads (1-mm diameter), 130 parts

A mixture of these materials was dispersed using an attritor (Nippon Coke & Engineering) for 3 hours and then filtered through a mesh screen, yielding yellow pigment dispersion.

Mixing

The obtained yellow pigment dispersion, 96.0 parts

A polar polymer (a saturated polyester polymer obtained through the condensation of propylene-oxide-modified bisphenol A and phthalic acid; Tg=75.9 degrees Celsius; Mw=11000; Mn=4200; acid value, 11), 85.0 parts A hydrocarbon wax (Fischer-Tropsch wax: maximum endothermic peak in DSC=80 degrees Celsius, Mw=750), 9.0 parts An aluminum salicylate compound (Orient Chemical Industries; trade name, BONTRON E-108), 2.0 parts Ethyl acetate (solvent), 10.0 parts These materials were dispersed using a ball mill for 24 hours, yielding 200 parts of a toner material mixture.

Dispersion and Suspension

Calcium carbonate (coated with an acrylic-acid-based copolymer), 20.0 parts

Carboxymethylcellulose (CELLOGEN BS-H, DKS Co. Ltd.), 0.5 parts

Ion-exchanged water, 99.5 parts

These materials were dispersed using a ball mill for 24 hours so that carboxymethylcellulose should be dissolved, yielding an aqueous medium.

After 1200 parts of this aqueous medium was transferred to T.K. HOMO MIXER high-speed mixer (PRIMIX Corporation), 1000 parts of the toner material mixture was added while the aqueous medium was stirred with rotating impellers at a circumferential speed of 20 m/sec, and then this mixture was stirred for 1 minute at a constant temperature of 25 degrees Celsius, yielding a suspension.

Solvent Removal

Then while 2200 parts of this suspension was stirred with FULLZONE impeller (Kobelco Eco-Solutions) at a circumferential speed of 45 m/min, solvent removal was initiated through forced aspiration of the gas phase present above the surface of the suspension using a blower at a constant suspension temperature of 40 degrees Celsius. Fifteen minutes after the start of solvent removal, 75 parts of diluted (1%) aqueous ammonia as an ionic substance was added. One hour after the start of solvent removal, 25 parts of the same aqueous ammonia was added. Two hours after the start of solvent removal, 25 parts of the same aqueous ammonia was added. Three hours after the start of solvent removal 25 parts of the same aqueous ammonia was added, making the total amount of added aqueous ammonia 150 parts. The mixture was then maintained at a constant temperature of 40 degrees Celsius until 17 hours after the start of solvent removal, yielding a toner dispersion with suspended particles free of the solvent (ethyl acetate).

<Washing and Dehydration>

Eighty parts of 10 mol/L hydrochloric acid was added to 300 parts of the toner dispersion obtained through solvent removal, the resulting mixture was neutralized with a 0.1 mol/L aqueous sodium hydroxide solution, and the neutralized mixture was repeatedly washed four times with ion-exchanged water using suction filtration, yielding a toner cake. This toner cake was dried using a vacuum desiccator, and the dry residue was screened through a 45-micrometer mesh screen, yielding toner particles. Then the same operations as in Example 1 of the production of yellow toner were performed to obtain yellow toner (Tnr-Y50) according to an embodiment of the invention.

Example 5 of the Production of Yellow Toner

Yellow toners (Tnr-Y51) to (Tnr-Y89) according to certain embodiments of the invention were obtained through the same operations as in Example 4 of the production of yellow toner, except that azo-skeleton-bearing compound (25) was changed to one of compounds (26) to (64).

Example 6 of the Production of Yellow Toner

Yellow toners (Tnr-Y90) and (Tnr-Y91) according to certain embodiments of the invention were obtained through the same operations as in Example 4 of the production of yellow toner, except that C.I. Pigment Yellow 155, formula (Pig-A), was changed to C.I. Pigment Yellow 180, formula (Pig-B), or C.I. Pigment Yellow 185, formula (Pig-C).

Comparative Example 5-1

Reference yellow toners to provide reference values for evaluation and comparative yellow toners were produced as follows.

Example 2 of the Production of Reference Yellow Toner

Reference yellow toner (Tnr-Y92) was obtained through the same operations as in Example 4 of the production of yellow toner, except that azo-skeleton-bearing compound (25) was not added.

Example 3 of the Production of Reference Yellow Toner

Reference yellow toners (Tnr-Y93) and (Tnr-Y94) were obtained through the same operations as in Example 6 of the production of yellow toner, except that azo-skeleton-bearing compound (25) was not added.

Example 2 of the Production of Comparative Yellow Toner

Comparative yellow toners (Tnr-Y95) to (Tnr-Y98) were obtained through the same operations as in Example 4 of the production of yellow toner, except that azo-skeleton-bearing compound (25) was changed as follows.

Comparative Yellow Toner (Tnr-Y95):

Comparative azo compound (65) (comparative compound 1)

Comparative Yellow Toner (Tnr-Y96):

DISPARLON DA-703-50 (Kusumoto Chemicals, acid value=15 mg KOH/g, amine value=40 mg KOH/g), described in PTL 2 (comparative compound 2)

Comparative Yellow Toner (Tnr-Y97):

The methyl methacrylate-sodium styrene sulfonate copolymer described in PTL 3 (comparative compound 3)

Comparative Yellow Toner (Tnr-Y98):

The styrene-butyl acrylate block copolymer described in PTL 4 (the proportions of the monomer units on a mass basis=95/5) (Mw=9,718) (comparative compound 4)

Example 5-2

Magenta toners were produced using suspension granulation as follows.

Example 4 of the Production of Magenta Toner

Magenta toner (Tnr-M50) according to an embodiment of the invention was obtained through the same operations as in Example 4 of the production of yellow toner, except that C.I. Pigment Yellow 155, formula (Pig-A), was changed to C.I. Pigment Red 122, formula (Pig-D).

Example 5 of the Production of Magenta Toner

Magenta toners (Tnr-M51) to (Tnr-M89) according to certain embodiments of the invention were obtained through the same operations as in Example 4 of the production of magenta toner, except that azo-skeleton-bearing compound (25) was changed to one of compounds (26) to (64).

Example 6 of the Production of Magenta Toner

Magenta toners (Tnr-M90) and (Tnr-M91) according to certain embodiments of the invention were obtained through the same operations as in Example 4 of the production of magenta toner, except that C.I. Pigment Red 122, formula (Pig-D), was changed to C.I. Pigment Red 255, formula (Pig-E), or C.I. Pigment Red 150, formula (Pig-F).

Comparative Example 5-2

Reference magenta toners to provide reference values for evaluation and comparative magenta toners were produced as follows.

Example 2 of the Production of Reference Magenta Toner

Reference magenta toner (Tnr-M92) was obtained through the same operations as in Example 4 of the production of magenta toner, except that azo-skeleton-bearing compound (25) was not added.

Example 3 of the Production of Reference Magenta Toner

Reference magenta toners (Tnr-M93) and (Tnr-M94) were obtained through the same operations as in Example 6 of the production of magenta toner, except that azo-skeleton-bearing compound (25) was not added.

Example 2 of the Production of Comparative Magenta Toner

Comparative magenta toners (Tnr-M95) to (Tnr-M98) were obtained through the same operations as in Example 4 of the production of magenta toner, except that azo-skeleton-bearing compound (25) was changed as follows.

Comparative Magenta Toner (Tnr-M95):

Comparative azo compound (65) (comparative compound 1)

Comparative Magenta Toner (Tnr-M96):

DISPARLON DA-703-50 (Kusumoto Chemicals, acid value=15 mg KOH/g, amine value=40 mg KOH/g), described in PTL 2 (comparative compound 2)

Comparative Magenta Toner (Tnr-M97):

The methyl methacrylate-sodium styrene sulfonate copolymer described in PTL 3 (comparative compound 3)

Comparative Magenta Toner (Tnr-M98):

The styrene-butyl acrylate block copolymer described in PTL 4 (the proportions of the monomer units on a mass basis=95/5) (Mw=9,718) (comparative compound 4)

Example 5-3

Cyan toners were produced using suspension granulation as follows.

Example 4 of the Production of Cyan Toner

Cyan toner (Tnr-C50) according to an embodiment of the invention was obtained through the same operations as in Example 4 of the production of yellow toner, except that C.I. Pigment Yellow 155, formula (Pig-A), was changed to C.I. Pigment Blue 15:3, formula (Pig-G).

Example 5 of the Production of Cyan Toner

Cyan toners (Tnr-C51) to (Tnr-C89) according to certain embodiments of the invention were obtained through the same operations as in Example 4 of the production of cyan toner, except that azo-skeleton-bearing compound (25) was changed to one of compounds (26) to (64).

Example 6 of the Production of Cyan Toner

Cyan toners (Tnr-C90) and (Tnr-C91) according to certain embodiments of the invention were obtained through the same operations as in Example 4 of the production of cyan toner, except that C.I. Pigment Blue 15:3, formula (Pig-G), was changed to C.I. Pigment Blue 16, formula (Pig-H), or C.I. Pigment Blue 17:1 (cyan pigment c), formula (Pig-I).

Comparative Example 5-3

Reference cyan toners to provide reference values for evaluation and comparative cyan toners were produced as follows.

Example 2 of the Production of Reference Cyan Toner

Reference cyan toner (Tnr-C92) was obtained through the same operations as in Example 4 of the production of cyan toner, except that azo-skeleton-bearing compound (25) was not added.

Example 3 of the Production of Reference Cyan Toner

Reference cyan toners (Tnr-C93) and (Tnr-C94) were obtained through the same operations as in Example 6 of the production of cyan toner, except that azo-skeleton-bearing compound (25) was not added.

Example 2 of the Production of Comparative Cyan Toner

Comparative cyan toners (Tnr-C95) to (Tnr-C98) were obtained through the same operations as in Example 4 of the production of cyan toner, except that azo-skeleton-bearing compound (25) was changed as follows.

Comparative Cyan Toner (Tnr-C95):

Comparative azo compound (65) (comparative compound 1)

Comparative Cyan Toner (Tnr-C96):

DISPARLON DA-703-50 (Kusumoto Chemicals, acid value=15 mg KOH/g, amine value=40 mg KOH/g), described in PTL 2 (comparative compound 2)

Comparative Cyan Toner (Tnr-C97):

The methyl methacrylate-sodium styrene sulfonate copolymer described in PTL 3 (comparative compound 3)

Comparative Cyan Toner (Tnr-C98):

The styrene-butyl acrylate block copolymer described in PTL 4 (the proportions of the monomer units on a mass basis=95/5) (Mw=9,718) (comparative compound 4)

Example 5-4

Black toners were produced using suspension granulation as follows.

Example 4 of the Production of Black Toner

Black toner (Tnr-Bk50) according to an embodiment of the invention was obtained through the same operations as in Example 4 of the production of yellow toner, except that C.I. Pigment Yellow 155, formula (Pig-A), and 1.2 parts of azo-skeleton-bearing compound (25) were changed to 30 parts of carbon black (specific surface area=65 $m^2$/g, average particle diameter=30 nm, pH=9.0) and 3.0 parts of azo-skeleton-bearing compound (25).

Example 5 of the Production of Black Toner

Black toners (Tnr-Bk51) to (Tnr-Bk89) according to certain embodiments of the invention were obtained through the same operations as in Example 4 of the production of black toner, except that azo-skeleton-bearing compound (25) was changed to one of compounds (26) to (64).

Example 6 of the Production of Black Toner

Black toners (Tnr-Bk90) and (Tnr-Bk91) according to certain embodiments of the invention were obtained through the same operations as in Example 4 of the production of black toner, except that the carbon black (specific surface area=65 $m^2$/g, average particle diameter=30 nm, pH=9.0) was changed to another kind of carbon black (specific surface area=77 $m^2$/g, average particle diameter=28 nm, pH=7.5 or specific surface area=370 $m^2$/g, average particle diameter=13 nm, pH=3.0).

Comparative Example 5-4

Reference black toners to provide reference values for evaluation and comparative black toners were produced as follows.

Example 2 of the Production of Reference Black Toner

Reference black toner (Tnr-Bk92) was obtained through the same operations as in Example 4 of the production of black toner, except that azo-skeleton-bearing compound (25) was not added.

Example 3 of the Production of Reference Black Toner

Reference black toners (Tnr-Bk93) and (Tnr-Bk94) were obtained through the same operations as in Example 6 of the production of black toner, except that azo-skeleton-bearing compound (25) was not added.

Example 2 of the Production of Comparative Black Toner

Comparative black toners (Tnr-Bk95) to (Tnr-Bk98) were obtained through the same operations as in Example 4 of the production of black toner, except that azo-skeleton-bearing compound (25) was changed as follows.

Comparative Black Toner (Tnr-Bk95):

Comparative azo compound (65) (comparative compound 1)

Comparative Black Toner (Tnr-Bk96):

DISPARLON DA-703-50 (Kusumoto Chemicals, acid value=15 mg KOH/g, amine value=40 mg KOH/g), described in PTL 2 (comparative compound 2)

Comparative Black Toner (Tnr-Bk97):

The methyl methacrylate-sodium styrene sulfonate copolymer described in PTL 3 (comparative compound 3)

Comparative Black Toner (Tnr-Bk98):

The styrene-butyl acrylate block copolymer described in PTL 4 (the proportions of the monomer units on a mass basis=95/5) (Mw=9,718) (comparative compound 4)

Example 6

The yellow toners, magenta toners, cyan toners, and black toners obtained in Examples 4-1 to 4-4 and 5-1 to 5-4 were evaluated as follows.

Evaluation of the Tint Strength of the Toners

Sample images were printed using the following toners, and the image characteristics described below were evaluated through comparison between the toners.

Yellow toners (Tnr-Y1) to (Tnr-Y45) and (Tnr-Y50) to (Tnr-Y94)

Magenta toners (Tnr-M1) to (Tnr-M45) and (Tnr-M50) to (Tnr-M94)

Cyan toners (Tnr-C1) to (Tnr-C45) and (Tnr-C50) to (Tnr-C94)

Black toners (Tnr-Bk1) to (Tnr-Bk45) and (Tnr-Bk50) to (Tnr-Bk94)

For the comparison of image characteristics, a modified LBP-5300 (CANON KABUSHIKI KAISHA) was used as an image-forming apparatus (hereinafter also referred to as LBP). The following modifications were made: the development blade in the process cartridge (hereinafter referred to as CRG) was changed to an SUS blade having a thickness of 8 micrometers; it was allowed to apply a bias of −200 V, with respect to the developing bias (the bias voltage applied to the developing roller as a toner-bearing member), to the SUS blade.

A solid image was formed on transfer paper (75 g/m$^2$ paper) using each toner under normal temperature and normal humidity conditions (23.5 degrees Celsius and 60% RH), with the amount of adhering toner set at 0.5 mg/cm$^2$. The density of the formed solid image was measured using Spectrolino reflection densitometer (GretagMacbeth). The tint strength of each toner was evaluated on the basis of the percentage improvement of image density (the density of the solid image) achieved with the toner.

The percentage improvements of image density achieved with yellow toners (Tnr-Y1) to (Tnr-Y40) were based on the image density obtained using reference yellow toner (Tnr-Y43). The percentage improvement of image density achieved with yellow toner (Tnr-Y41) was based on the image density obtained using reference yellow toner (Tnr-Y44). The percentage improvement of image density achieved with yellow toner (Tnr-Y42) was based on the image density obtained using reference yellow toner (Tnr-Y45).

The percentage improvements of image density achieved with yellow toners (Tnr-Y50) to (Tnr-Y89) were based on the image density obtained using reference yellow toner (Tnr-Y92). The percentage improvement of image density achieved with yellow toner (Tnr-Y90) was based on the image density obtained using reference yellow toner (Tnr-Y93). The percentage improvement of image density achieved with yellow toner (Tnr-Y91) was based on the image density obtained using reference yellow toner (Tnr-Y94).

The percentage improvements of image density achieved with magenta toners (Tnr-M1) to (Tnr-M40) were based on the image density obtained using reference magenta toner (Tnr-M43). The percentage improvement of image density achieved with magenta toner (Tnr-M41) was based on the image density obtained using reference magenta toner (Tnr-M44). The percentage improvement of image density achieved with magenta toner (Tnr-M42) was based on the image density obtained using reference magenta toner (Tnr-M45).

The percentage improvements of image density achieved with magenta toners (Tnr-M50) to (Tnr-M89) were based on the image density obtained using reference magenta toner (Tnr-M92). The percentage improvement of image density achieved with magenta toner (Tnr-M90) was based on the image density obtained using reference magenta toner (Tnr-M93). The percentage improvement of image density achieved with magenta toner (Tnr-M91) was based on the image density obtained using reference magenta toner (Tnr-M94).

The percentage improvements of image density achieved with cyan toners (Tnr-C1) to (Tnr-C40) were based on the image density obtained using reference cyan toner (Tnr-C43). The percentage improvement of image density achieved with cyan toner (Tnr-C41) was based on the image density obtained using reference cyan toner (Tnr-C44). The percentage improvement of image density achieved with cyan toner (Tnr-C42) was based on the image density obtained using reference cyan toner (Tnr-C45).

The percentage improvements of image density achieved with cyan toners (Tnr-C50) to (Tnr-C89) were based on the image density obtained using reference cyan toner (Tnr-C92). The percentage improvement of image density achieved with cyan toner (Tnr-C90) was based on the image density obtained using reference cyan toner (Tnr-C93). The percentage improvement of image density achieved with cyan toner (Tnr-C91) was based on the image density obtained using reference cyan toner (Tnr-C94).

The percentage improvements of image density achieved with black toners (Tnr-Bk1) to (Tnr-Bk40) were based on the image density obtained using reference black toner (Tnr-Bk43). The percentage improvement of image density achieved with black toner (Tnr-Bk41) was based on the image density obtained using reference black toner (Tnr-Bk44). The percentage improvement of image density achieved with black toner (Tnr-Bk42) was based on the image density obtained using reference black toner (Tnr-Bk45).

The percentage improvements of image density achieved with black toners (Tnr-Bk50) to (Tnr-Bk89) were based on the image density obtained using reference black toner (Tnr-Bk92). The percentage improvement of image density achieved with black toner (Tnr-Bk90) was based on the image density obtained using reference black toner (Tnr-Bk93). The percentage improvement of image density achieved with black toner (Tnr-Bk91) was based on the image density obtained using reference black toner (Tnr-Bk94).

The following is the criteria used to evaluate the percentage improvement of image density for each color.

Criteria Used to Evaluate the Percentage Improvements of Image Density Achieved with Yellow Toners A: The percentage improvement of image density was 5% or more.

B: The percentage improvement of image density was 1% or more and less than 5%.

C: The percentage improvement of image density was 0% or more and less than 1%.

D: The image density decreased.

Yellow toners were judged to have good tint strength if the percentage improvement of image density was 1% or more.

Criteria Used to Evaluate the Percentage Improvements of Image Density Achieved with Magenta Toners A: The percentage improvement of image density was 20% or more.

B: The percentage improvement of image density was 10% or more and less than 20%.

C: The percentage improvement of image density was 5% or more and less than 10%.

D: The percentage improvement of image density was less than 5%.

Magenta toners were judged to have good tint strength if the percentage improvement of image density was 10% or more.

Criteria Used to Evaluate the Percentage Improvements of Image Density Achieved with Cyan Toners A: The percentage improvement of image density was 30% or more.

B: The percentage improvement of image density was 20% or more and less than 30%.

C: The percentage improvement of image density was 10% or more and less than 20%.

D: The percentage improvement of image density was less than 10% more and less than 20%.

Cyan toners were judged to have good tint strength if the percentage improvement of image density was 20% or more.

Criteria Used to Evaluate the Percentage Improvements of Image Density Achieved with Black Toners A: The percentage improvement of image density was 60% or more.

B: The percentage improvement of image density was 40% or more and less than 60%.

C: The percentage improvement of image density was 20% or more and less than 40%.

D: The percentage improvement of image density was less than 20%.

Black toners were judged to have good tint strength if the percentage improvement of image density was 40% or more.

Comparative Example 6

The tint strength of the following toners was evaluated as in Example 6.

Comparative yellow toners (Tnr-Y46) to (Tnr-Y49) and (Tnr-Y95) to (Tnr-Y98)

Comparative magenta toners (Tnr-M46) to (Tnr-M49) and (Tnr-M95) to (Tnr-M98)

Comparative cyan toners (Tnr-C46) to (Tnr-C49) and (Tnr-C95) to (Tnr-C98)

Comparative black toners (Tnr-Bk46) to (Tnr-Bk49) and (Tnr-Bk95) to (Tnr-Bk98)

The percentage improvements of image density achieved with comparative yellow toners (Tnr-Y46) to (Tnr-Y49) were based on the image density obtained using reference yellow toner (Tnr-Y43).

The percentage improvements of image density achieved with comparative yellow toners (Tnr-Y95) to (Tnr-Y98) were based on the image density obtained using reference yellow toner (Tnr-Y92).

The percentage improvements of image density achieved with comparative magenta toners (Tnr-M46) to (Tnr-M49) were based on the image density obtained using reference magenta toner (Tnr-M43).

The percentage improvements of image density achieved with comparative magenta toners (Tnr-M95) to (Tnr-M98) were based on the image density obtained using reference magenta toner (Tnr-M92).

The percentage improvements of image density achieved with comparative cyan toners (Tnr-C46) to (Tnr-C49) were based on the image density obtained using reference cyan toner (Tnr-C43).

The percentage improvements of image density achieved with comparative cyan toners (Tnr-C95) to (Tnr-C98) were based on the image density obtained using reference cyan toner (Tnr-C92).

The percentage improvements of image density achieved with comparative black toners (Tnr-Bk46) to (Tnr-Bk49) were based on the image density obtained using reference black toner (Tnr-Bk43).

The percentage improvements of image density achieved with comparative black toners (Tnr-Bk95) to (Tnr-Bk98) were based on the image density obtained using reference black toner (Tnr-Bk92).

Table 4 summarizes the results of the evaluation of the tint strength of the toners of each color obtained using suspension polymerization, and Table 5 summarizes the results of the evaluation of the tint strength of the toners of each color obtained using suspension granulation.

TABLE 4

Results of the Evaluation of Toners Produced by Suspension-Polymerization Method

| Com- | Yellow | | Magenta | | Cyan | | Black | |
|---|---|---|---|---|---|---|---|---|
| pound no. | Toner | Tint strength | Toner | Tint strength | Toner | Tint strength | Toner | Tint strength |
| (25) | Tnr-Y 1 | A | Tnr-M 1 | A | Tnr-C 1 | A | Tnr-Bk 1 | A |
| (26) | Tnr-Y 2 | A | Tnr-M 2 | A | Tnr-C 2 | A | Tnr-Bk 2 | A |
| (27) | Tnr-Y 3 | A | Tnr-M 3 | A | Tnr-C 3 | A | Tnr-Bk 3 | A |
| (28) | Tnr-Y 4 | A | Tnr-M 4 | A | Tnr-C 4 | A | Tnr-Bk 4 | A |
| (29) | Tnr-Y 5 | A | Tnr-M 5 | A | Tnr-C 5 | A | Tnr-Bk 5 | A |
| (30) | Tnr-Y 6 | A | Tnr-M 6 | A | Tnr-C 6 | A | Tnr-Bk 6 | A |
| (31) | Tnr-Y 7 | A | Tnr-M 7 | A | Tnr-C 7 | A | Tnr-Bk 7 | A |
| (32) | Tnr-Y 8 | A | Tnr-M 8 | A | Tnr-C 8 | A | Tnr-Bk 8 | A |
| (33) | Tnr-Y 9 | A | Tnr-M 9 | A | Tnr-C 9 | A | Tnr-Bk 9 | A |
| (34) | Tnr-Y 10 | A | Tnr-M 10 | A | Tnr-C 10 | A | Tnr-Bk 10 | A |
| (35) | Tnr-Y 11 | A | Tnr-M 11 | A | Tnr-C 11 | A | Tnr-Bk 11 | A |
| (36) | Tnr-Y 12 | A | Tnr-M 12 | A | Tnr-C 12 | A | Tnr-Bk 12 | A |
| (37) | Tnr-Y 13 | A | Tnr-M 13 | A | Tnr-C 13 | A | Tnr-Bk 13 | A |
| (38) | Tnr-Y 14 | A | Tnr-M 14 | A | Tnr-C 14 | A | Tnr-Bk 14 | A |
| (39) | Tnr-Y 15 | A | Tnr-M 15 | A | Tnr-C 15 | A | Tnr-Bk 15 | A |
| (40) | Tnr-Y 16 | A | Tnr-M 16 | A | Tnr-C 16 | A | Tnr-Bk 16 | A |
| (41) | Tnr-Y 17 | A | Tnr-M 17 | A | Tnr-C 17 | A | Tnr-Bk 17 | A |
| (42) | Tnr-Y 18 | A | Tnr-M 18 | A | Tnr-C 18 | A | Tnr-Bk 18 | A |
| (43) | Tnr-Y 19 | A | Tnr-M 19 | A | Tnr-C 19 | A | Tnr-Bk 19 | A |
| (44) | Tnr-Y 20 | A | Tnr-M 20 | A | Tnr-C 20 | A | Tnr-Bk 20 | A |
| (45) | Tnr-Y 21 | A | Tnr-M 21 | A | Tnr-C 21 | A | Tnr-Bk 21 | A |
| (46) | Tnr-Y 22 | A | Tnr-M 22 | A | Tnr-C 22 | A | Tnr-Bk 22 | A |
| (47) | Tnr-Y 23 | A | Tnr-M 23 | A | Tnr-C 23 | A | Tnr-Bk 23 | A |
| (48) | Tnr-Y 24 | A | Tnr-M 24 | A | Tnr-C 24 | A | Tnr-Bk 24 | A |
| (49) | Tnr-Y 25 | A | Tnr-M 25 | A | Tnr-C 25 | A | Tnr-Bk 25 | A |
| (50) | Tnr-Y 26 | A | Tnr-M 26 | A | Tnr-C 26 | A | Tnr-Bk 26 | A |
| (51) | Tnr-Y 27 | A | Tnr-M 27 | A | Tnr-C 27 | A | Tnr-Bk 27 | A |
| (52) | Tnr-Y 28 | A | Tnr-M 28 | A | Tnr-C 28 | A | Tnr-Bk 28 | A |
| (53) | Tnr-Y 29 | A | Tnr-M 29 | A | Tnr-C 29 | A | Tnr-Bk 29 | A |
| (54) | Tnr-Y 30 | A | Tnr-M 30 | A | Tnr-C 30 | A | Tnr-Bk 30 | A |
| (55) | Tnr-Y 31 | A | Tnr-M 31 | A | Tnr-C 31 | A | Tnr-Bk 31 | A |

TABLE 4-continued

| Results of the Evaluation of Toners Produced by Suspension-Polymerization Method | | | | | | | | |
|---|---|---|---|---|---|---|---|---|
| Com- | Yellow | | Magenta | | Cyan | | Black | |
| pound no. | Toner | Tint strength | Toner | Tint strength | Toner | Tint strength | Toner | Tint strength |
| (56) | Tnr-Y 32 | A | Tnr-M 32 | A | Tnr-C 32 | A | Tnr-Bk 32 | A |
| (57) | Tnr-Y 33 | A | Tnr-M 33 | A | Tnr-C 33 | A | Tnr-Bk 33 | A |
| (58) | Tnr-Y 34 | A | Tnr-M 34 | A | Tnr-C 34 | A | Tnr-Bk 34 | A |
| (59) | Tnr-Y 35 | A | Tnr-M 35 | A | Tnr-C 35 | A | Tnr-Bk 35 | A |
| (60) | Tnr-Y 36 | A | Tnr-M 36 | A | Tnr-C 36 | A | Tnr-Bk 36 | A |
| (61) | Tnr-Y 37 | A | Tnr-M 37 | A | Tnr-C 37 | A | Tnr-Bk 37 | A |
| (62) | Tnr-Y 38 | A | Tnr-M 38 | A | Tnr-C 38 | A | Tnr-Bk 38 | A |
| (63) | Tnr-Y 39 | A | Tnr-M 39 | A | Tnr-C 39 | A | Tnr-Bk 39 | A |
| (64) | Tnr-Y 40 | A | Tnr-M 40 | A | Tnr-C 40 | B | Tnr-Bk 40 | A |
| (25) | Tnr-Y 41 | A | Tnr-M 41 | A | Tnr-C 41 | A | Tnr-Bk 41 | B |
| (25) | Tnr-Y 42 | A | Tnr-M 42 | A | Tnr-C 42 | B | Tnr-Bk 42 | A |
| NA | Tnr-Y 43 | — | Tnr-M 43 | — | Tnr-C 43 | — | Tnr-Bk 43 | — |
| NA | Tnr-Y 44 | — | Tnr-M 44 | — | Tnr-C 44 | — | Tnr-Bk 44 | — |
| NA | Tnr-Y 45 | — | Tnr-M 45 | — | Tnr-C 45 | — | Tnr-Bk 45 | — |
| (65) | Tnr-Y 46 | B | Tnr-M 46 | A | Tnr-C 46 | B | Tnr-Bk 46 | A |
| Comparative compound 1 | | | | | | | | |
| Comparative compound 2 | Tnr-Y 47 | D | Tnr-M 47 | B | Tnr-C 47 | D | Tnr-Bk 47 | D |
| Comparative compound 3 | Tnr-Y 48 | D | Tnr-M 48 | D | Tnr-C 48 | C | Tnr-Bk 48 | D |
| Comparative compound 4 | Tnr-Y 49 | D | Tnr-M 49 | D | Tnr-C 49 | D | Tnr-Bk 49 | D |

TABLE 5

| Results of the Evaluation of Toners Produced by Suspension-Granulation Method | | | | | | | | |
|---|---|---|---|---|---|---|---|---|
| Com- | Yellow | | Magenta | | Cyan | | Black | |
| pound no. | Toner | Tint strength | Toner | Tint strength | Toner | Tint strength | Toner | Tint strength |
| (25) | Tnr-Y 50 | A | Tnr-M 50 | A | Tnr-C 50 | A | Tnr-Bk 50 | A |
| (26) | Tnr-Y 51 | A | Tnr-M 51 | A | Tnr-C 51 | A | Tnr-Bk 51 | A |
| (27) | Tnr-Y 52 | A | Tnr-M 52 | A | Tnr-C 52 | A | Tnr-Bk 52 | A |
| (28) | Tnr-Y 53 | A | Tnr-M 53 | A | Tnr-C 53 | A | Tnr-Bk 53 | A |
| (29) | Tnr-Y 54 | A | Tnr-M 54 | A | Tnr-C 54 | A | Tnr-Bk 54 | A |
| (30) | Tnr-Y 55 | A | Tnr-M 55 | A | Tnr-C 55 | A | Tnr-Bk 55 | A |
| (31) | Tnr-Y 56 | A | Tnr-M 56 | A | Tnr-C 56 | A | Tnr-Bk 56 | A |
| (32) | Tnr-Y 57 | A | Tnr-M 57 | A | Tnr-C 57 | A | Tnr-Bk 57 | A |
| (33) | Tnr-Y 58 | A | Tnr-M 58 | A | Tnr-C 58 | A | Tnr-Bk 58 | A |
| (34) | Tnr-Y 59 | A | Tnr-M 59 | A | Tnr-C 59 | A | Tnr-Bk 59 | A |
| (35) | Tnr-Y 60 | A | Tnr-M 60 | A | Tnr-C 60 | A | Tnr-Bk 60 | A |
| (36) | Tnr-Y 61 | A | Tnr-M 61 | A | Tnr-C 61 | A | Tnr-Bk 61 | A |
| (37) | Tnr-Y 62 | A | Tnr-M 62 | A | Tnr-C 62 | A | Tnr-Bk 62 | A |
| (38) | Tnr-Y 63 | A | Tnr-M 63 | A | Tnr-C 63 | A | Tnr-Bk 63 | A |
| (39) | Tnr-Y 64 | A | Tnr-M 64 | A | Tnr-C 64 | A | Tnr-Bk 64 | A |
| (40) | Tnr-Y 65 | A | Tnr-M 65 | A | Tnr-C 65 | A | Tnr-Bk 65 | A |
| (41) | Tnr-Y 66 | A | Tnr-M 66 | A | Tnr-C 66 | A | Tnr-Bk 66 | A |
| (42) | Tnr-Y 67 | A | Tnr-M 67 | A | Tnr-C 67 | A | Tnr-Bk 67 | A |
| (43) | Tnr-Y 68 | A | Tnr-M 68 | A | Tnr-C 68 | A | Tnr-Bk 68 | A |
| (44) | Tnr-Y 69 | A | Tnr-M 69 | A | Tnr-C 69 | A | Tnr-Bk 69 | A |
| (45) | Tnr-Y 70 | A | Tnr-M 70 | A | Tnr-C 70 | A | Tnr-Bk 70 | A |
| (46) | Tnr-Y 71 | A | Tnr-M 71 | A | Tnr-C 71 | A | Tnr-Bk 71 | A |
| (47) | Tnr-Y 72 | A | Tnr-M 72 | A | Tnr-C 72 | A | Tnr-Bk 72 | A |
| (48) | Tnr-Y 73 | A | Tnr-M 73 | A | Tnr-C 73 | A | Tnr-Bk 73 | A |
| (49) | Tnr-Y 74 | A | Tnr-M 74 | A | Tnr-C 74 | A | Tnr-Bk 74 | A |
| (50) | Tnr-Y 75 | A | Tnr-M 75 | A | Tnr-C 75 | A | Tnr-Bk 75 | A |
| (51) | Tnr-Y 76 | A | Tnr-M 76 | A | Tnr-C 76 | A | Tnr-Bk 76 | A |
| (52) | Tnr-Y 77 | A | Tnr-M 77 | A | Tnr-C 77 | A | Tnr-Bk 77 | A |
| (53) | Tnr-Y 78 | A | Tnr-M 78 | A | Tnr-C 78 | A | Tnr-Bk 78 | A |
| (54) | Tnr-Y 79 | A | Tnr-M 79 | A | Tnr-C 79 | A | Tnr-Bk 79 | A |
| (55) | Tnr-Y 80 | A | Tnr-M 80 | A | Tnr-C 80 | A | Tnr-Bk 80 | A |
| (56) | Tnr-Y 81 | A | Tnr-M 81 | A | Tnr-C 81 | A | Tnr-Bk 81 | A |
| (57) | Tnr-Y 82 | A | Tnr-M 82 | A | Tnr-C 82 | A | Tnr-Bk 82 | A |
| (58) | Tnr-Y 83 | A | Tnr-M 83 | A | Tnr-C 83 | A | Tnr-Bk 83 | A |
| (59) | Tnr-Y 84 | A | Tnr-M 84 | A | Tnr-C 84 | A | Tnr-Bk 84 | A |
| (60) | Tnr-Y 85 | A | Tnr-M 85 | A | Tnr-C 85 | A | Tnr-Bk 85 | A |
| (61) | Tnr-Y 86 | A | Tnr-M 86 | A | Tnr-C 86 | A | Tnr-Bk 86 | A |
| (62) | Tnr-Y 87 | A | Tnr-M 87 | A | Tnr-C 87 | A | Tnr-Bk 87 | A |
| (63) | Tnr-Y 88 | A | Tnr-M 88 | A | Tnr-C 88 | A | Tnr-Bk 88 | A |
| (64) | Tnr-Y 89 | A | Tnr-M 89 | A | Tnr-C 89 | B | Tnr-Bk 89 | A |
| (25) | Tnr-Y 90 | A | Tnr-M 90 | A | Tnr-C 90 | B | Tnr-Bk 90 | B |

TABLE 5-continued

Results of the Evaluation of Toners Produced by Suspension-Granulation Method

| Compound no. | Yellow Toner | Yellow Tint strength | Magenta Toner | Magenta Tint strength | Cyan Toner | Cyan Tint strength | Black Toner | Black Tint strength |
|---|---|---|---|---|---|---|---|---|
| (25) | Tnr-Y 91 | A | Tnr-M 91 | A | Tnr-C 91 | B | Tnr-Bk 91 | A |
| NA | Tnr-Y 92 | — | Tnr-M 92 | — | Tnr-C 92 | — | Tnr-Bk 92 | — |
| NA | Tnr-Y 93 | — | Tnr-M 93 | — | Tnr-C 93 | — | Tnr-Bk 93 | — |
| NA | Tnr-Y 94 | — | Tnr-M 94 | — | Tnr-C 94 | — | Tnr-Bk 94 | — |
| (65) | Tnr-Y 95 | B | Tnr-M 95 | A | Tnr-C 95 | B | Tnr-Bk 95 | A |
| Comparative compound 1 | | | | | | | | |
| Comparative compound 2 | Tnr-Y 96 | D | Tnr-M 96 | B | Tnr-C 96 | D | Tnr-Bk 96 | D |
| Comparative compound 3 | Tnr-Y 97 | D | Tnr-M 97 | D | Tnr-C 97 | B | Tnr-Bk 97 | D |
| Comparative compound 4 | Tnr-Y 98 | D | Tnr-M 98 | D | Tnr-C 98 | D | Tnr-Bk 98 | D |

As is clear from Table 3, pigment compositions and pigment dispersions with good dispersibility of pigment can be obtained through the use of azo-skeleton-bearing compounds according to certain embodiments of the invention.

As is clear from Tables 4 and 5, yellow toners, magenta toners, cyan toners, and black toners with improved dispersibility of pigment in the binder resin and high tint strength are provided through the use of azo-skeleton-bearing compounds according to certain embodiments of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-178555, filed Aug. 29, 2013, which is hereby incorporated by reference herein in its entirety.

The invention claimed is:

1. A compound comprising a polymer having a monomer unit represented by formula (3), wherein the compound has a partial structure represented by formula (1):

[Chem. 1]

Formula (1)

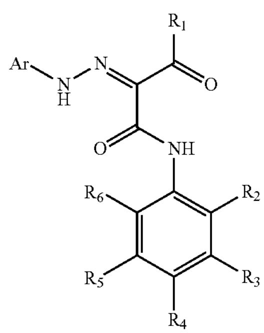

wherein $R_1$ represents an alkyl group or a phenyl group,

Ar represents an aryl group, and

Ar and $R_2$ to $R_6$ meet at least one of conditions (i) and (ii):

(i) Ar has a linking group that binds to a carbon atom of the aryl group and forms a linking portion where the partial structure binds to the polymer;

(ii) at least one of $R_2$ to $R_6$ is a linking group that forms a linking portion where the partial structure binds to the polymer;

each of $R_2$ to $R_6$, when not being the linking group, independently represents a hydrogen atom, a halogen atom, an alkyl group, an alkoxy group, a hydroxyl group, a cyano group, a trifluoromethyl group, a carboxyl group, a group represented by formula (2-1), or a group represented by formula (2-2); and Ar has a group represented by formula (2-1) or a group represented by formula (2-2) as a substituent;

[Chem. 2]

Formula (2-1)

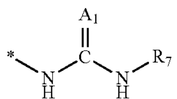

wherein the symbol * represents a site where the group binds to Ar or the aromatic ring having $R_2$ to $R_6$ in formula (1), $R_7$ represents a hydrogen atom, an alkyl group, an aralkyl group, an alkyloxycarbonyl group, or an aralkyloxycarbonyl group, and $A_1$ represents an oxygen atom, a sulfur atom, or an $NR_8$ group, where $R_8$ represents a hydrogen atom, an alkyloxycarbonyl group, or an aralkyloxycarbonyl group;

[Chem. 3]

Formula (2-2)

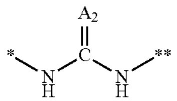

wherein the symbols * and ** represent sites where the group binds to Ar or the aromatic ring having $R_2$ to $R_6$ in formula (1), the group represented by formula (2-2) forming a five-member heterocycle by binding to Ar or the aromatic ring having $R_2$ to $R_6$ in formula (1), and $A_2$ represents an oxygen atom, a sulfur atom, or an $NR_{16}$ group, where $R_{16}$ represents a hydrogen atom, an alkyloxycarbonyl group, or an aralkyloxycarbonyl group:

[Chem. 4]

Formula (3)

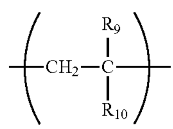

wherein $R_9$ represents a hydrogen atom or an alkyl group, and $R_{10}$ represents a phenyl group, a carboxyl group, a carboxylic acid ester group, or a carboxylic acid amide group.

2. The compound according to claim 1, wherein the partial structure represented by formula (1) is a structure represented by formula (4):

[Chem. 9]

Formula (4)

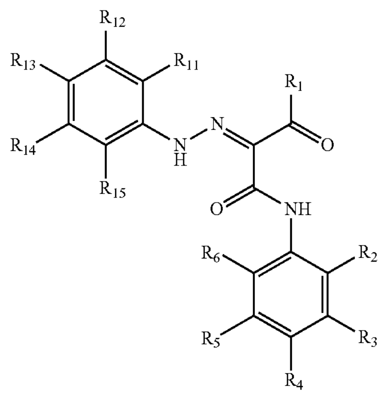

wherein $R_1$ represents an alkyl group or a phenyl group, and $R_{11}$ to $R_{15}$ and $R_2$ to $R_6$ meet at least one of conditions (v) and (vi):

(v) at least one of $R_{11}$ to $R_{15}$ is a linking group that forms a linking portion where the partial structure binds to the polymer;

(vi) at least one of $R_2$ to $R_6$ is a linking group that forms a linking portion where the partial structure binds to the polymer;

each of $R_{11}$ to $R_{15}$ and $R_2$ to $R_6$, when not being the linking group, independently represents a hydrogen atom, a halogen atom, an alkyl group, an alkoxy group, a hydroxyl group, a cyano group, a trifluoromethyl group, a carboxyl group, a group represented by formula (2-1), or a group represented by formula (2-2); and at least one of $R_{11}$ to $R_{15}$ is a group represented by formula (2-1) or a group represented by formula (2-2).

3. The compound according to claim 1, wherein the linking group has a carboxylic acid ester bond or a carboxylic acid amide bond.

4. The compound according to claim 1, wherein: the partial structure represented by formula (1) has a group represented by formula (2-2); and $A_2$ in formula (2-2) is an oxygen atom.

5. A pigment dispersant comprising the compound according to claim 1.

6. A pigment composition comprising the compound according to claim 1 and a pigment.

7. A pigment dispersion comprising the pigment composition according to claim 6 and a non-water-soluble solvent.

8. The pigment dispersion according to claim 7, wherein the non-water-soluble solvent is styrene.

9. A toner comprising a toner particle containing a binder resin and a colorant, wherein the colorant is the pigment composition according to claim 6.

10. The toner according to claim 9, wherein the toner particle is produced using suspension polymerization or suspension granulation.

11. A compound comprising a polymer having a monomer unit represented by formula (3), wherein the compound has a partial structure represented by formula (1):

[Chem. 1]

Formula (1)

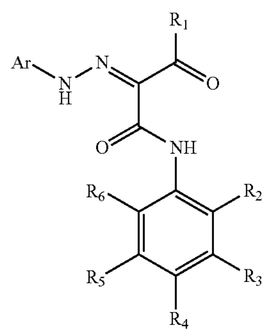

wherein $R_1$ represents an alkyl group or a phenyl group,

Ar represents an aryl group, and

Ar and $R_2$ to $R_6$ meet at least one of conditions (i) and (ii):

(i) Ar has a linking group that binds to a carbon atom of the aryl group and forms a linking portion where the partial structure binds to the polymer;

(ii) at least one of $R_2$ to $R_6$ is a linking group that forms a linking portion where the partial structure binds to the polymer;

each of $R_2$ to $R_6$, when not being the linking group, independently represents a hydrogen atom, a halogen atom, an alkyl group, an alkoxy group, a hydroxyl group, a cyano group, a trifluoromethyl group, a carboxyl group, a group represented by formula (2-1), or a group represented by formula (2-2); and Ar and $R_2$ to $R_6$ meet at least one of conditions (iii) and (iv):

(iii) Ar has a group represented by formula (2-1) as a substituent;

(iv) at least one of $R_2$ to $R_6$ is a group represented by formula (2-1):

[Chem. 2]

Formula (2-1)

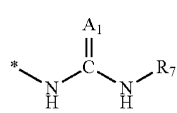

wherein the symbol * represents a site where the group binds to Ar or the aromatic ring having $R_2$ to $R_6$ in formula (1), $R_7$ represents a hydrogen atom, an alkyl group, an aralkyl group, an alkyloxycarbonyl group, or an aralkyloxycarbonyl group, and $A_1$ represents an oxygen atom

[Chem. 3]

Formula (2-2)

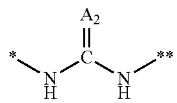

wherein the symbols * and ** represent sites where the group binds to the aromatic ring having $R_2$ to $R_6$ in formula (1), the group represented by formula (2-2) forming a five-member heterocycle by binding to the aromatic ring having $R_2$ to $R_6$ in formula (1), and $A_2$ represents an oxygen atom, a sulfur atom, or an $NR_{16}$ group, where $R_{16}$ represents a hydrogen atom, an alkyloxycarbonyl group, or an aralkyloxycarbonyl group:

[Chem. 4]

Formula (3)

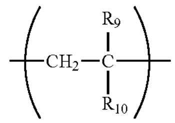

wherein $R_9$ represents a hydrogen atom or an alkyl group, and $R_{10}$ represents a phenyl group, a carboxyl group, a carboxylic acid ester group, or a carboxylic acid amide group.

12. A compound comprising a polymer having a monomer unit represented by formula (3), wherein the compound has a partial structure represented by formula (1):

[Chem. 1]

Formula (1)

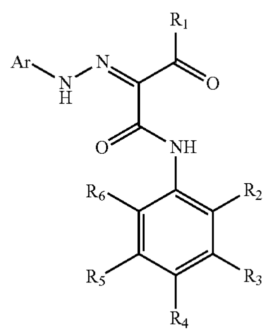

wherein $R_1$ represents an alkyl group or a phenyl group,

Ar represents an aryl group, and at least one of $R_2$ to $R_6$ is a linking group that forms a linking portion where the partial structure binds to the polymer;

each of $R_2$ to $R_6$, when not being the linking group, independently represents a hydrogen atom, a halogen atom, an alkyl group, an alkoxy group, a hydroxyl group, a cyano group, a trifluoromethyl group, a carboxyl group, a group represented by formula (2-1), or a group represented by formula (2-2); and Ar and $R_2$ to $R_6$ meet at least one of conditions (iii) and (iv):

(iii) Ar has a group represented by formula (2-1) or a group represented by formula (2-2) as a substituent;

(iv) at least one of $R_2$ to $R_6$ is a group represented by formula (2-1) or a group represented by formula (2-2):

[Chem. 2]

Formula (2-1)

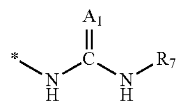

wherein the symbol * represents a site where the group binds to Ar or the aromatic ring having $R_2$ to $R_6$ in formula (1), $R_7$ represents a hydrogen atom, an alkyl group, an aralkyl group, an alkyloxycarbonyl group, or an aralkyloxycarbonyl group, and $A_1$ represents an oxygen atom, a sulfur atom, or an $NR_8$ group, where $R_8$ represents a hydrogen atom, an alkyloxycarbonyl group, or an aralkyloxycarbonyl group;

[Chem. 3]

Formula (2-2)

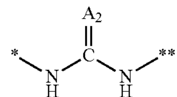

wherein the symbols * and ** represent sites where the group binds to Ar or the aromatic ring having $R_2$ to $R_6$ in formula (1), the group represented by formula (2-2) forming a five-member heterocycle by binding to Ar or the aromatic ring having $R_2$ to $R_6$ in formula (1), and $A_2$ represents an oxygen atom, a sulfur atom, or an $NR_{16}$ group, where $R_{16}$ represents a hydrogen atom, an alkyloxycarbonyl group, or an aralkyloxycarbonyl group:

[Chem. 4]

Formula (3)

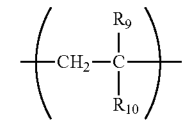

wherein $R_9$ represents a hydrogen atom or an alkyl group, and $R_{10}$ represents a phenyl group, a carboxyl group, a carboxylic acid ester group, or a carboxylic acid amide group.

13. A pigment composition comprising the compound according to claim 12 and a pigment.

14. A pigment dispersion comprising the pigment composition according to claim 13 and a non-water-soluble solvent.

* * * * *